(12) United States Patent
Debro

(10) Patent No.: US 11,471,899 B1
(45) Date of Patent: *Oct. 18, 2022

(54) WASTEWATER SPRAY DISTRIBUTION APPARATUS

(71) Applicant: Spray Heads, LLC, Alliance, OH (US)

(72) Inventor: Israel Michael Debro, Alliance, OH (US)

(73) Assignee: Spray Heads, LLC, Alliance, OH (US)

( * ) Notice: Subject to any disclaimer, the term of this patent is extended or adjusted under 35 U.S.C. 154(b) by 57 days.

This patent is subject to a terminal disclaimer.

(21) Appl. No.: 16/990,095

(22) Filed: Aug. 11, 2020

Related U.S. Application Data

(63) Continuation-in-part of application No. 16/535,300, filed on Aug. 8, 2019.

(Continued)

(51) Int. Cl.
| | |
|---|---|
| *B05B 3/06* | (2006.01) |
| *B05B 15/16* | (2018.01) |
| *B05B 15/652* | (2018.01) |
| *B05B 3/00* | (2006.01) |
| *C02F 9/00* | (2006.01) |

(Continued)

(52) U.S. Cl.
CPC ............... *B05B 3/06* (2013.01); *B05B 3/003* (2013.01); *B05B 3/063* (2013.01); *B05B 15/16* (2018.02); *B05B 15/652* (2018.02); *C02F 9/00* (2013.01); *C02F 1/004* (2013.01); *C02F 1/325* (2013.01); *C02F 3/20* (2013.01); *C02F 3/2866* (2013.01); *C02F 2001/007* (2013.01); *C02F 2103/005* (2013.01)

(58) Field of Classification Search
CPC ........... B05B 3/06; B05B 3/003; B05B 3/063; B05B 15/16; B05B 15/652; C02F 9/00; C02F 1/004; C02F 1/325; C02F 3/20; C02F 3/2866; C02F 2001/007; C02F 2103/005
USPC ....... 239/214.13, 225.1, 237, 240, 251, 252, 239/254, 259, 264
See application file for complete search history.

(56) References Cited

U.S. PATENT DOCUMENTS

| | | | |
|---|---|---|---|
| 3,066,871 A * | 12/1962 | Born | B05B 1/323 239/254 |
| 3,592,388 A * | 7/1971 | Friedlander | B05B 3/0477 239/264 |

(Continued)

*Primary Examiner* — Steven J Ganey
(74) *Attorney, Agent, or Firm* — Ralph E. Jocke; Walter & Jocke

(57) ABSTRACT

A wastewater spray distribution apparatus is operative to distribute wastewater produced by a sewage treatment system (10) onto a ground level (22) through operation of sprayers (118, 260). The exemplary sprayers include a manifold (142, 262) that includes outlet nozzles (158, 264) that can be readily removed and replaced. The exemplary manifold further includes interior areas bounded by surfaces that slope continuously downward from the outlet nozzles to the manifold inlet to assure the draining of water therefrom. Each of the nozzles include a base (140) which includes brake (207). A brake is provided in each nozzle and is adjustable to provide brake force to limit rotational movement produced by the thrust of water passing from the outlet nozzles to assure that the sprayer operates at the appropriate rotational speed. Alternative arrangements include manifolds including fixed or adjustable flaps and radially outwardly adjustable arms to adjust rotational properties.

29 Claims, 78 Drawing Sheets

Related U.S. Application Data

(60) Provisional application No. 62/717,413, filed on Aug. 10, 2018, provisional application No. 62/887,725, filed on Aug. 16, 2019.

(51) Int. Cl.
| | |
|---|---|
| *C02F 103/00* | (2006.01) |
| *C02F 3/28* | (2006.01) |
| *C02F 3/20* | (2006.01) |
| *C02F 1/32* | (2006.01) |
| *C02F 1/00* | (2006.01) |

(56) References Cited

U.S. PATENT DOCUMENTS 5,190,644 A * 3/1993 Wisniewski ............ C02F 3/043
 239/254
5,497,799 A * 3/1996 Shenk .................... B05B 3/066
 239/251

* cited by examiner

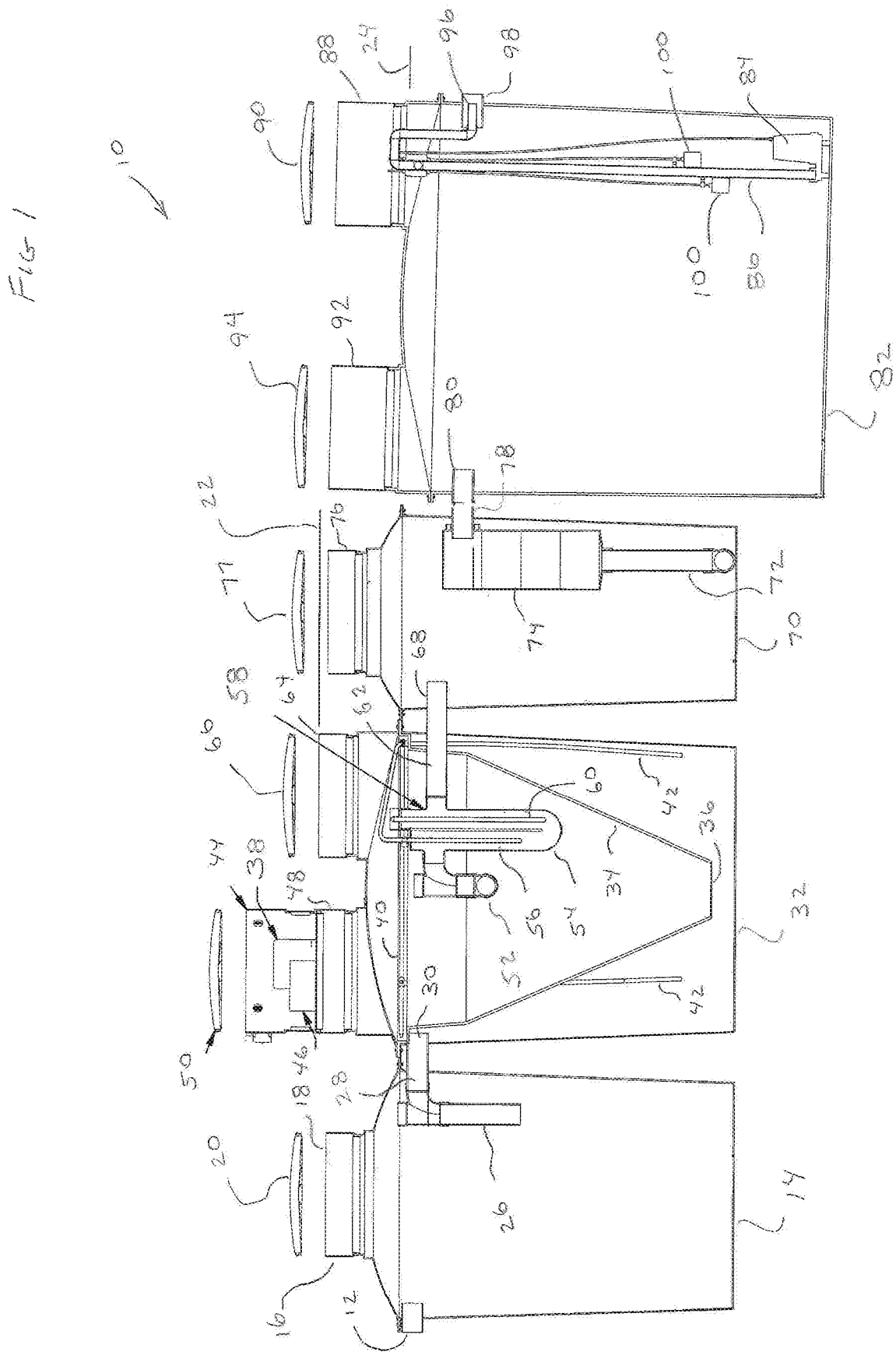

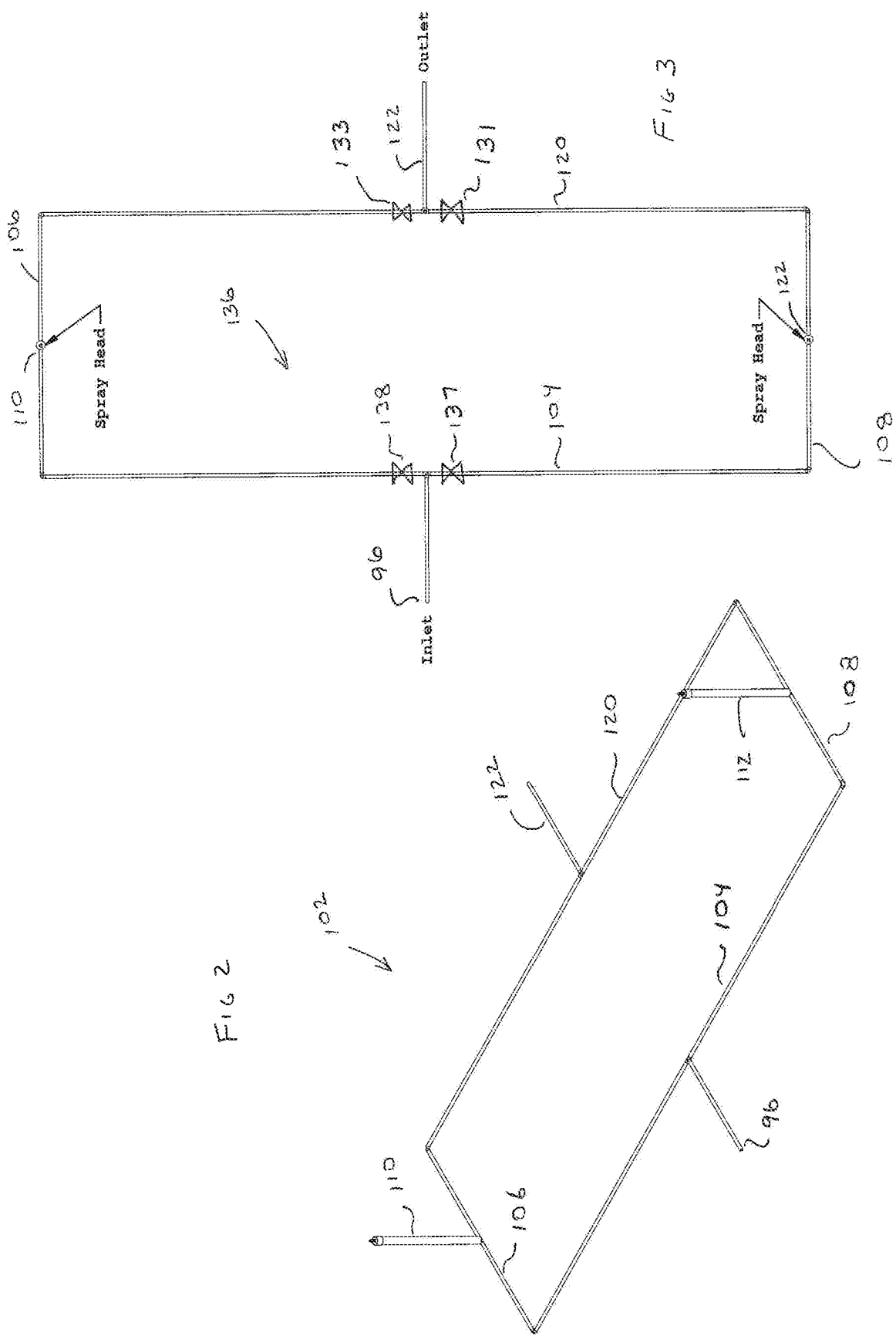

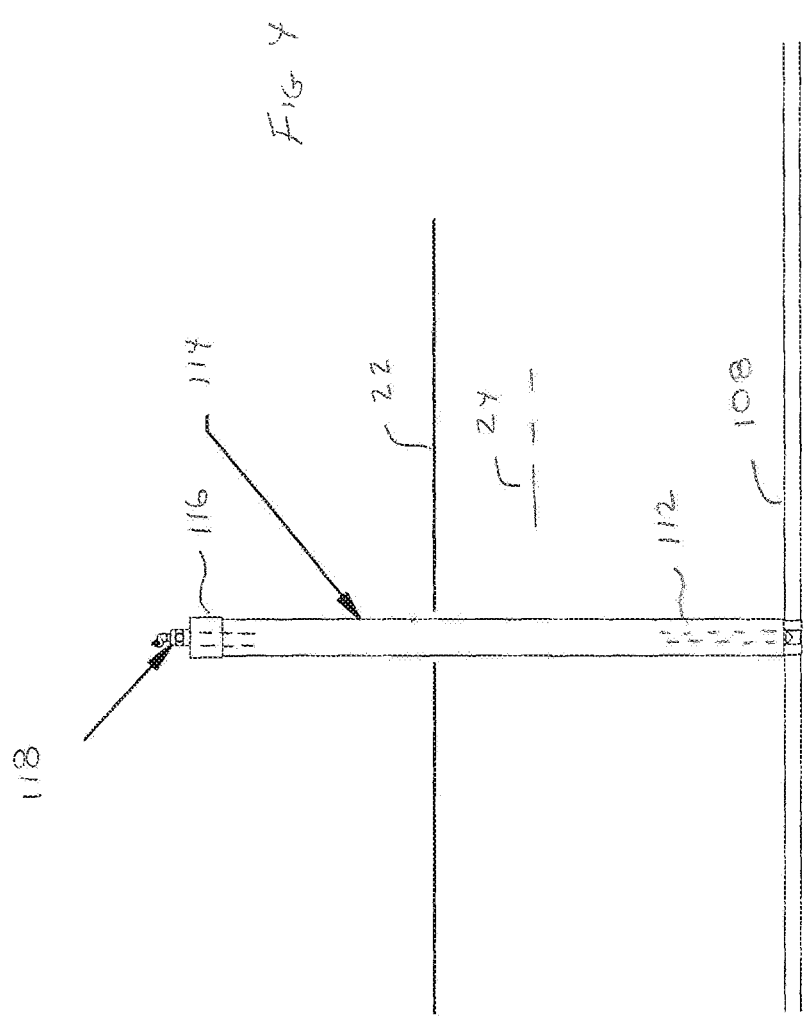

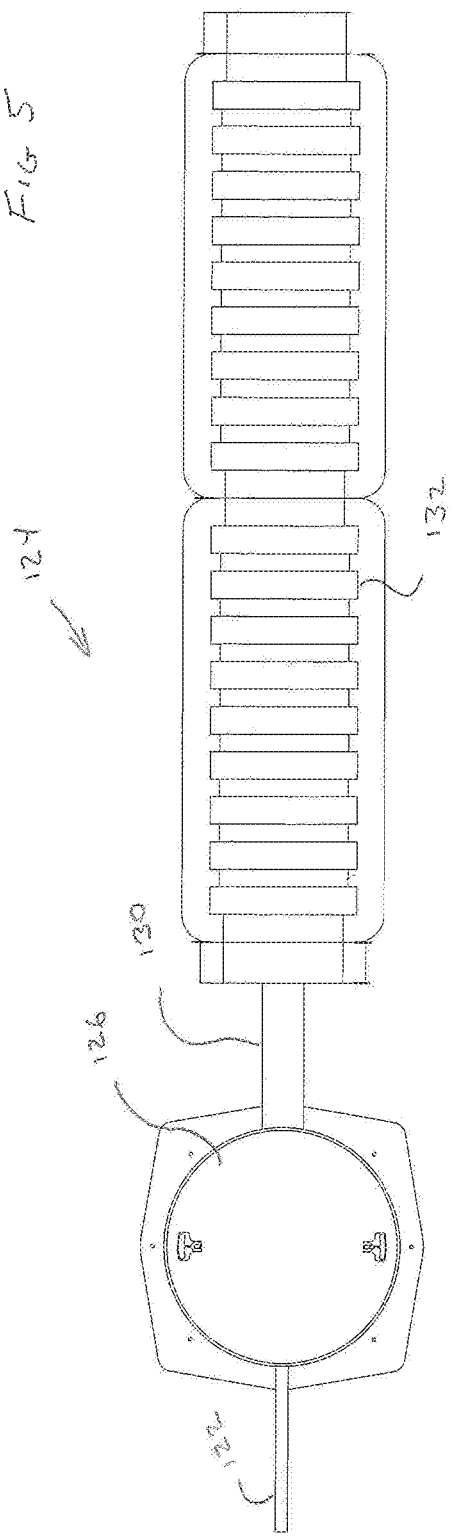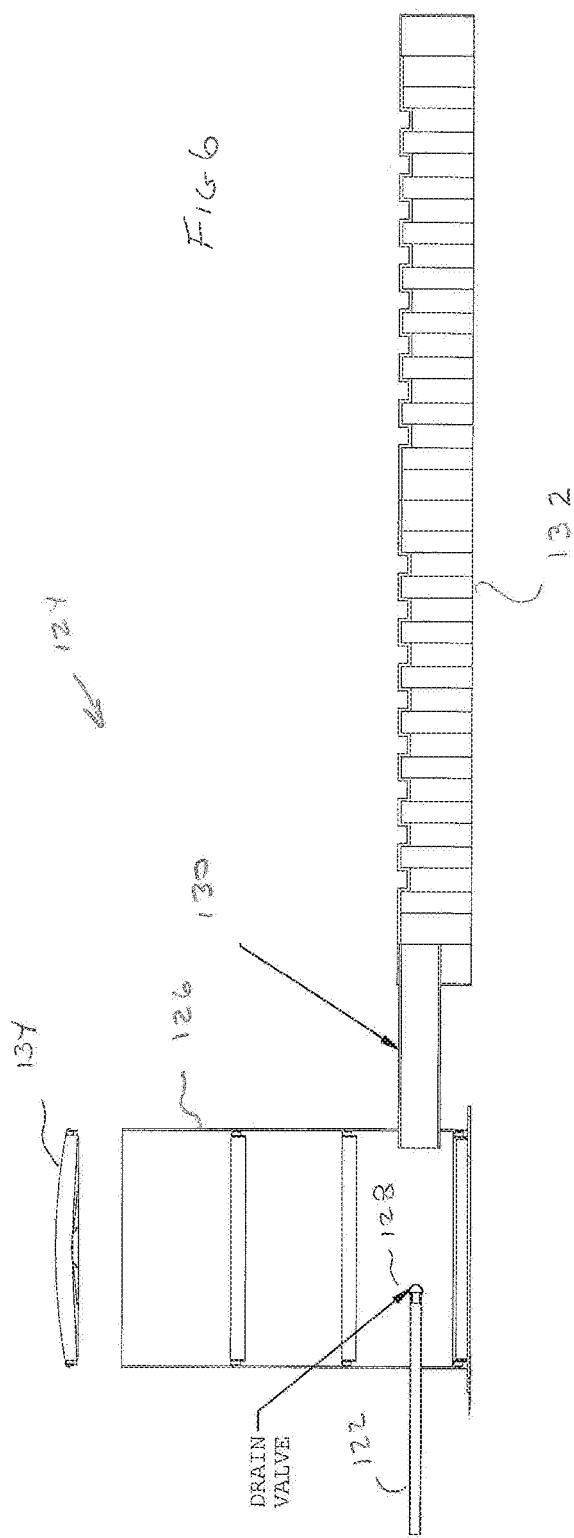

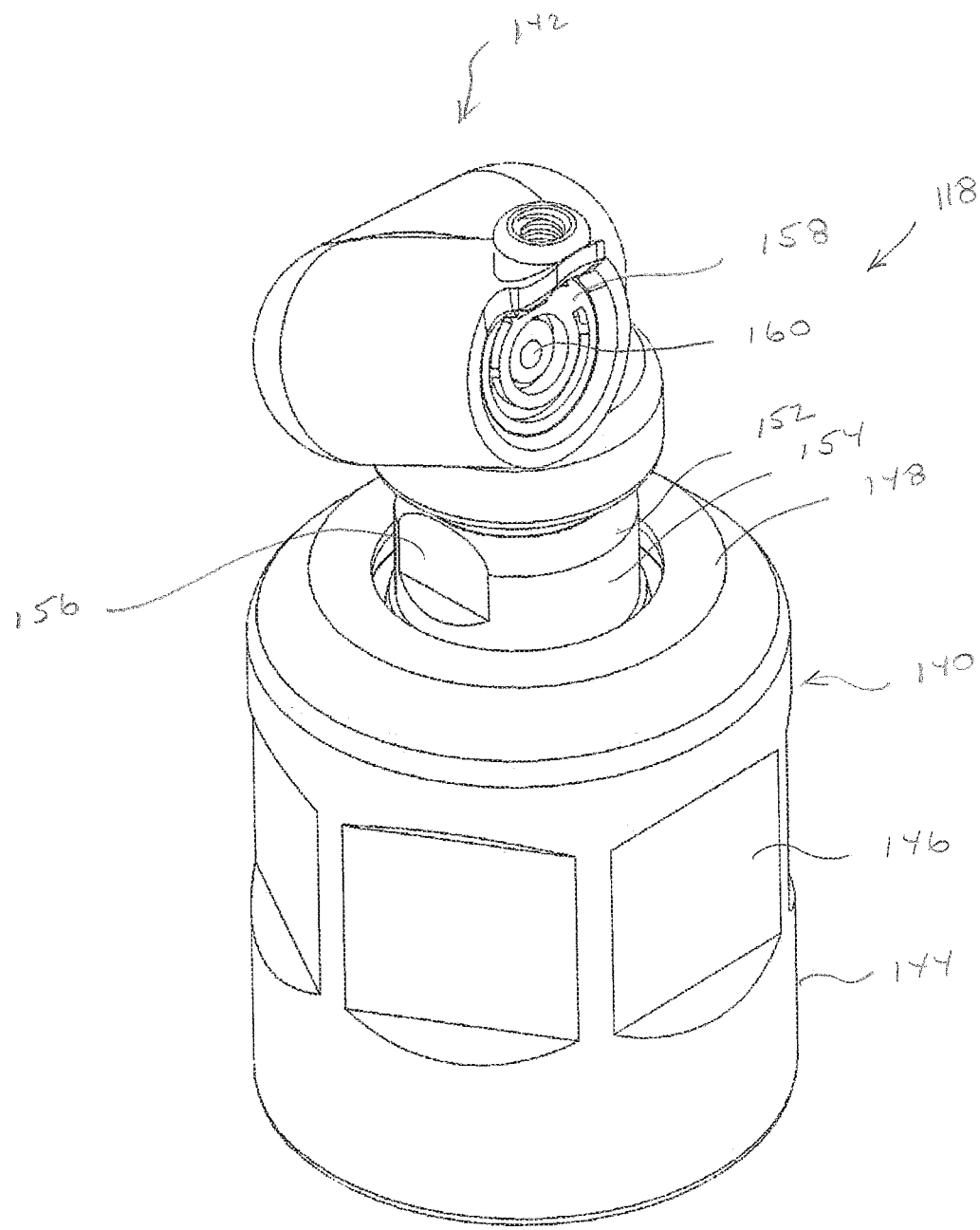

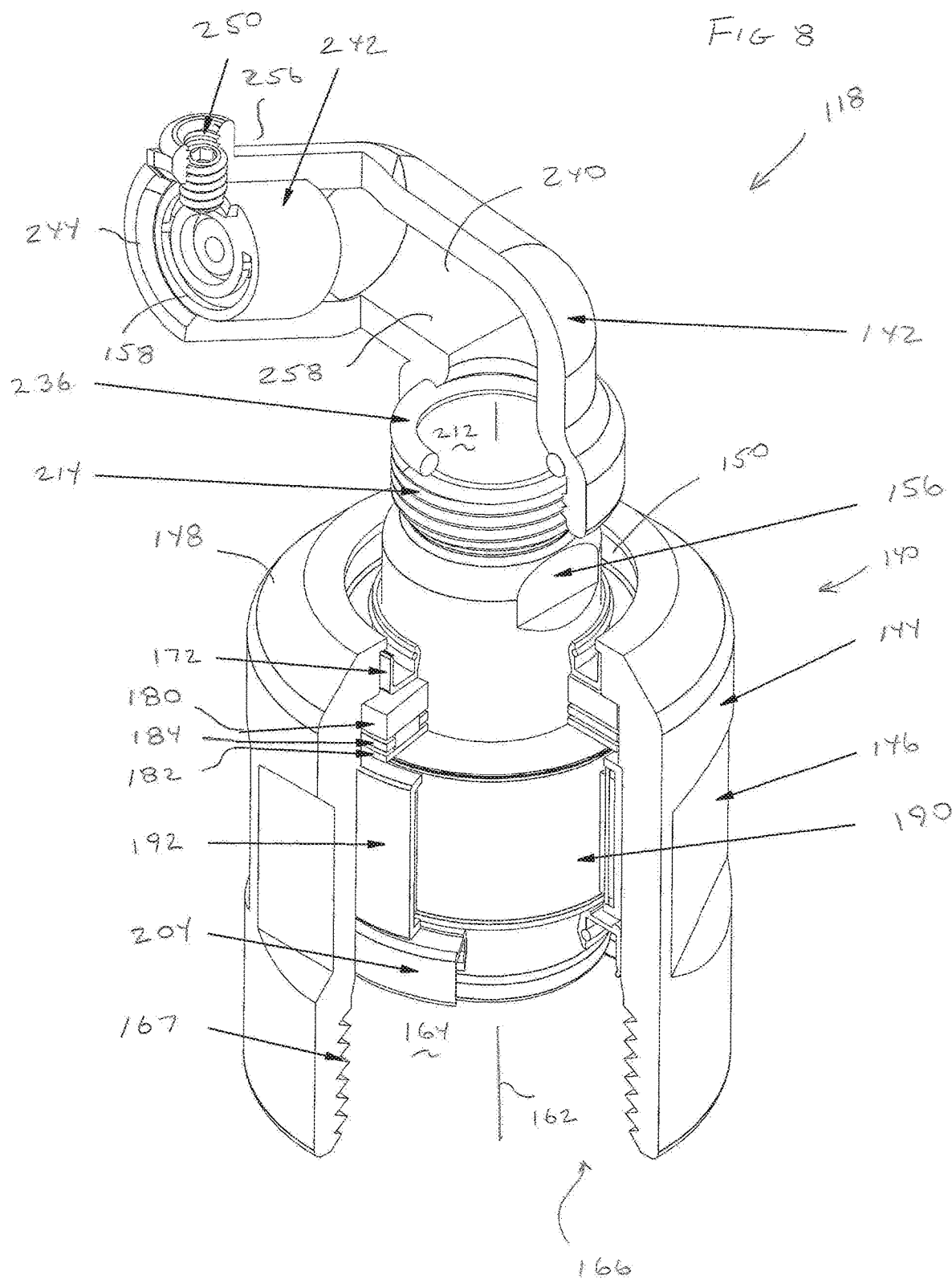

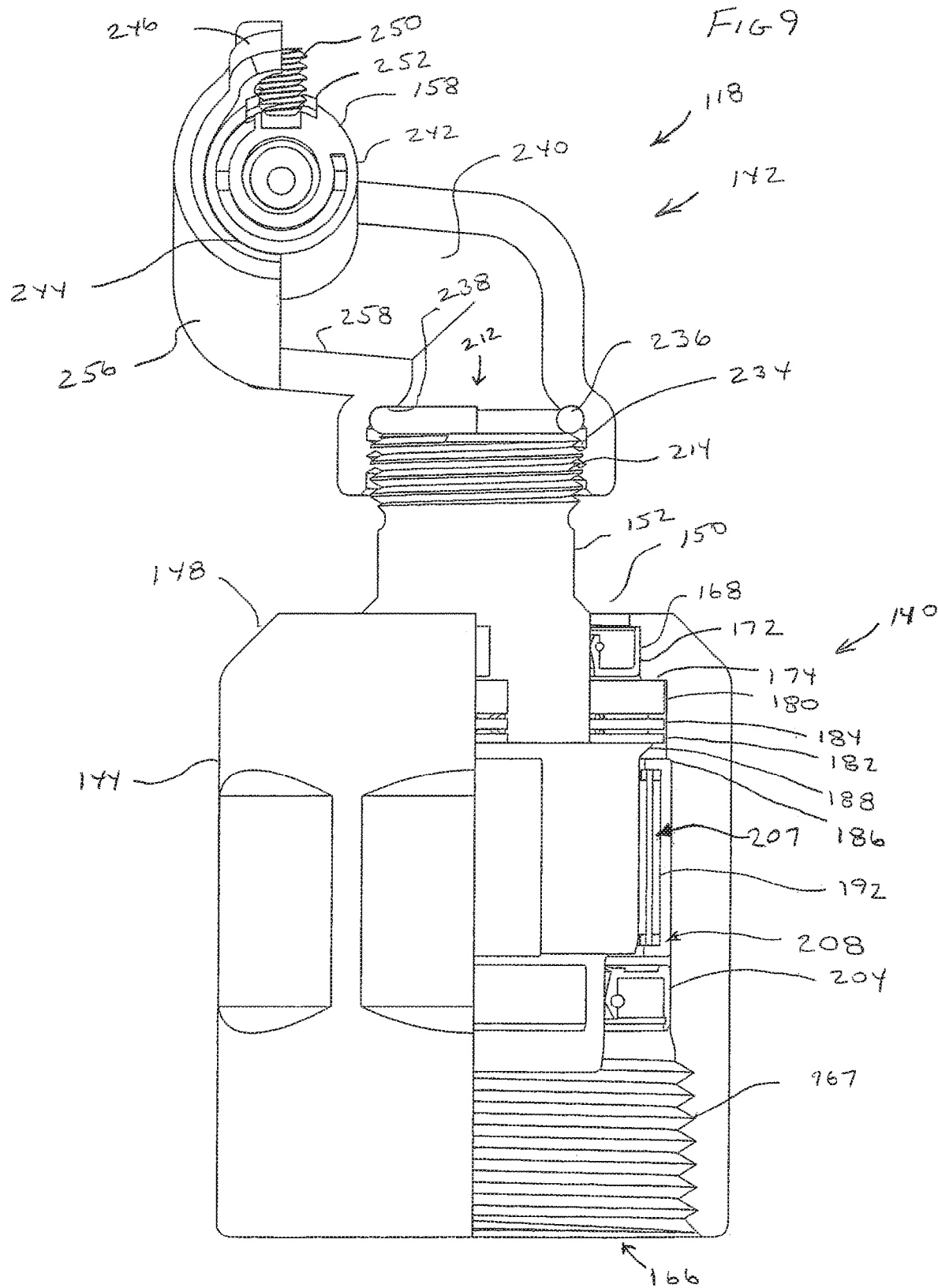

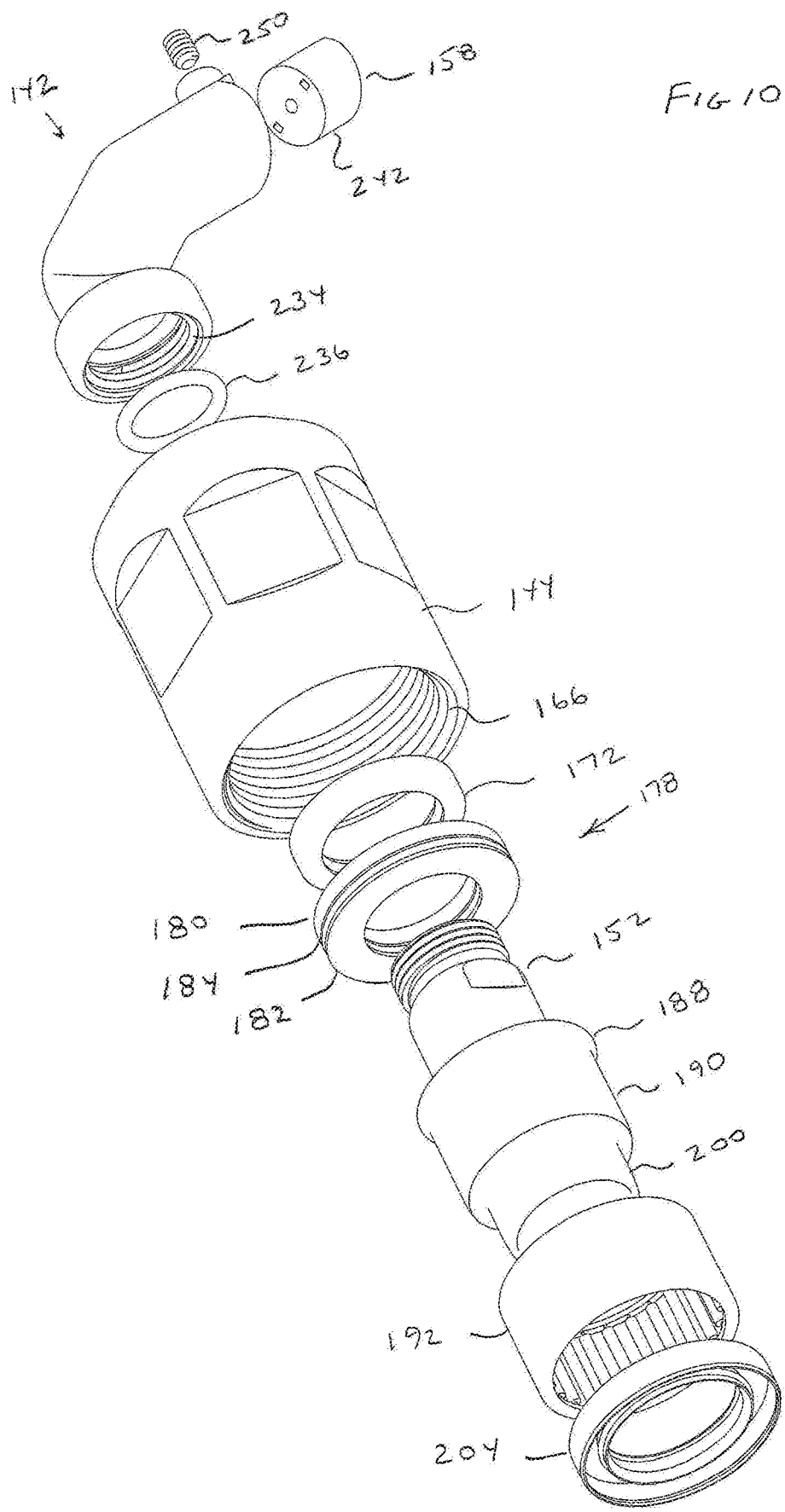

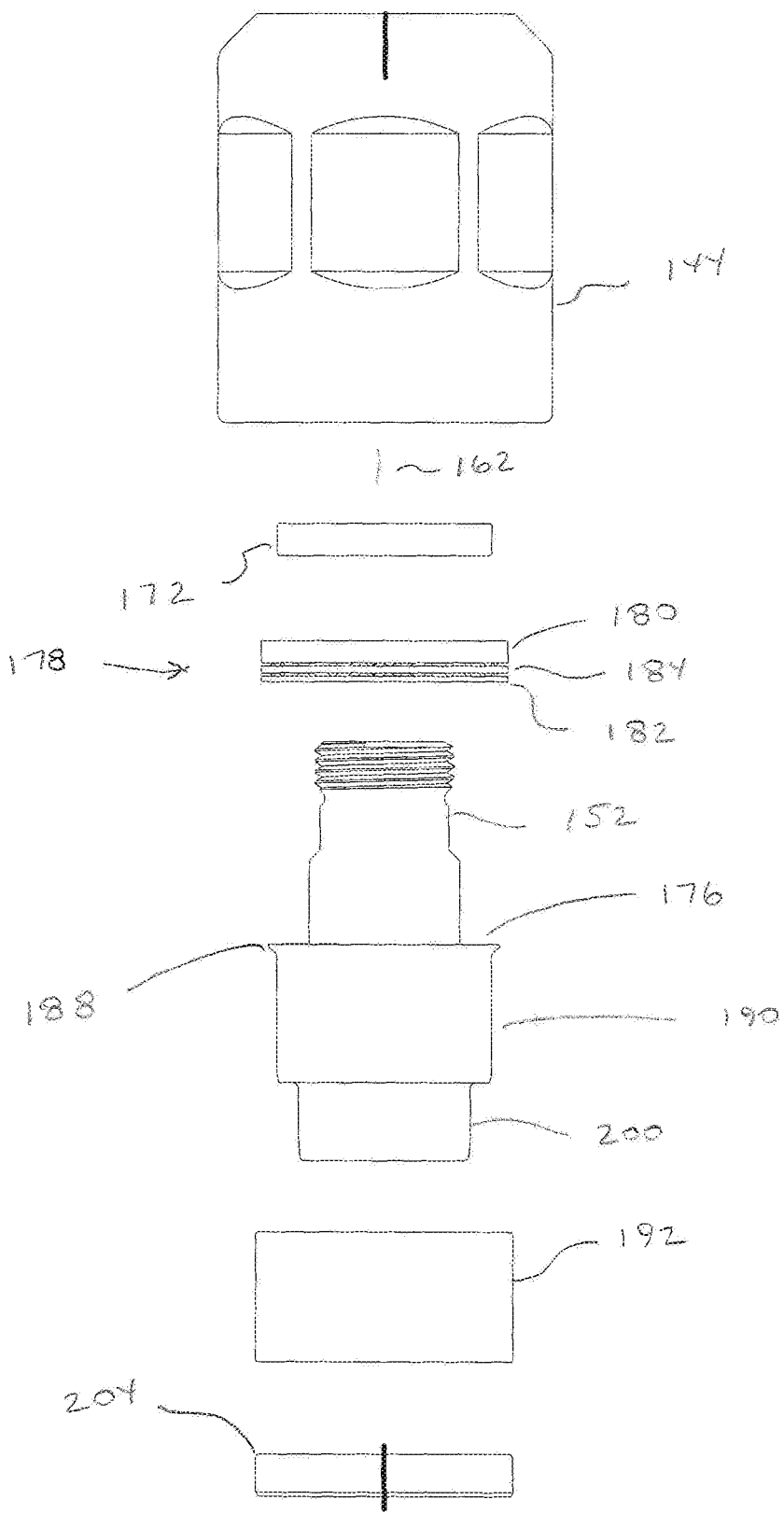

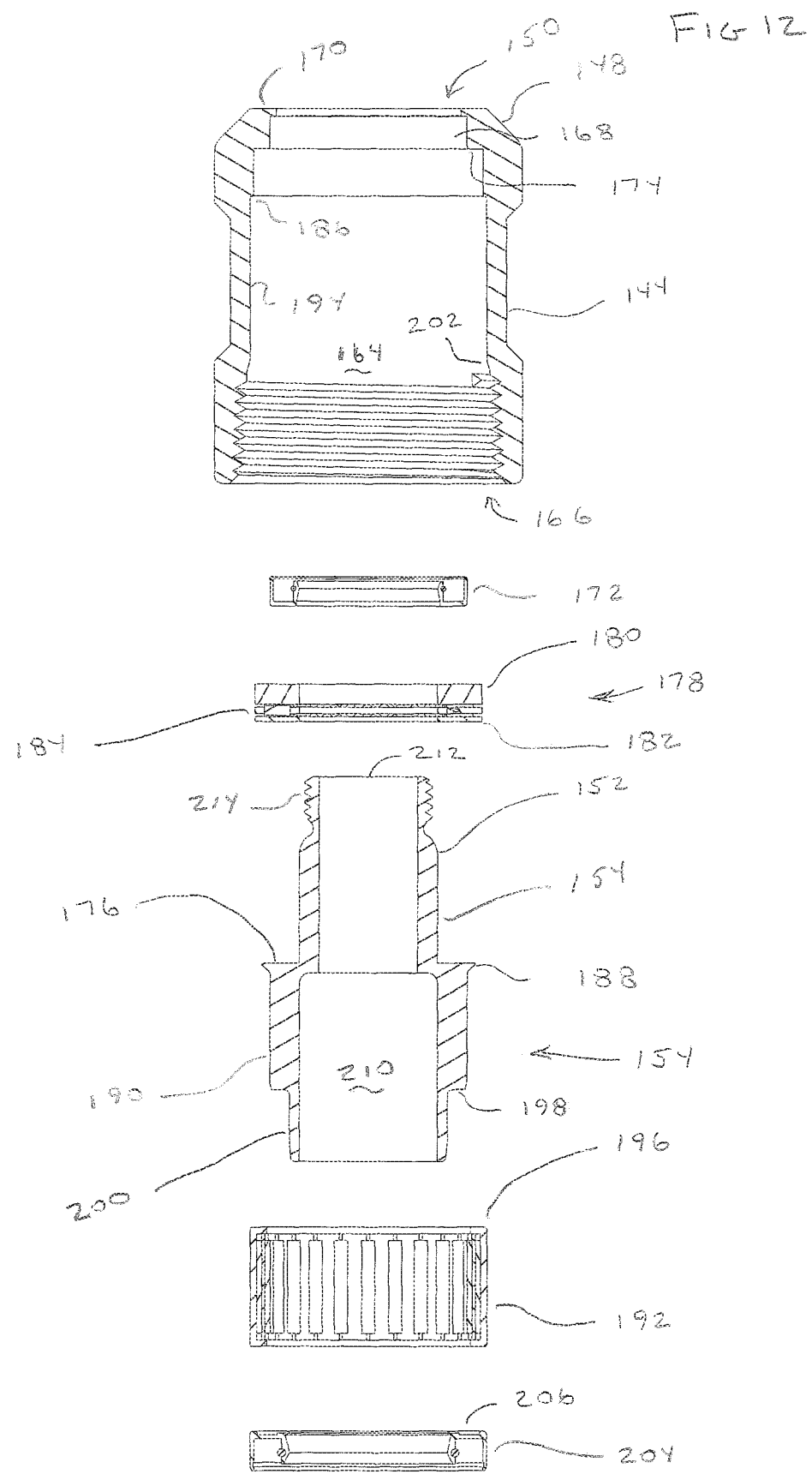

184

192

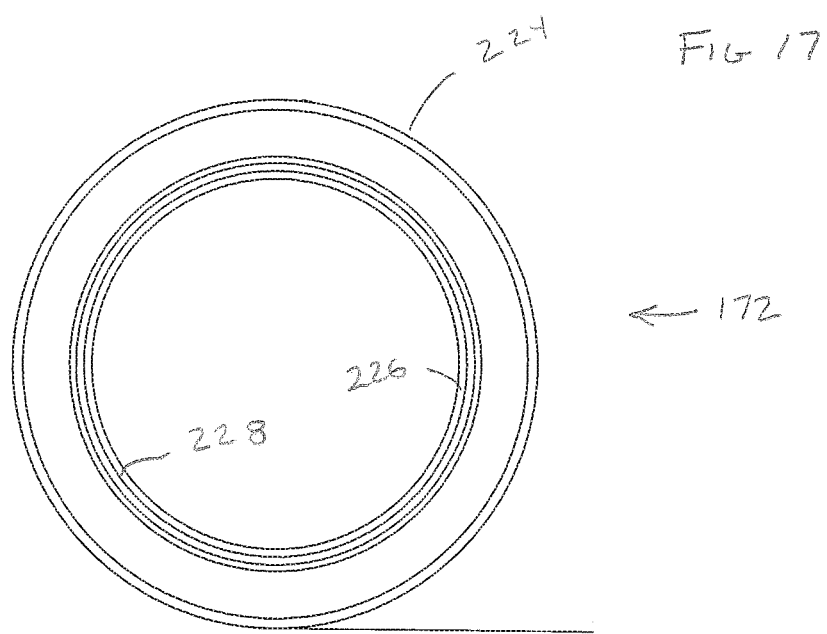
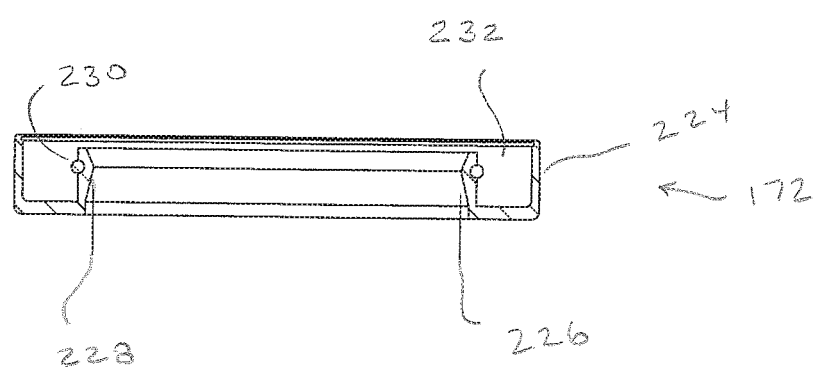

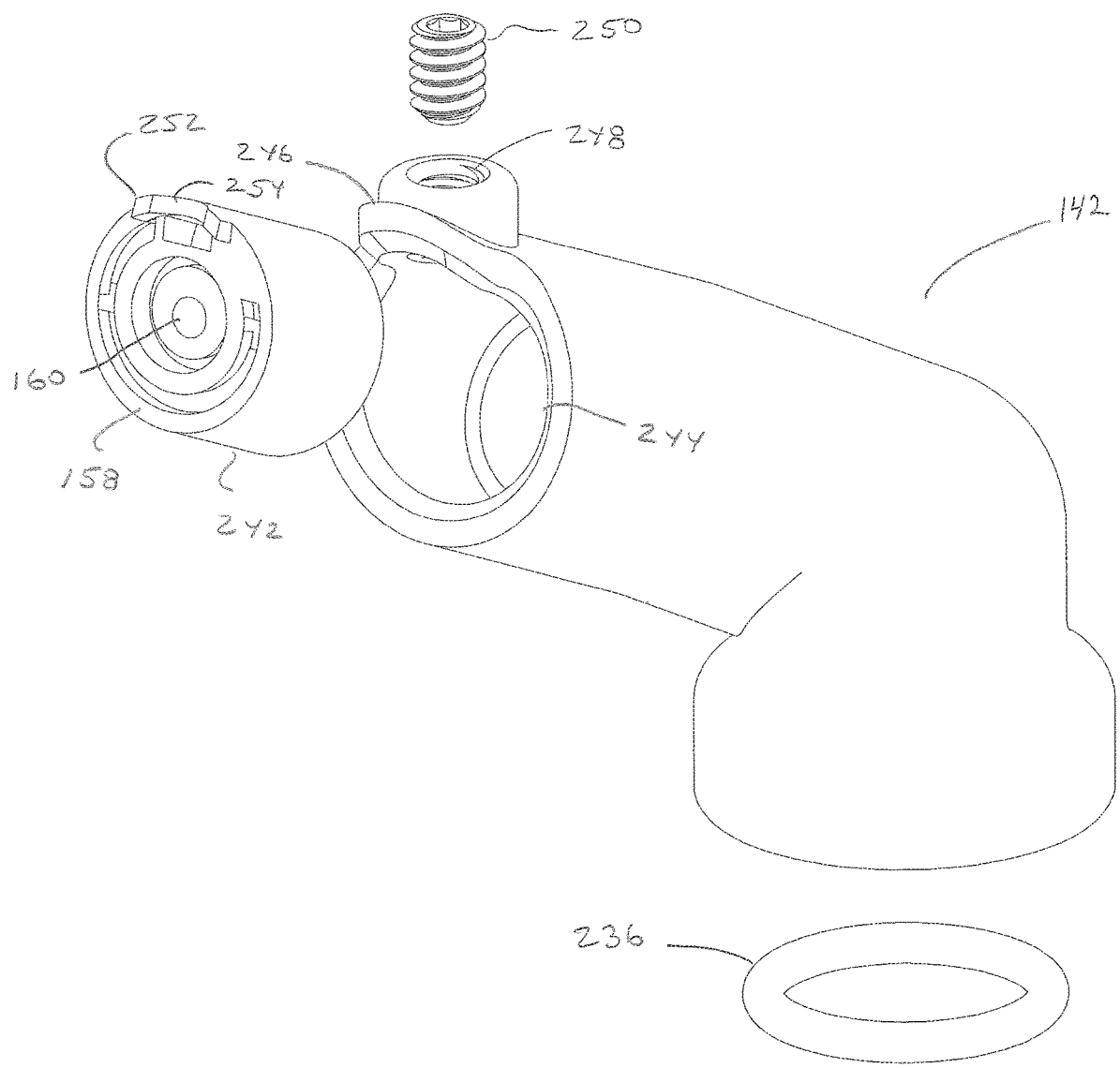

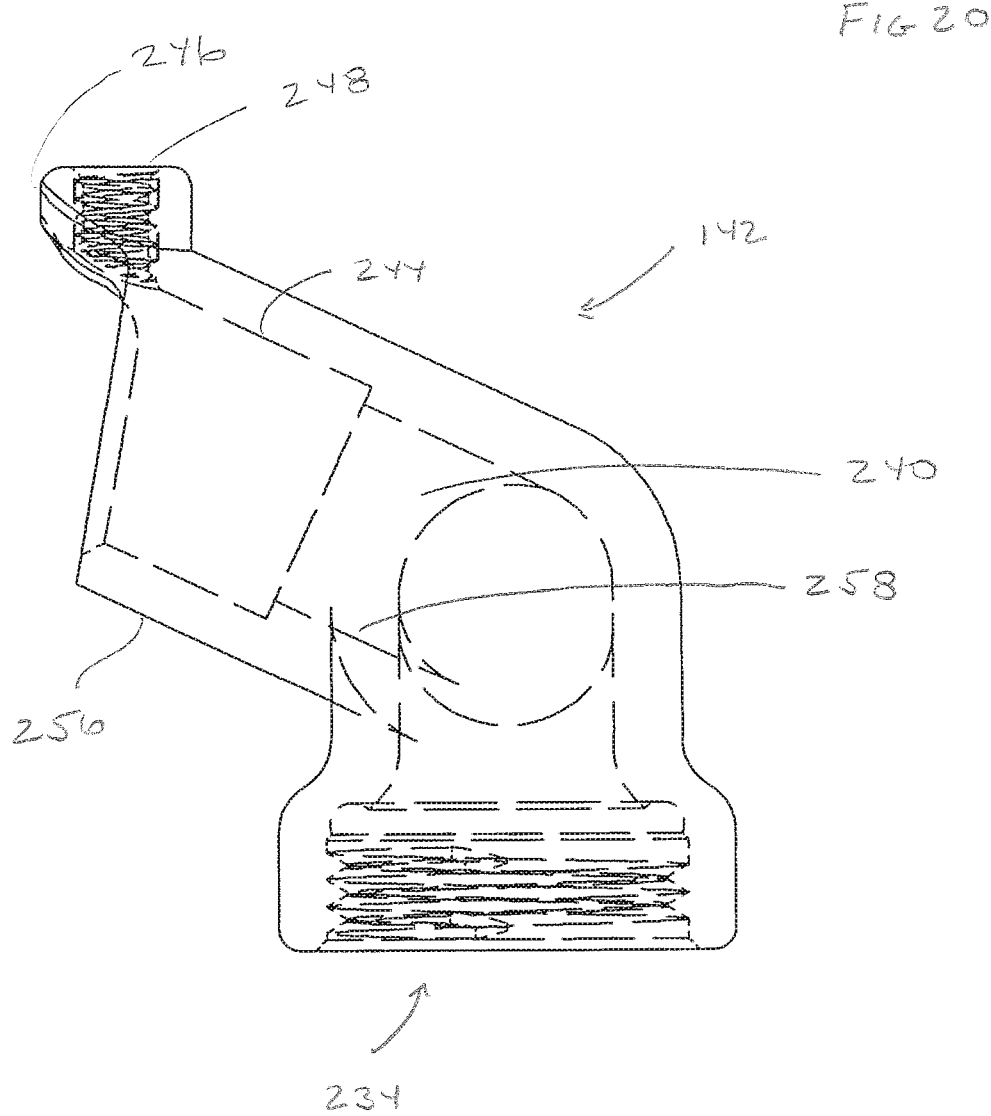

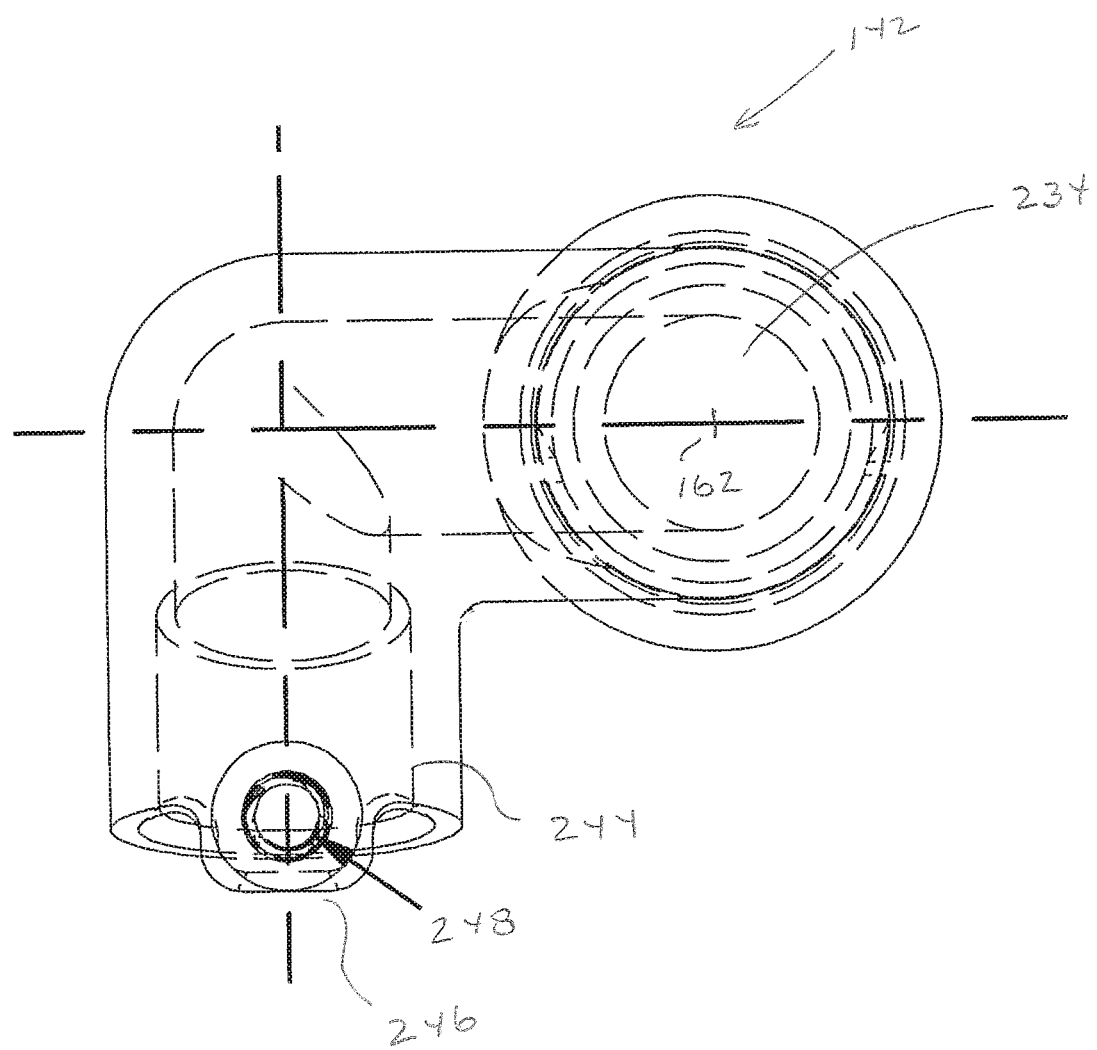

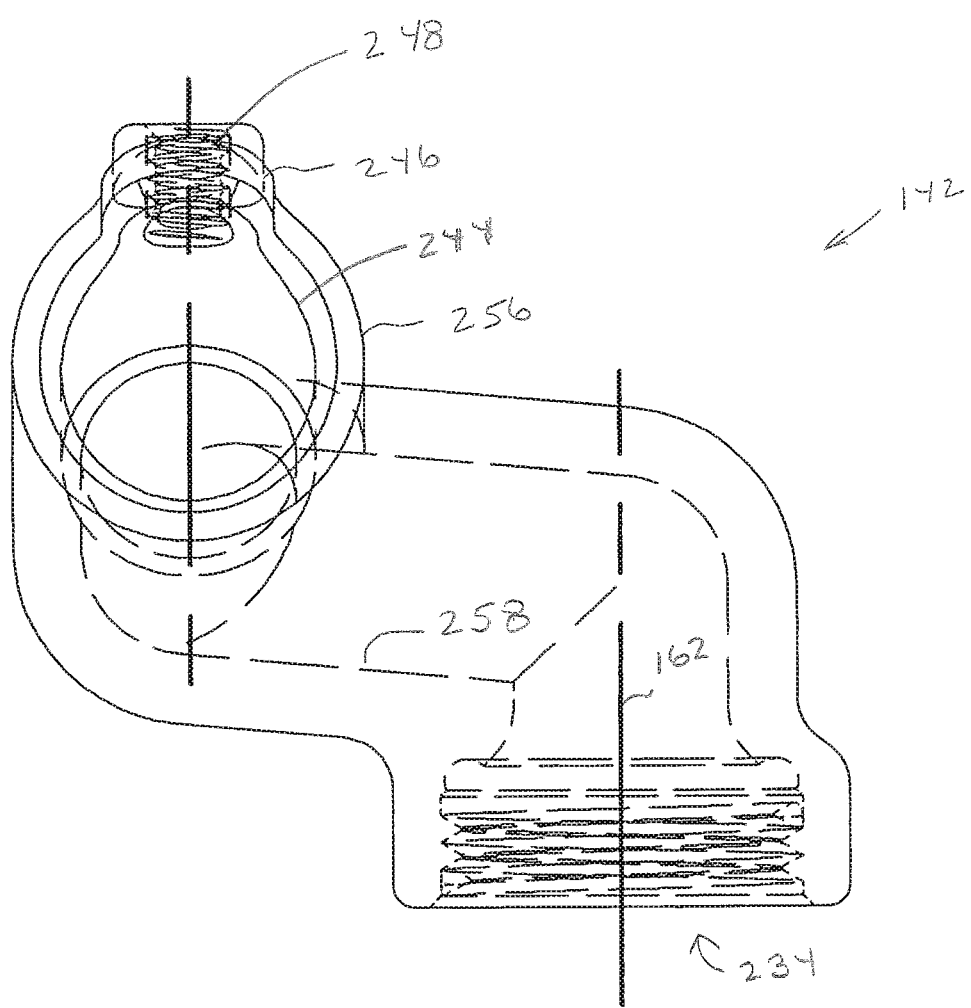

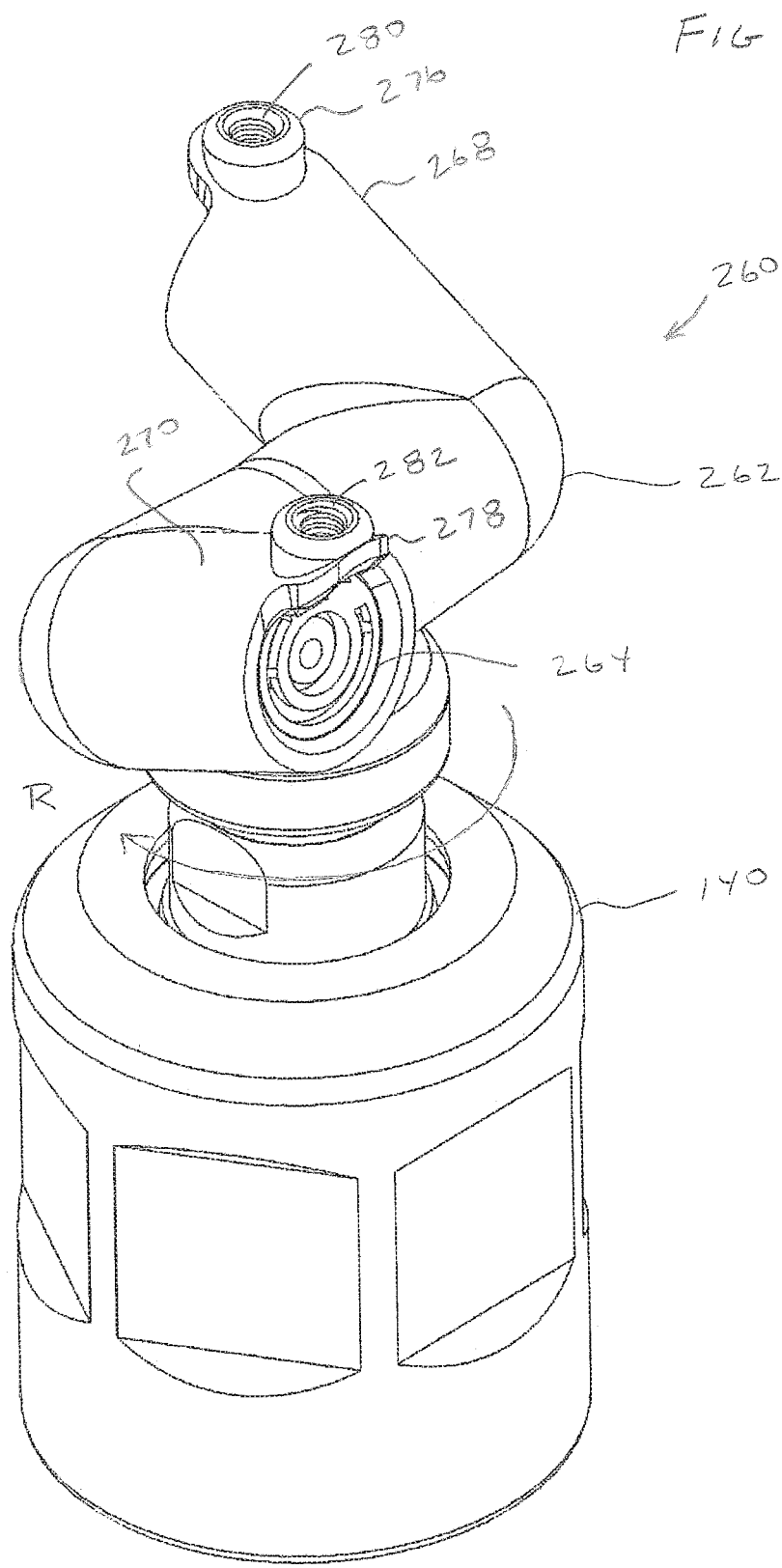

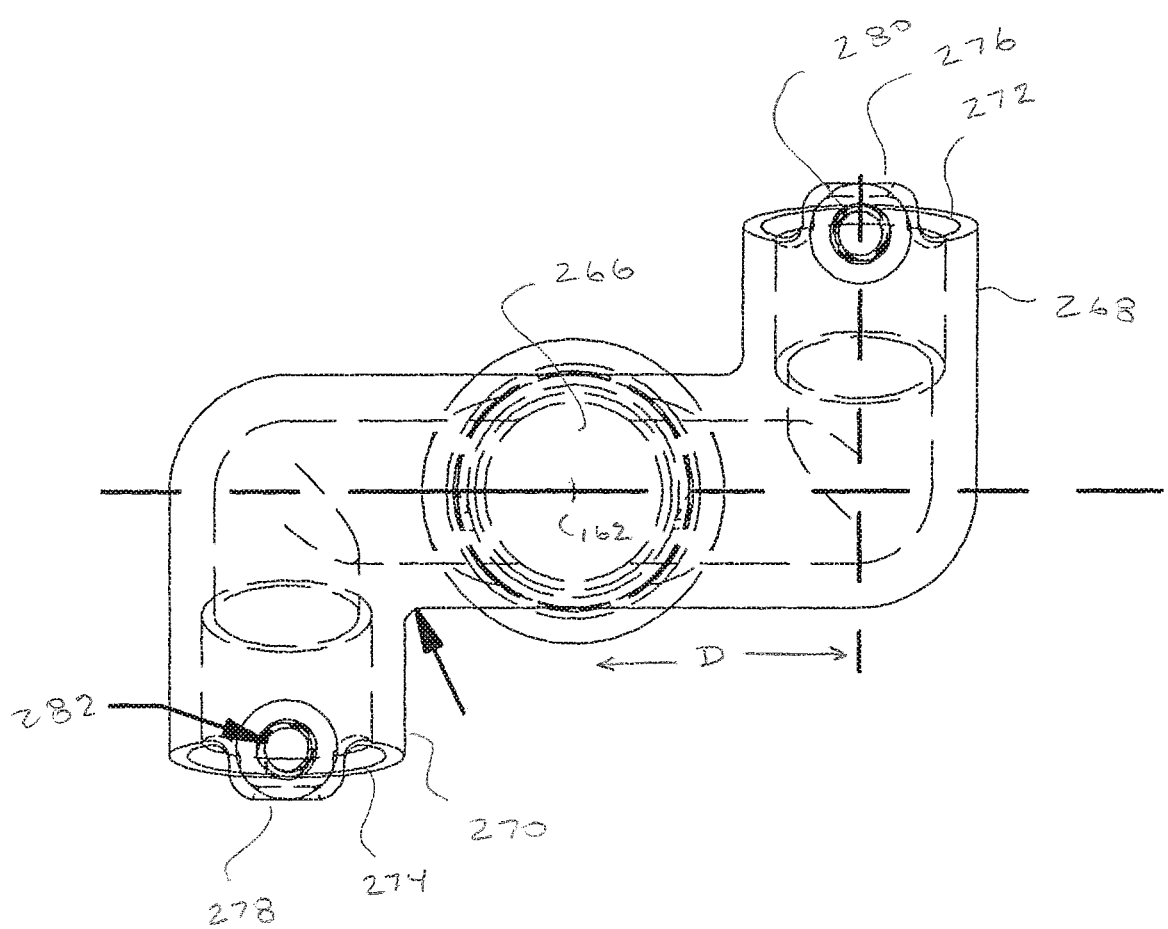

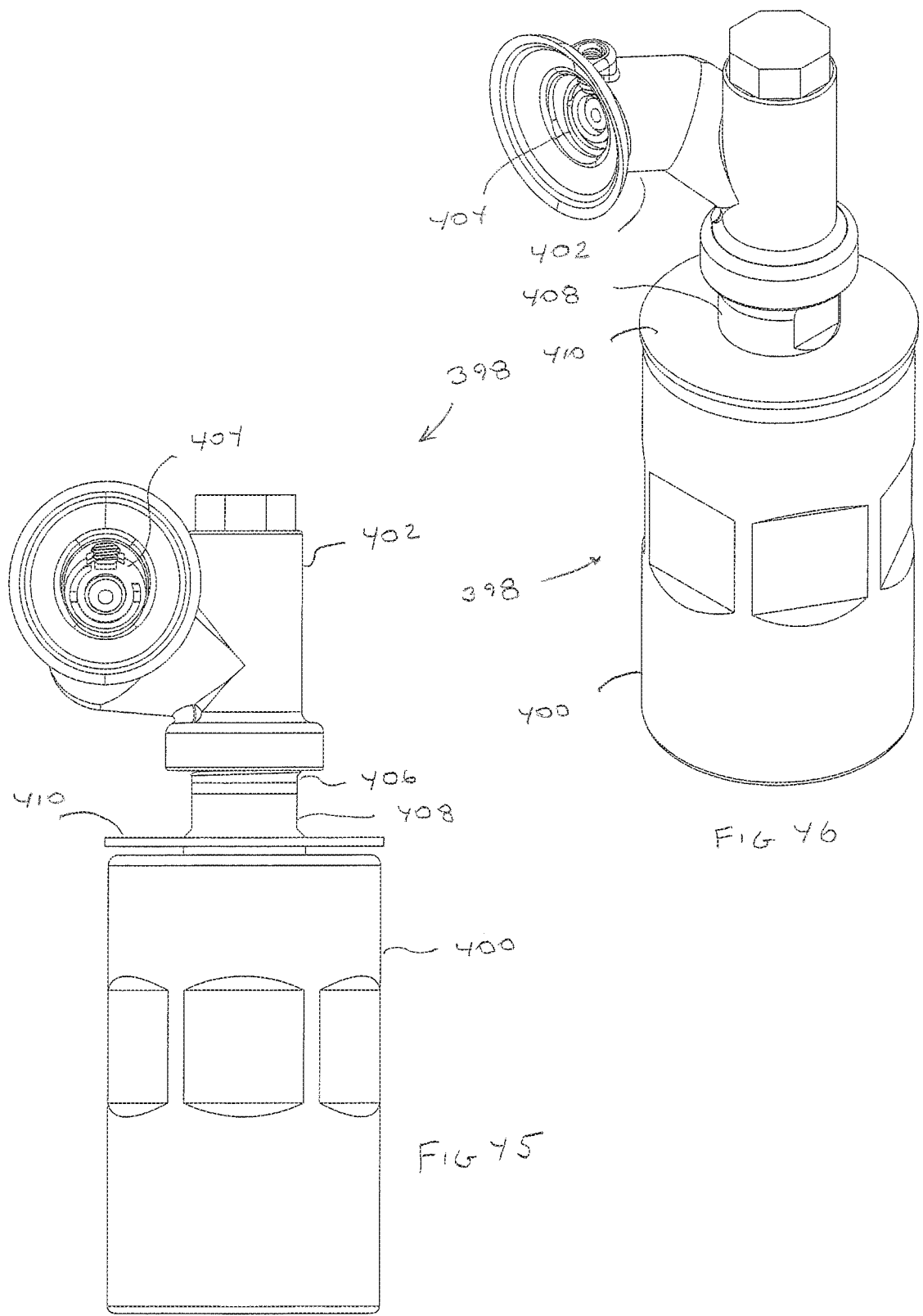

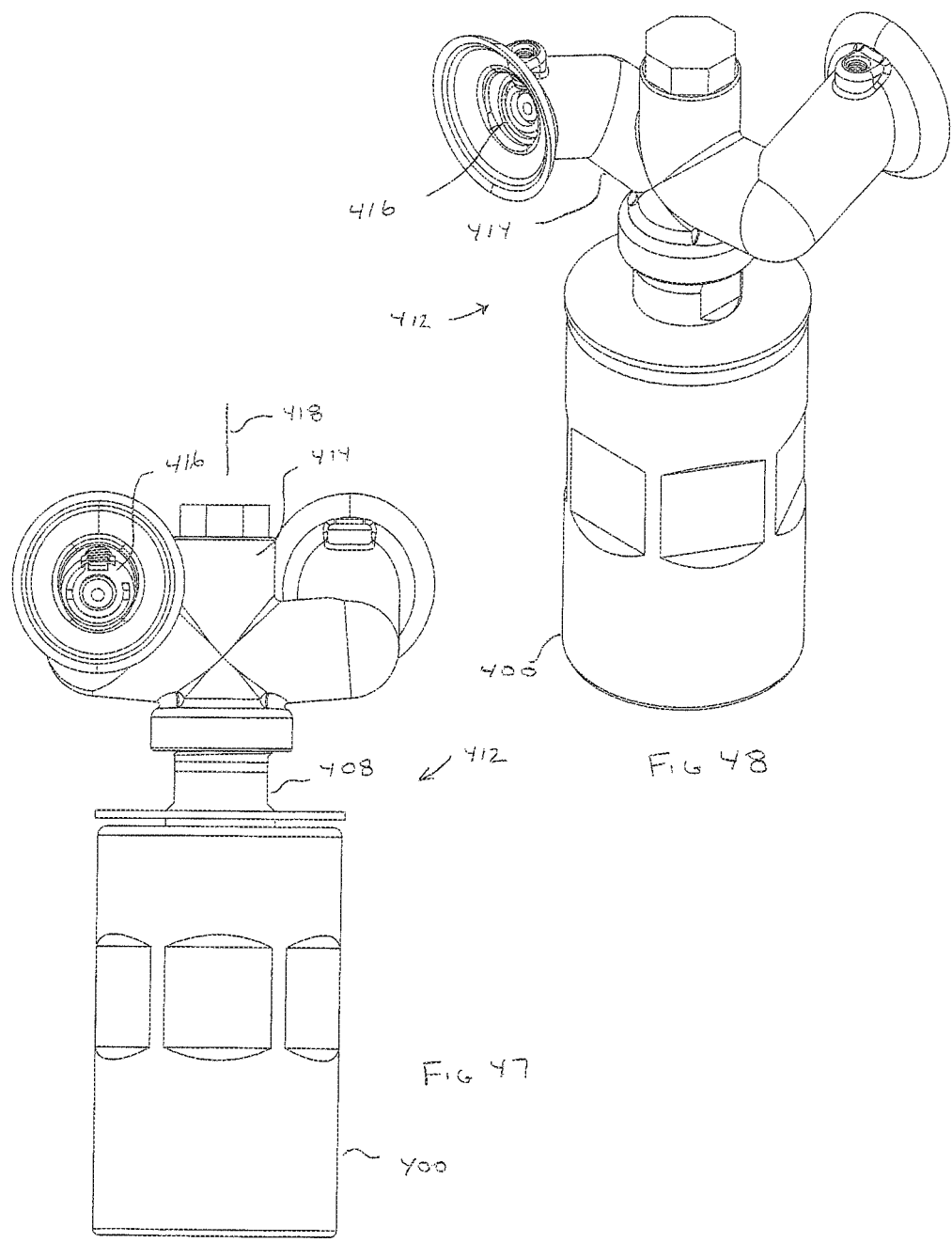

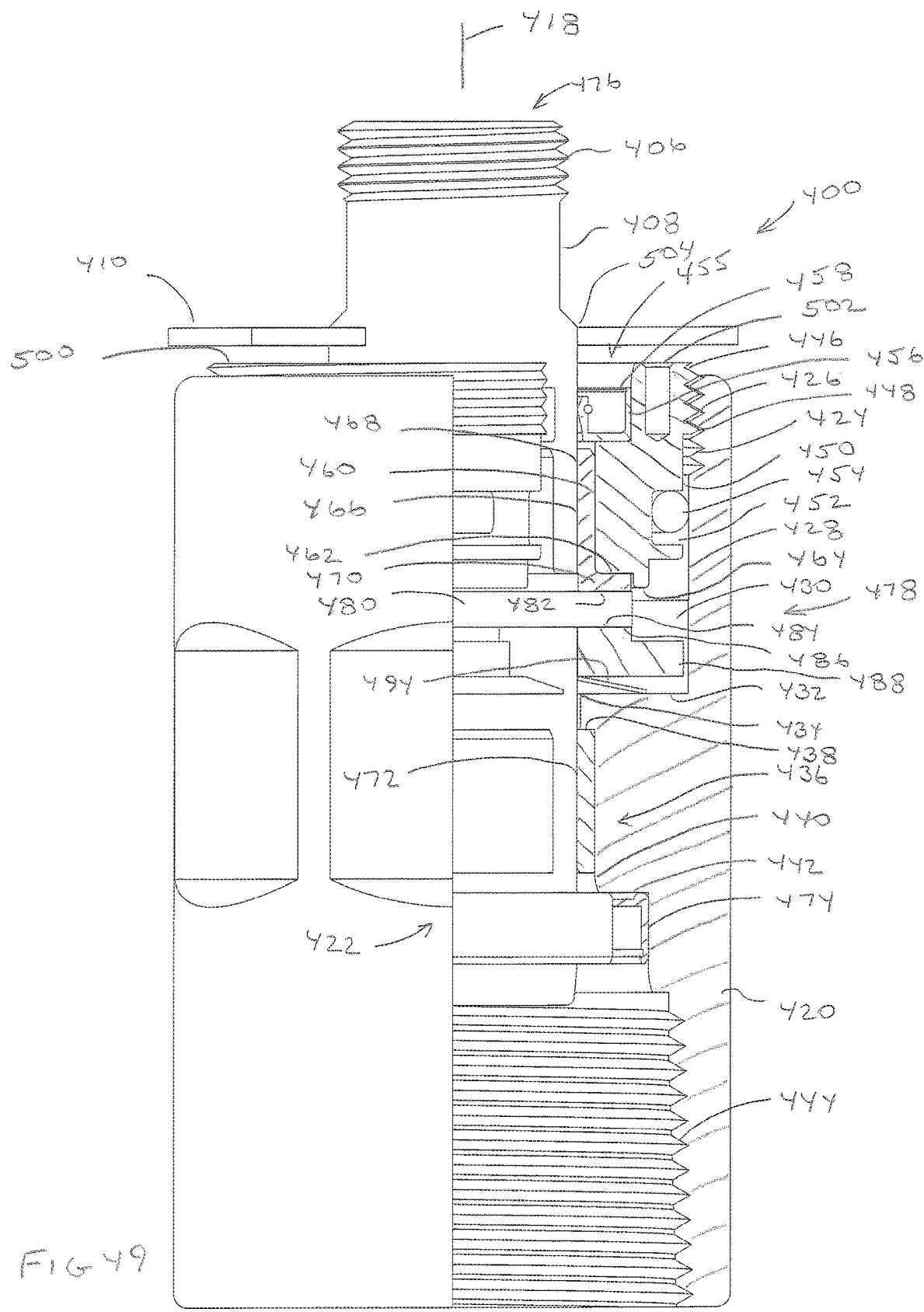

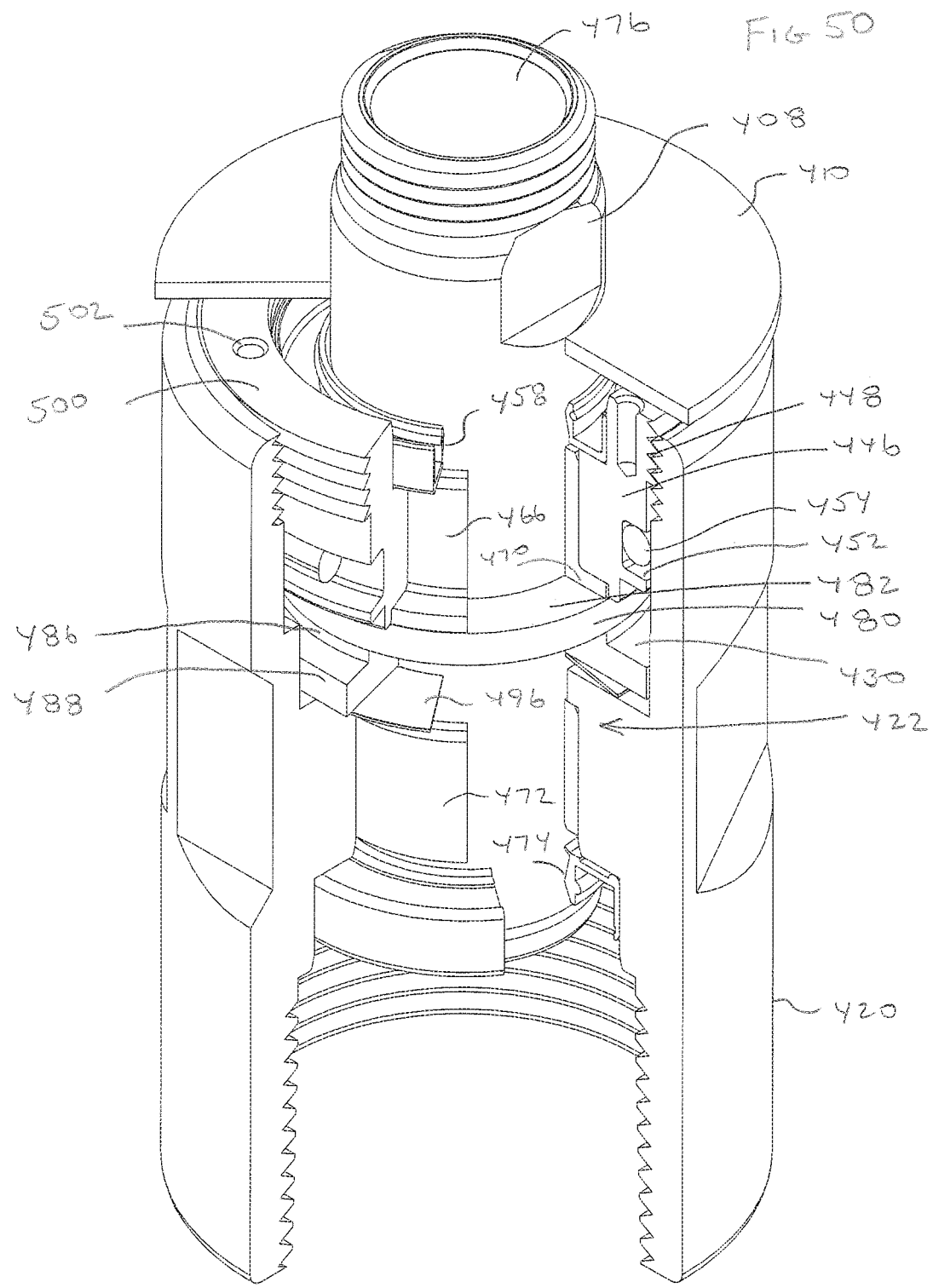

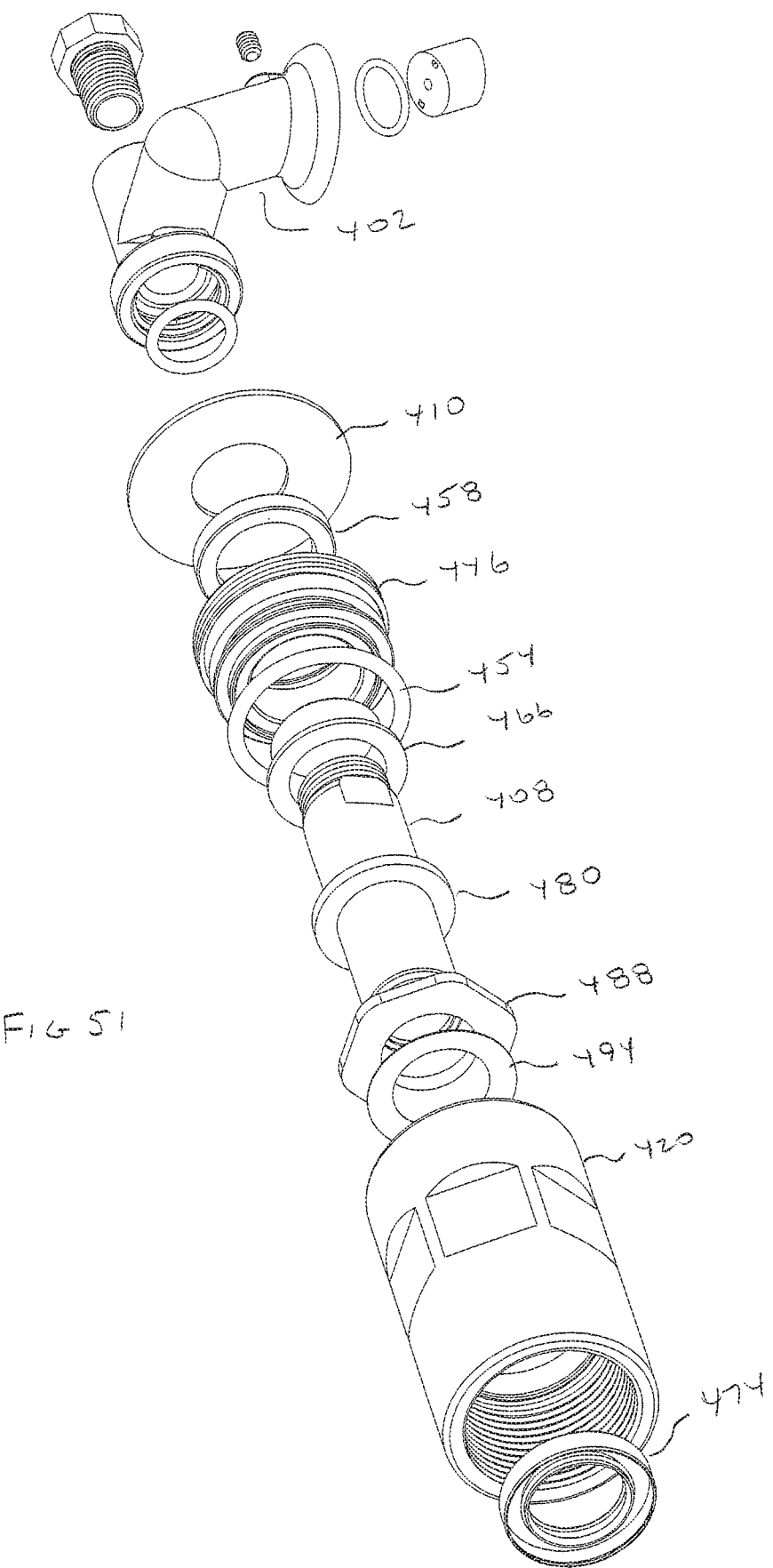

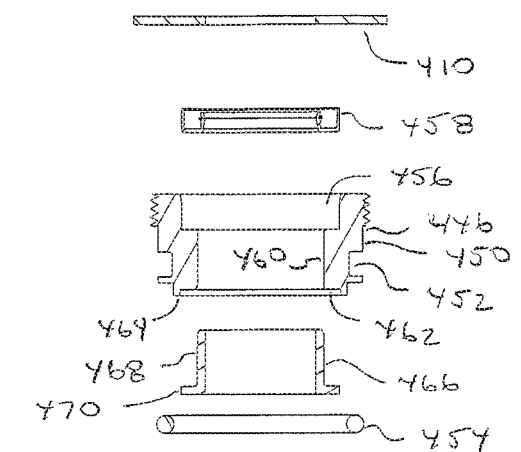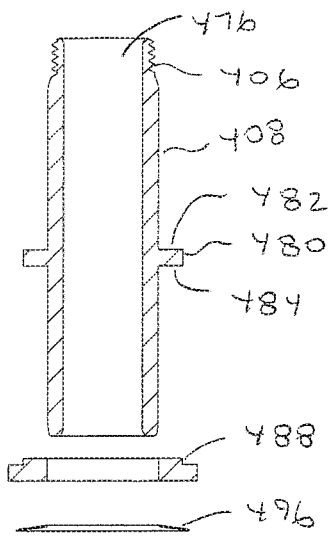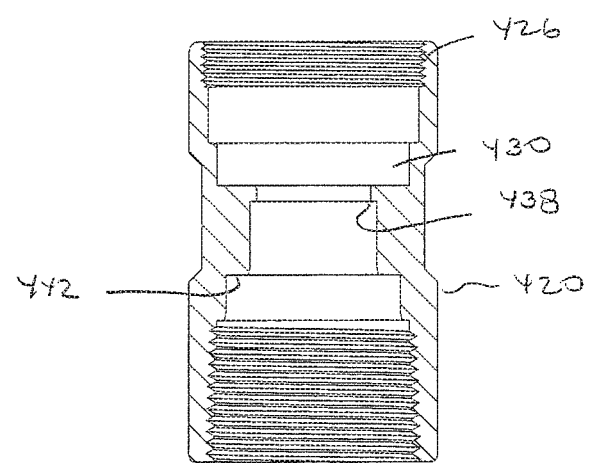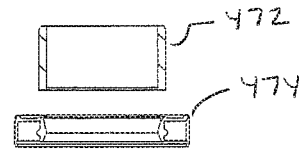
FIG 52

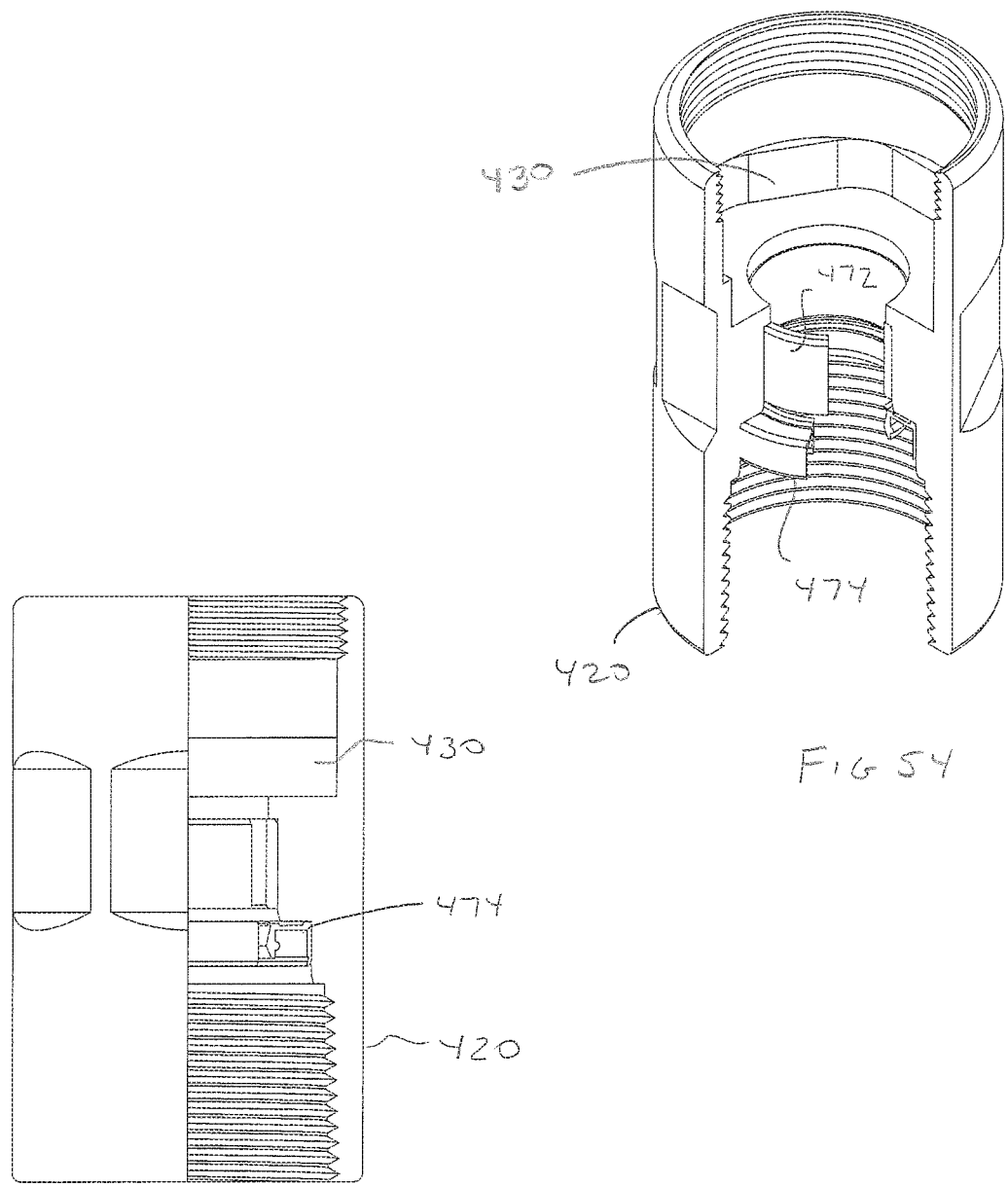

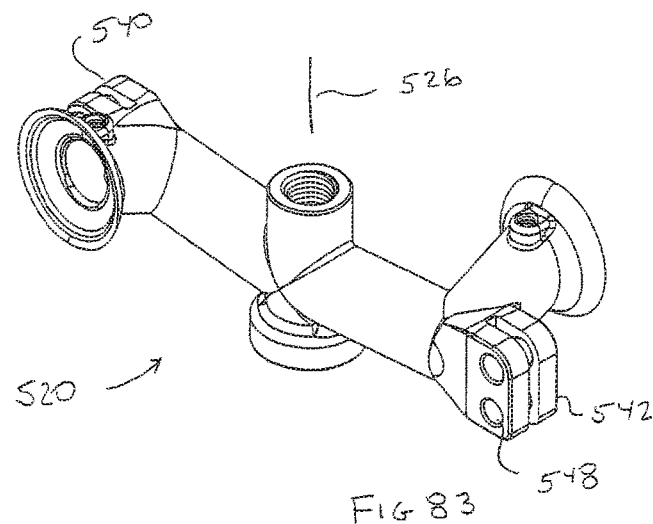
FIG 83
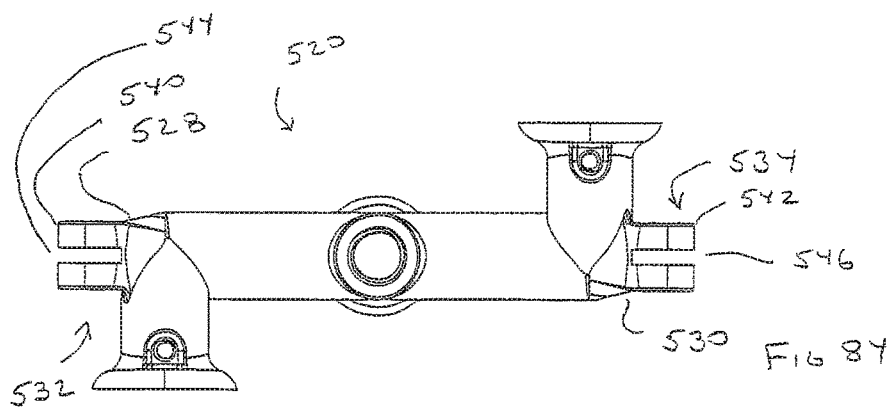
FIG 84
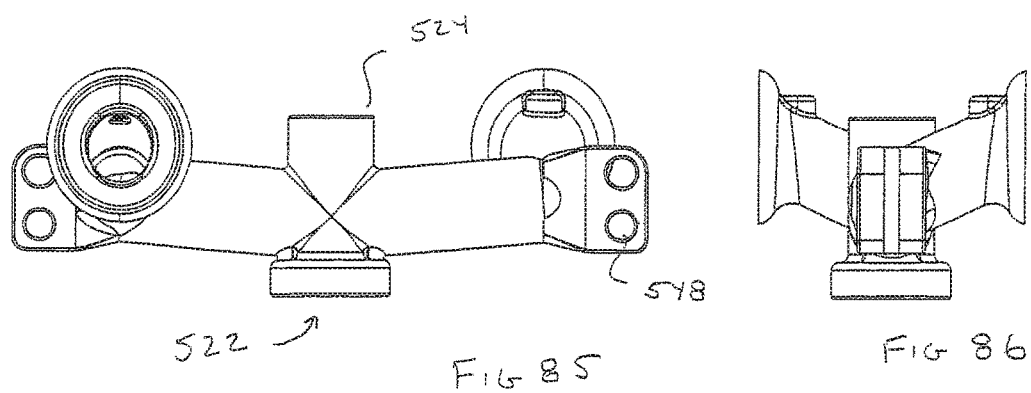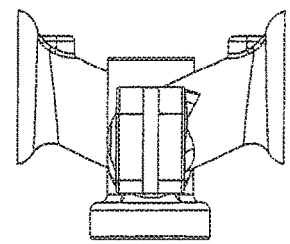
FIG 85 FIG 86

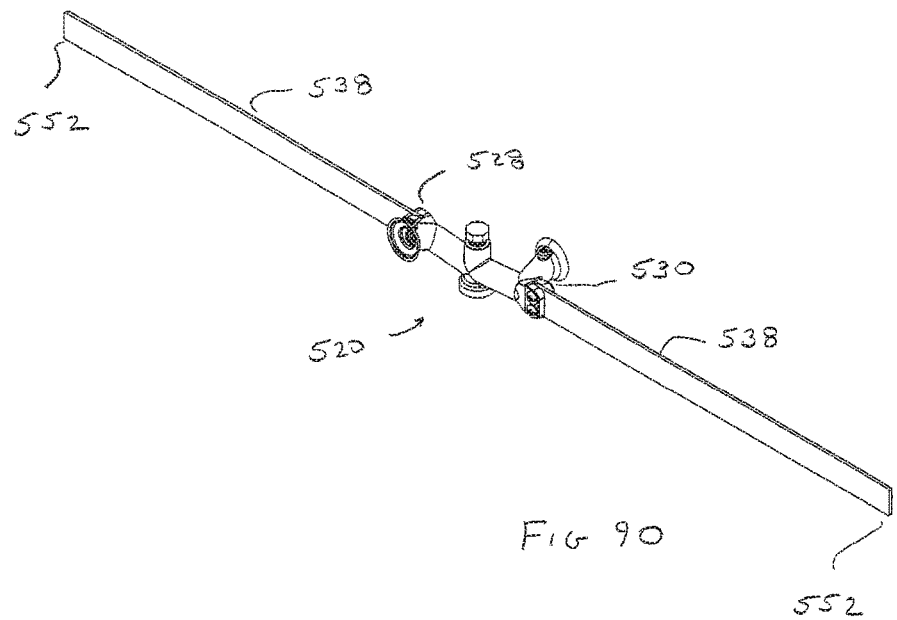
FIG 90
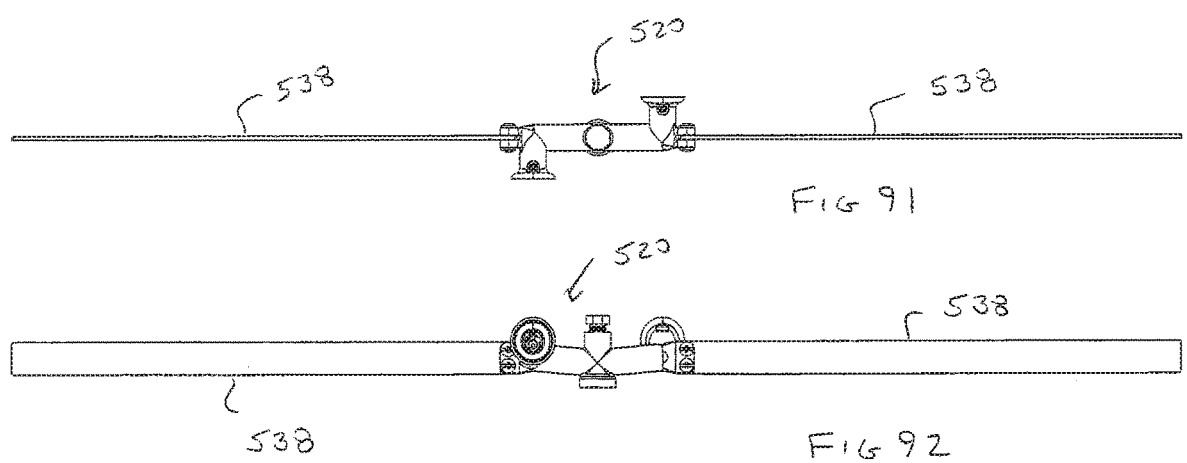
FIG 91
FIG 92

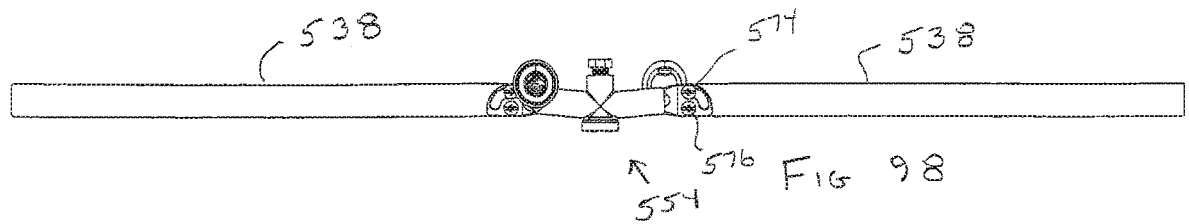
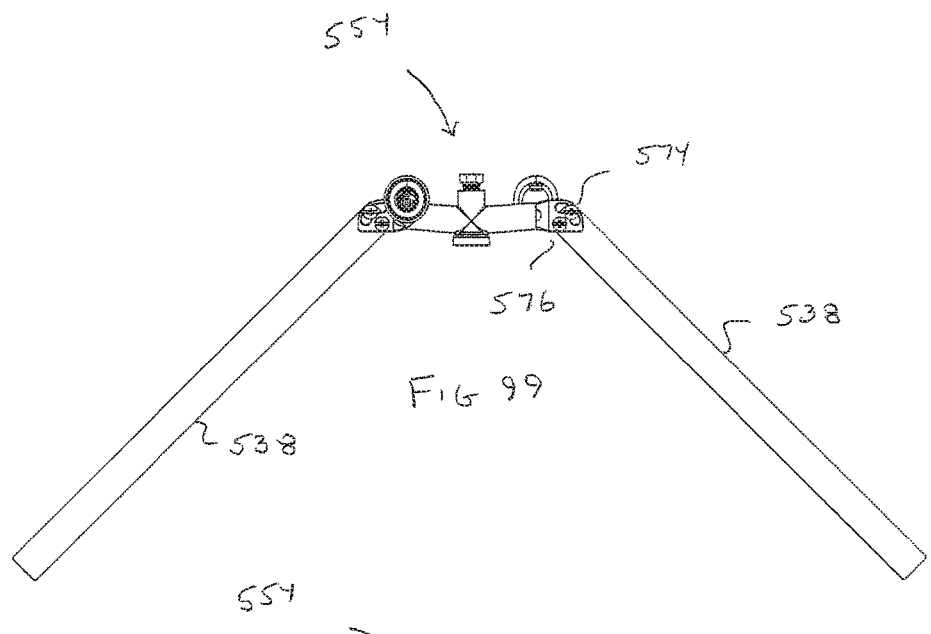
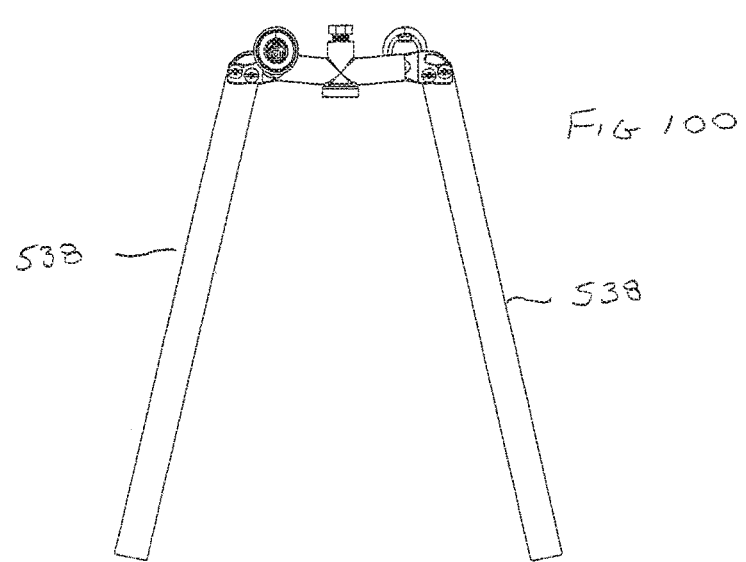

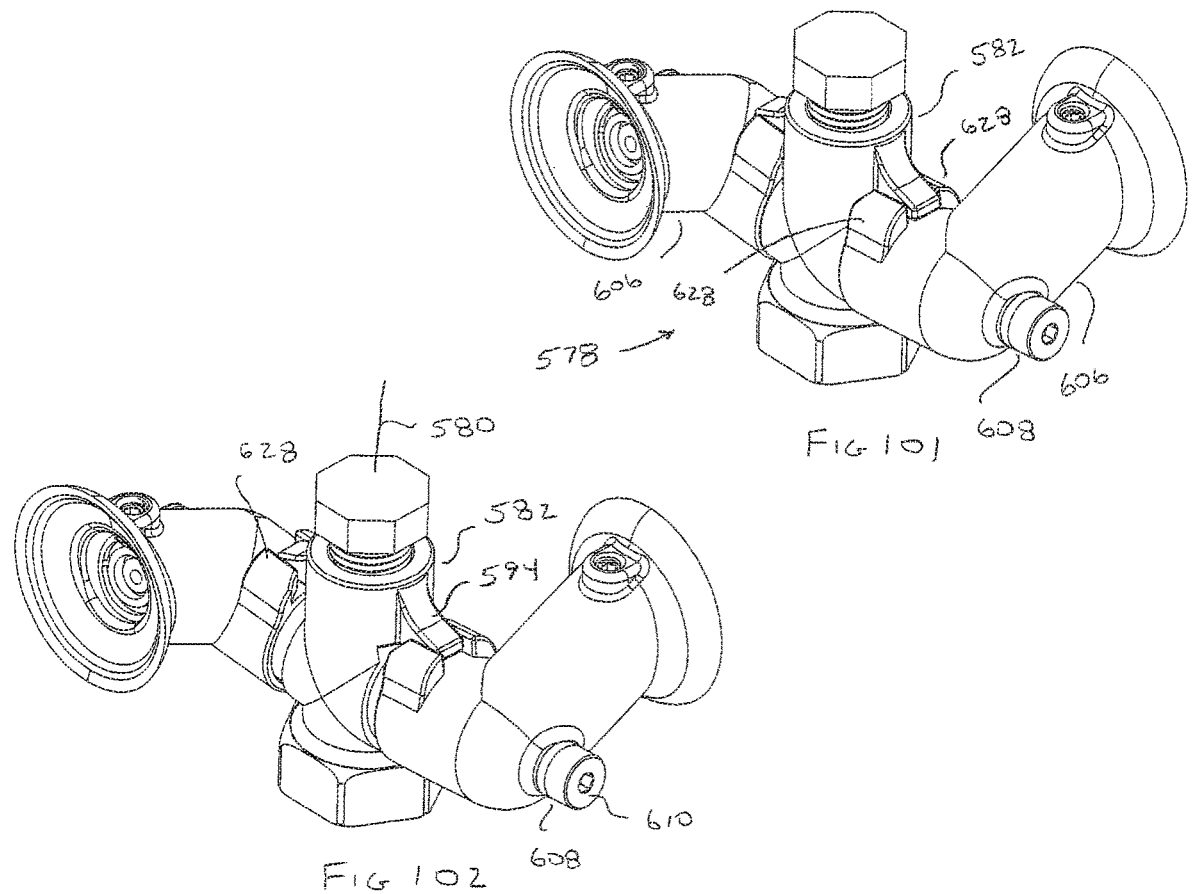
FIG 101
FIG 102
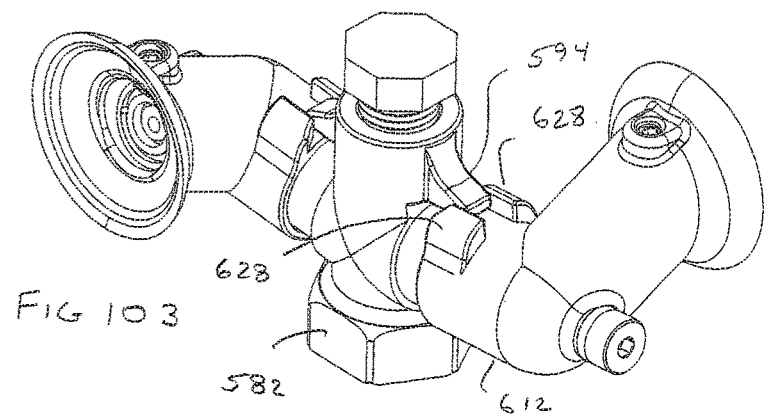
FIG 103

WASTEWATER SPRAY DISTRIBUTION APPARATUS

TECHNICAL FIELD

Exemplary embodiments described herein relate to sewage treatment apparatus. Exemplary arrangements further relate to apparatus for spray distribution of treated wastewater onto ground surfaces.

BACKGROUND

The proper treatment and disposal of human waste is important to prevent the spread of disease and to protect the environment. Sewage treatment plants operate to treat such waste through physical, chemical, biological and/or radiation treatment methods. Such processes have the goal of separating solid material in the waste from the water and neutralizing harmful biological and other materials.

Effective treatment processes produce effluent wastewater that is sufficiently free of harmful materials that it can be safely returned to the environment. Often with individual, residential or small commercial sewage treatment plants, this effluent wastewater is sprayed on top of the ground. The water provides irrigation for plant life and is further cleansed by passing through vegetation and downward through the soil to the aquifer.

The spraying of such effluent wastewater onto the ground may have limitations and present challenges. In cold climates the water may freeze in the sprayers preventing the discharge of the wastewater. This can stop system operation. In addition ice formation can cause damage to the apparatus used to spray the wastewater. Some treatment systems may malfunction or be subject to undesirable conditions that cause abrasive particulate material such as sand to enter the interior area of the sprayers. This may cause wear, clogging or other damage to the sprayers. In addition spray devices, particularly those that are worn or damaged, can fail to provide the desired uniform distribution of the water spray which may impede the effectiveness of the desired irrigation function and impede the desired soil migration and purification functions.

Wastewater spray distribution apparatus may benefit from improvements.

SUMMARY OF DISCLOSURE

Exemplary embodiments described herein provide a wastewater spray distribution apparatus and system that provides improved resistance to problems that result from operation in freezing temperatures. Improved operation and resistance to damage due to infiltration of contaminants is also provided by the described embodiments. Exemplary arrangements also provide for readily changing nozzles and manifolds to achieve spray distribution tailored to the particular system requirements. Control capabilities are also provided to achieve reliable and improved operation.

Further features and capabilities of exemplary embodiments are described in the following Detailed Description and the appended claims.

BRIEF DESCRIPTION OF DRAWINGS

FIG. 1 is a schematic view of an exemplary sewage treatment system.

FIG. 2 is a perspective view of an exemplary piping arrangement for the distribution of wastewater produced by the exemplary sewage treatment system.

FIG. 3 is a top plan view of an alternative exemplary piping arrangement for the distribution of wastewater produced by the sewage treatment system.

FIG. 4 is a side view of an exemplary vertically extending header pipe and water distribution sprayer in connection with an exemplary piping arrangement.

FIG. 5 is a top schematic view of an exemplary perforated distribution container arrangement used in connection with an exemplary wastewater distribution arrangement.

FIG. 6 is a side schematic view of the exemplary perforated distribution container shown in FIG. 5.

FIG. 7 is an isometric view of an exemplary wastewater distribution sprayer.

FIG. 8 is an isometric partial cutaway view of the distribution sprayer shown in FIG. 7.

FIG. 9 is a partial cutaway side view of the distribution sprayer shown in FIG. 7.

FIG. 10 is an exploded perspective view of the exemplary distribution sprayer shown in FIG. 7.

FIG. 11 is an exploded side view of the exemplary distribution sprayer shown in FIG. 7.

FIG. 12 is an exploded side cross-sectional view of the exemplary distribution sprayer shown in FIG. 7.

FIG. 17 is a top view of an exemplary upper seal used in the exemplary distribution sprayer.

FIG. 18 is a transverse cross-sectional view of the upper seal shown in FIG. 17.

FIG. 19 is an isometric view an exemplary manifold having a single outlet nozzle used in connection with an exemplary sprayer.

FIG. 20 is a side view of the manifold shown in FIG. 19.

FIG. 21 is a top view of the manifold shown in FIG. 19.

FIG. 22 is a front view of the manifold shown in FIG. 19.

FIG. 23 is an isometric view of an exemplary distribution sprayer with the manifold including a pair of outlet nozzles.

FIG. 24 is a top view of the manifold shown in connection with the sprayer in FIG. 23.

FIG. 45 is a front view of a further alternative distribution sprayer.

FIG. 46 is a front top perspective view of the alternative distribution sprayer shown in FIG. 45.

FIG. 47 is a front view of a further alternative distribution sprayer.

FIG. 48 is a front top perspective view of the alternative distribution sprayer shown in FIG. 47.

FIG. 49 is quarter cross section view of the base of the exemplary distribution sprayer shown in FIGS. 45-47.

FIG. 50 is a front top right perspective view of the base shown in FIG. 49.

FIG. 51 is an exploded perspective view of the base and manifold of the distribution sprayer shown in FIG. 45.

FIG. 52 is a side cross-sectional exploded view of the base shown in FIG. 49.

FIG. 53 is a partially sectioned view of the body of the base shown in FIG. 49 with the inner bushing and inner seal installed therein.

FIG. 54 is a front top perspective view of the body shown in FIG. 53.

FIG. 83 is a top right perspective view of an alternative manifold including a pair of disposed nozzles directed in opposite directions and including flap engaging projections.

FIG. 84 is a top view of the manifold shown in FIG. 83.

FIG. 85 is a front side view of the manifold shown in FIG. 83.

FIG. 86 is a right side view of the manifold shown in FIG. 83

FIG. 90 is a front top right perspective view of an assembly including the manifold shown in FIG. 83 with a pair of flaps attached thereto.

FIG. 91 is a top view of the assembly shown in FIG. 90.

FIG. 92 is a front view of the assembly shown in FIG. 90.

FIG. 98 is a side view of an assembly including the manifold of FIG. 93 with a pair of opposed flaps attached thereto and positioned in a horizontal direction.

FIG. 99 is a side view of the assembly similar to FIG. 98 but with the flaps positioned in a partially angled downward position.

FIG. 100 is a side view of the assembly similar to FIG. 98 but with the flaps positioned and a fully downward position.

FIG. 101 is a front top right perspective view of an alternative manifold that includes a pair of opposed radially outwardly adjustable arms, with the arms positioned in a fully inward position.

FIG. 102 shows the manifold of FIG. 101 with each of the arms in an intermediate radially outward position.

FIG. 103 shows the manifold of FIG. 101 with each of the arms in a fully radially outward position.

FIG. 122 is a left top perspective view of the arm shown in FIG. 120.

FIG. 123 is a left side view of the exemplary arm shown in FIG. 120.

FIG. 124 is a front view of the exemplary arm shown in FIG. 120.

FIG. 125 is a right side perspective view of the exemplary arm shown in FIG. 120.

FIG. 126 is a bottom front perspective view of the exemplary arm shown in FIG. 120.

FIG. 127 is a bottom view of the exemplary arm shown in FIG. 120.

FIG. 128 is a bottom left perspective view of the arm shown in FIG. 120

FIG. 129 is a front view of an exemplary nozzle usable in the alternative manifold shown in FIG. 101.

FIG. 130 is a top side view of the nozzle shown in FIG. 129.

FIG. 131 is a bottom side view of the nozzle shown in FIG. 129.

FIG. 132 is a left side view of the nozzle shown in FIG. 129.

FIG. 133 is a right side view of the nozzle shown in FIG. 129.

Figure 129:
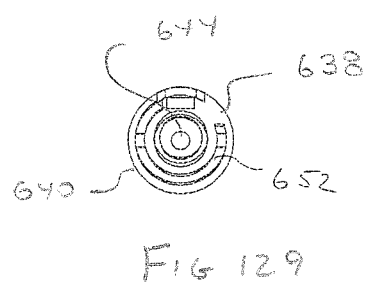
Figure 133:
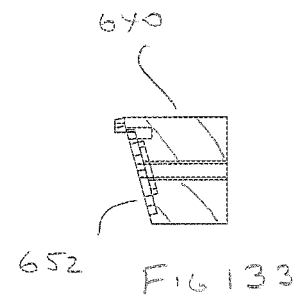
Figure 134:
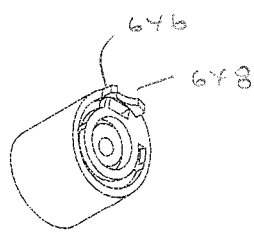
Figure 131:
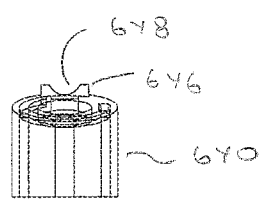

FIG. 134 is a front left a bottom perspective view of the nozzle shown in FIG. 129.

Figure 135:
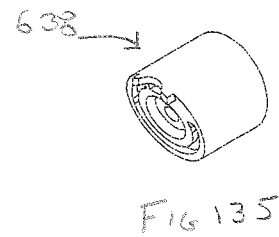
Figure 132:
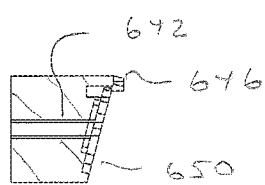

FIG. 135 is a top right perspective view of the nozzle shown in FIG. 129.

Figure 136:
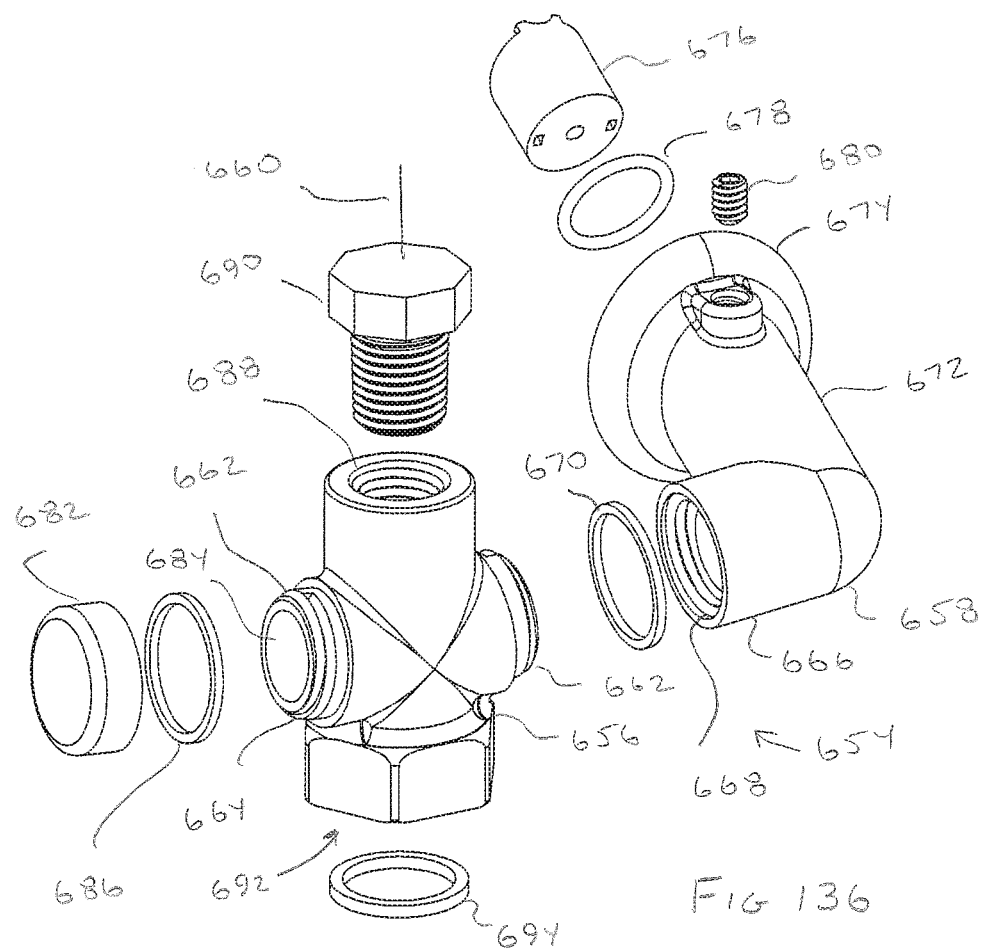

FIG. 136 is a front top perspective exploded view of an alternative manifold including one manifold arm and a plug arm.

Figure 137:
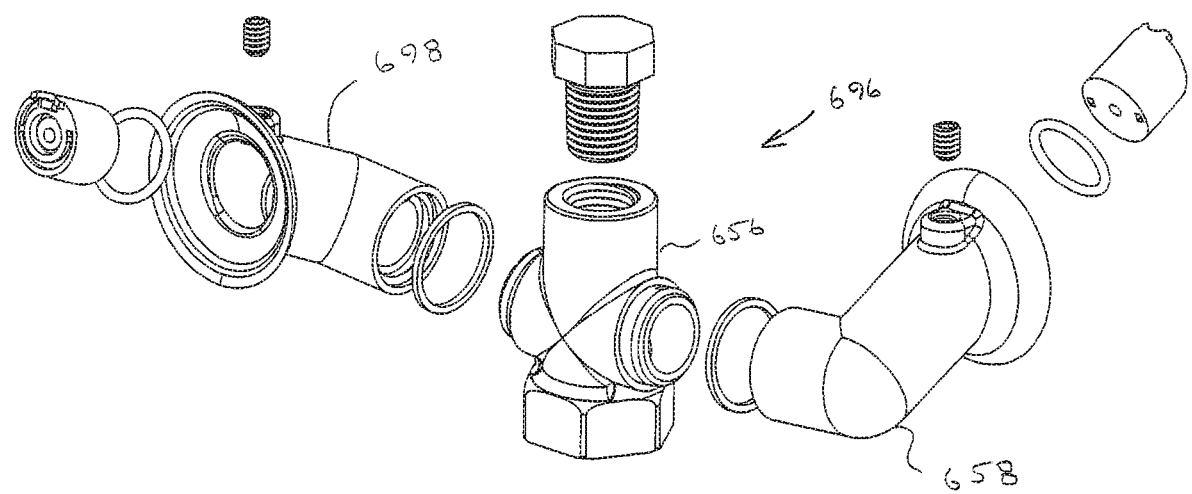

FIG. 137 is an alternative manifold similar to the manifold shown in FIG. 136 but with a pair of opposed arms.

Figure 138:
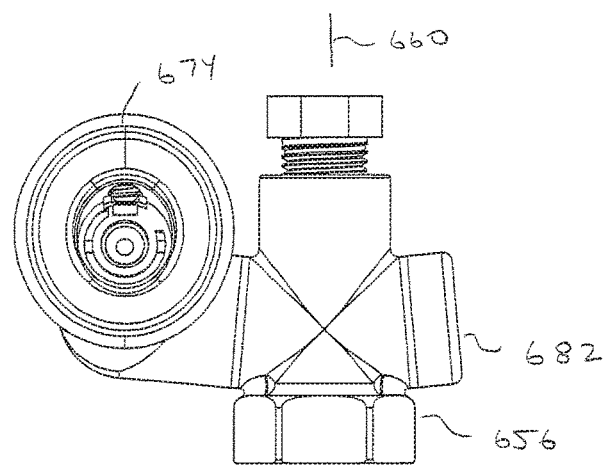

FIG. 138 is a rear view of the manifold shown in FIG. 136.

Figure 139:
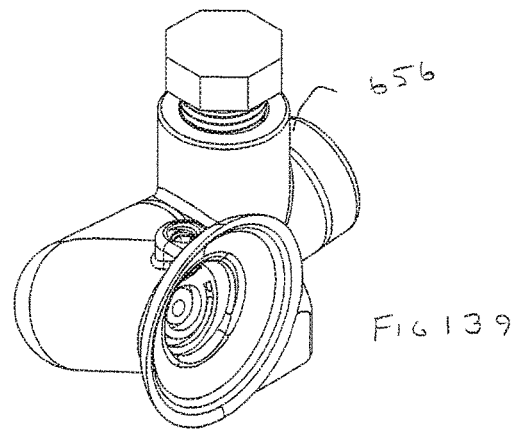

FIG. 139 is a top rear left perspective view of the manifold shown in FIG. 138.

Figure 140:
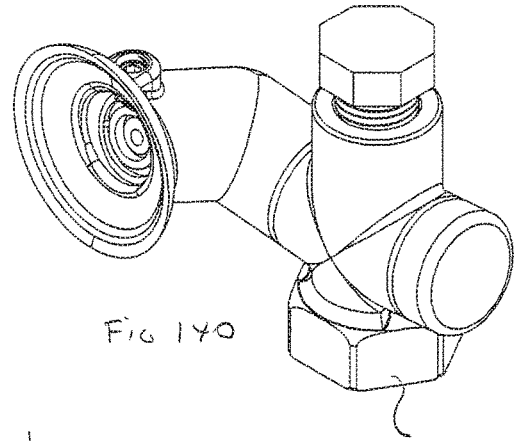

FIG. 140 is a top rear right perspective view of the manifold shown in FIG. 138.

Figure 141:
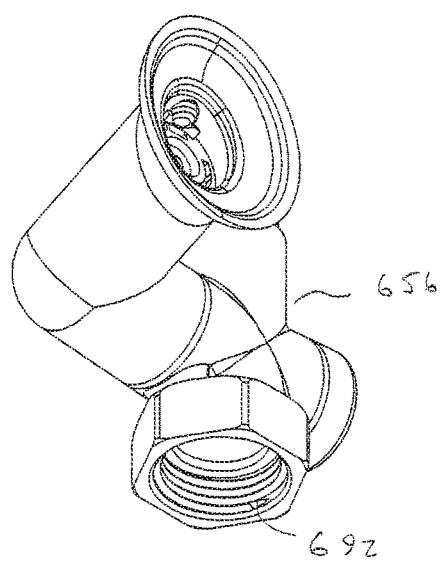

FIG. 141 is a bottom rear left perspective view of the manifold shown in FIG. 138.

Figure 142:
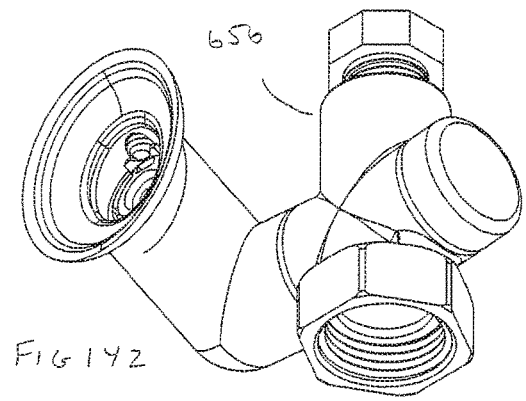

FIG. 142 is a bottom rear right perspective view of the manifold shown in FIG. 138.

Figure 143:
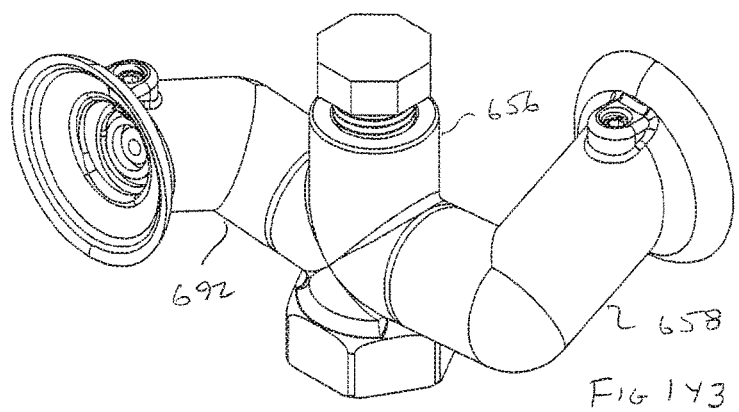

FIG. 143 is a front top right perspective view of the manifold shown in FIG. 137.

Figure 144:
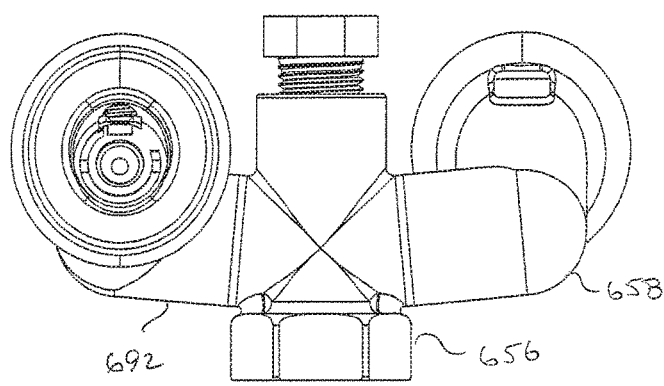

FIG. 144 is a front view of the manifold shown in FIG. 137.

Figure 145:
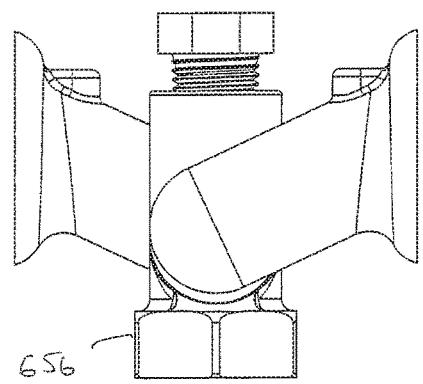

FIG. 145 is a side view of the manifold shown in FIG. 137.

Figure 146:
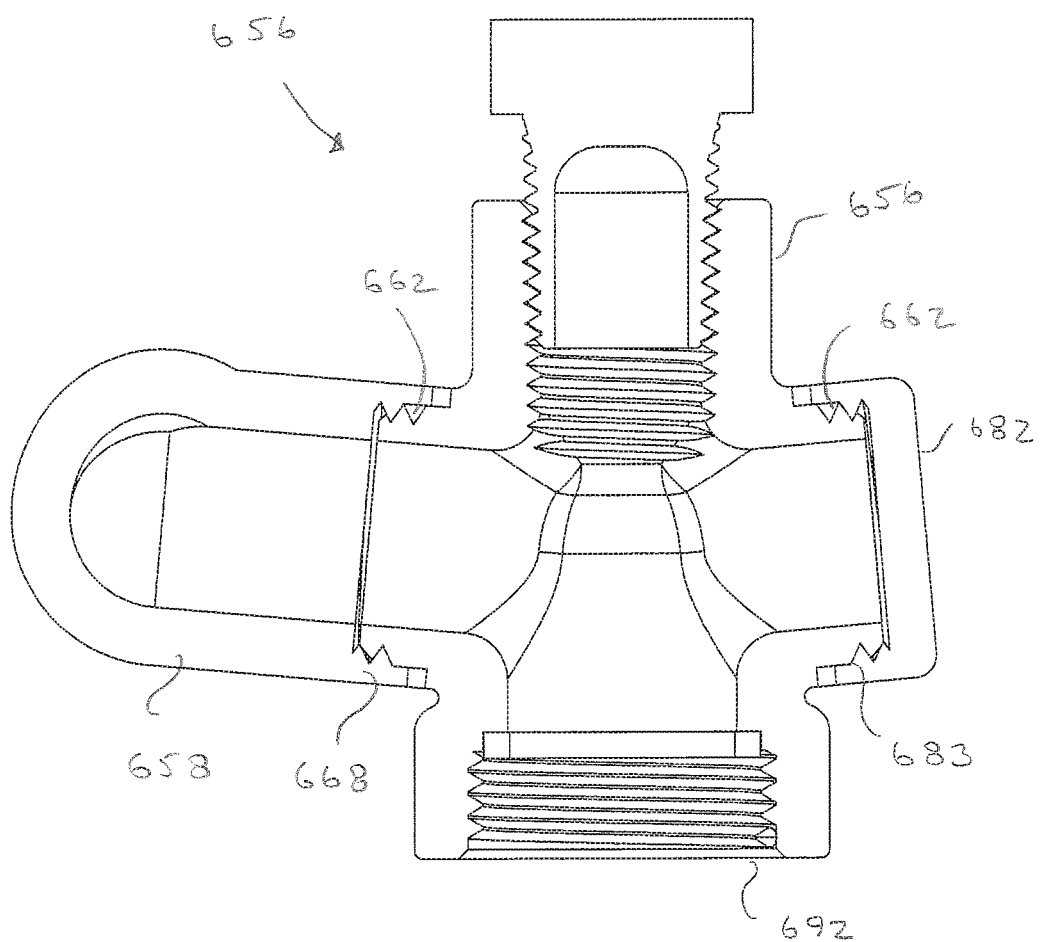

FIG. 146 is a rear axial section view of the manifold shown in FIG. 136.

Figure 147:
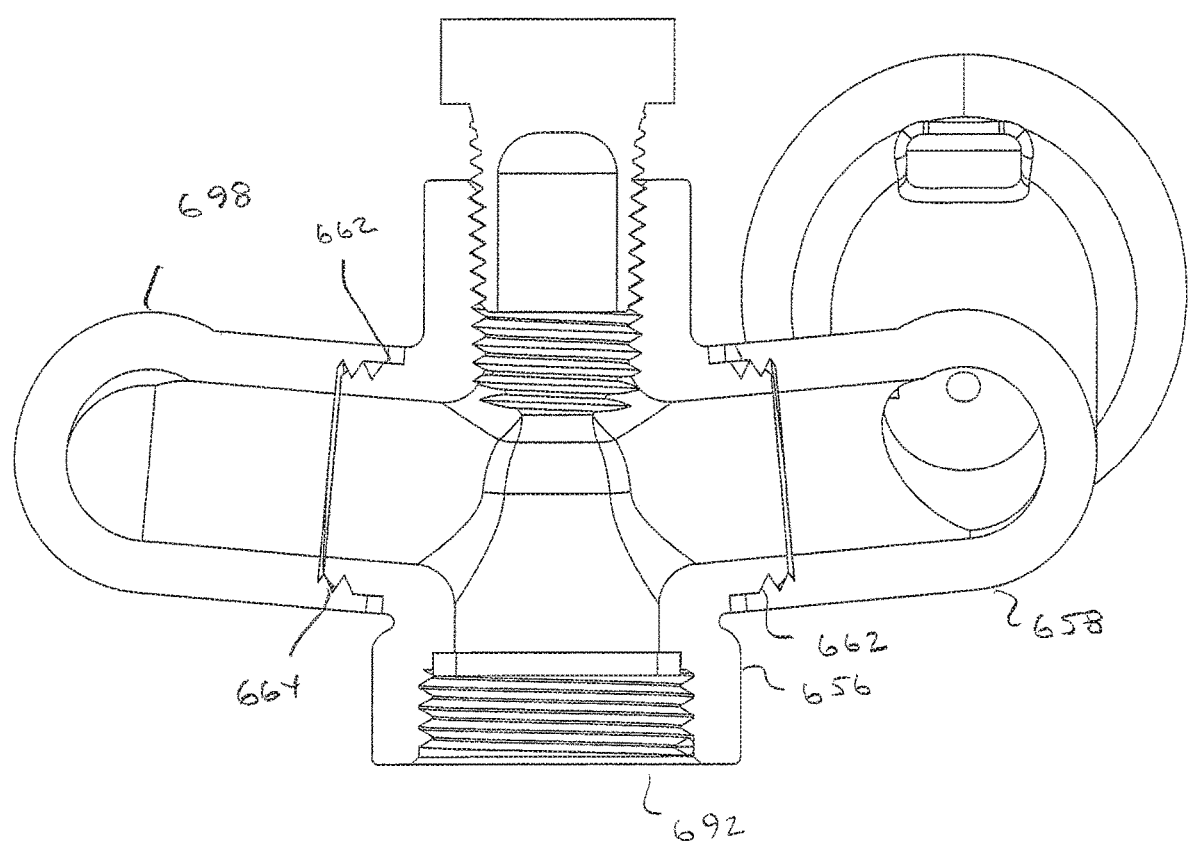

FIG. 147 is a front axial section view of the manifold shown in FIG. 136.

Figure 148:
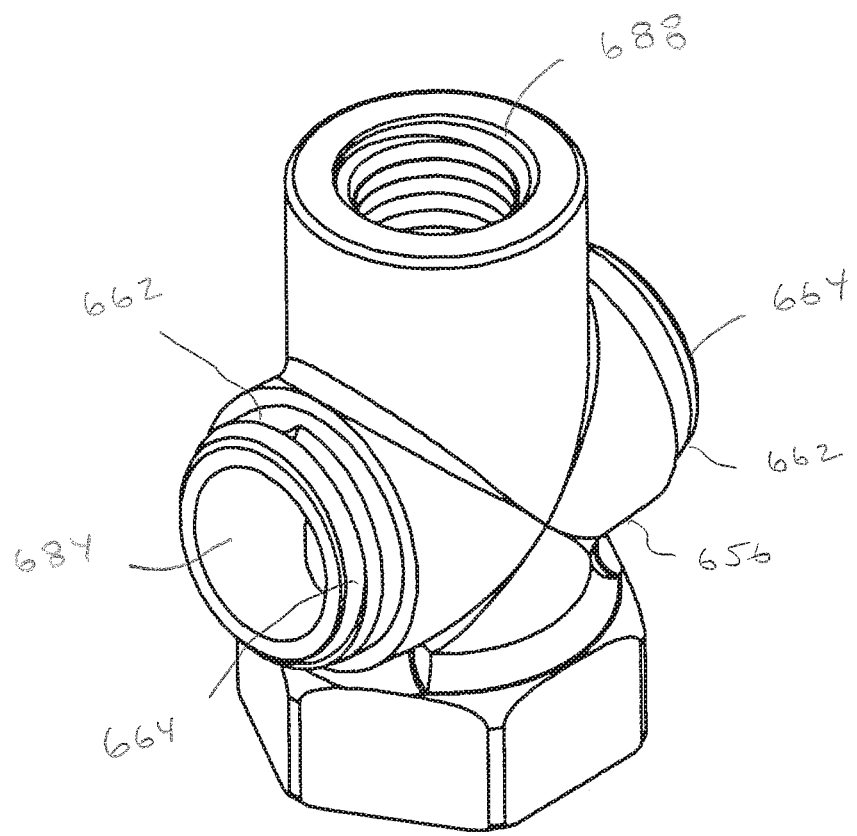

FIG. 148 is a top left perspective view of the head portion of the manifolds shown in FIGS. 136 and 137.

Figure 149:
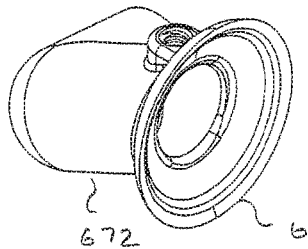

FIG. 149 is a front top left perspective view of an arm of the manifolds shown in FIGS. 136 and 137.

Figure 150:
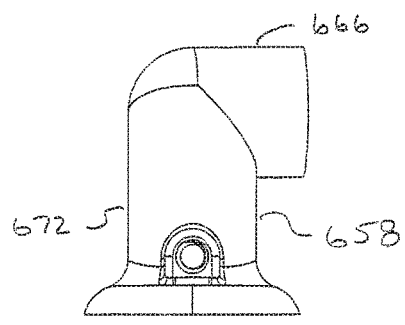

FIG. 150 is a top view of the arm shown in FIG. 149.

Figure 151:
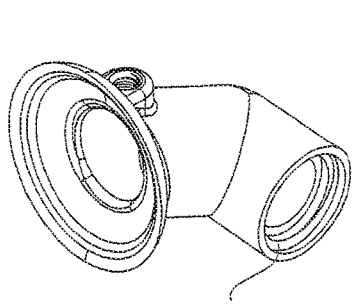

FIG. 151 is a top right perspective view of the arm shown in FIG. 149.

Figure 152:
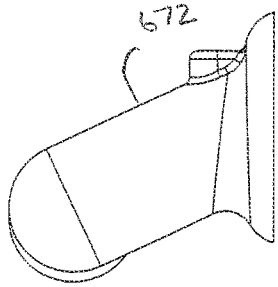

FIG. 152 is a left side view of the arm shown in FIG. 149.

Figure 153:
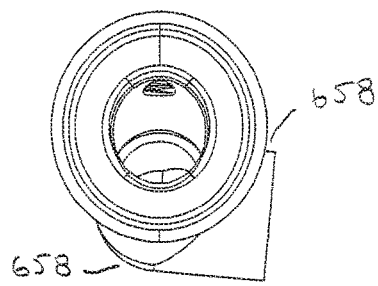

FIG. 153 is a front view of the arm shown in FIG. 149.

Figure 154:
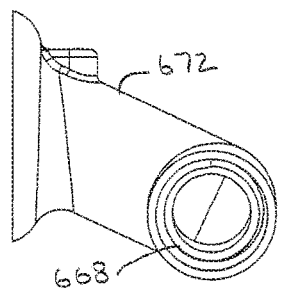

FIG. 154 is a right side view of the arm shown in FIG. 149.

Figure 155:
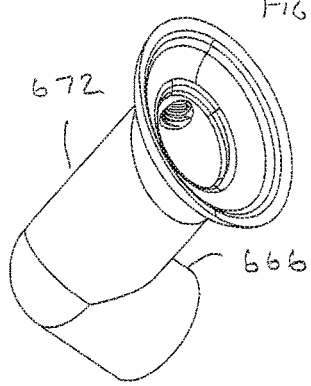

FIG. 155 is a bottom left perspective view of the arm shown in FIG. 149.

Figure 156:
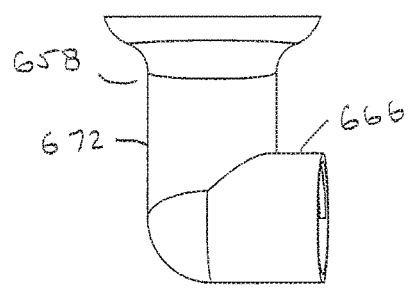

FIG. 156 is a bottom view of the arm shown in FIG. 149.

Figure 157:
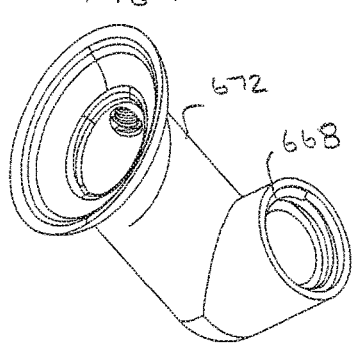

FIG. 157 is a bottom right perspective view of the arm shown in FIG. 149.

DETAILED DESCRIPTION

Referring now to the drawings and particularly to FIG. 1 there is shown therein an exemplary sewage treatment system for treating human waste generally indicated 10. The exemplary system 10 is configured for use in connection with treating human waste produced in a single residential unit or a small commercial facility. However, it should be understood that the features and relationships discussed herein may be used in connection with different types of systems with different capabilities.

In the exemplary arrangement the waste material is received through an inlet 12 in a pretreatment tank 14. In the exemplary arrangement the pretreatment tank 14 provides a quiescent internal environment which enables solids and liquids to separate through settling action. Pretreatment tank 14 includes a cylindrical riser 16 which bounds an opening 18 through which the interior of the pretreatment tank may be accessed for cleanout and other purposes. A removable lid 20 is normally installed to close the opening 18 when the system is in operation. In the exemplary arrangement the pretreatment tank 14 and the lid 20 are comprised of fiberglass resin composite or other plastic material that is resistant to attack and corrosion from the material that is being treated. Other tanks used in the exemplary system may be comprised of similar plastic material. However in other embodiments other materials may be used.

In exemplary arrangements the pretreatment tank 14 as well as other tank components which are part of the system and that are hereinafter discussed, are buried below ground level which is generally indicated 22. In the exemplary arrangement lid 20 and the other removable lids for the tanks, are accessible from above ground level so that they can be readily removed for cleanout or other maintenance activities. Further in exemplary arrangements pretreatment tank 14 and the other tank components are positioned below ground level so that the material therein extend below a frost line 24. In exemplary arrangements the frost line 24 is a level below ground level at which the temperature does not fall below the freezing temperature of water. As can be appreciated, the level below ground at which the frost line 24 is located will vary based on the climate in the area in which the system is installed. As can be appreciated in areas where the frost line is further below ground level than as represented in FIG. 1, the tanks of the system may be buried deeper below ground level and the risers may be longer or multiple risers may be stacked so that the openings thereof are accessible on the surface. Of course these approaches are exemplary and in other embodiments heating devices or other approaches may be utilized for purposes of assuring that the system is not subject to becoming inoperable due to freezing of liquid therein.

In the exemplary arrangement the top level of the liquid that is separated in the pretreatment tank rises as more material is introduced to the inlet 12 of the tank as the system is started with the tank in an empty condition. The liquid in the pretreatment tank rises in a standpipe 26 and flows out of the pretreatment tank 14 by gravity through an outlet 28 once the top of the liquid reaches the level of the outlet.

The outlet 28 of the pretreatment tank is fluidly connected to an inlet 30 of an aeration tank 32. The aeration tank 32 is a generally cylindrical tank which has positioned therein an annular funnel-shaped baffle 34. The baffle 34 has an open bottom end 36. The aeration tank 32 has in operative connection therewith, an air pump 38. Air pump 38 is connected to an air manifold 40. The air manifold is connected to a plurality of air lines 42 which have air outlets near the bottom inside surface of the aeration tank 32. In the exemplary arrangement the air outlets are positioned within the tank outside the periphery of the baffle 34 and have diffusers that are operative to provide a large number of relatively small air bubbles within the liquid.

In the exemplary arrangement the air pump 38 receives power that is delivered from an electrical enclosure 44. The electrical enclosure 44 includes circuitry that is used for controlling the air pump and other components of the system as later discussed. The enclosure is in operative connection with a control panel 46. The exemplary control panel 46 includes input devices and output devices. The output devices are operative to indicate the condition of various devices within the system and the input devices are operable to receive user inputs that are used to control the electrical devices. In an exemplary arrangement the exemplary enclosure, control panel and air pump are configured to be positioned in a riser 48 that can be selectively accessed and closed by a lid 50. Of course it should be understood that this approach is exemplary and in other embodiments other approaches may be used.

In the exemplary arrangement the material from the pretreatment tank 14 enters the aeration tank through the inlet 30 and is initially on the outside of baffle 34. The air that is introduced to the liquid through the air lines 42 is operative to oxygenate the waste liquid. This facilitates the growth of aerobic bacteria. The aerobic bacteria feed on the organic waste and decompose it. The oxygenated material and bacteria enter the interior area of the baffle 34 through the open bottom baffle end 36. Solid material within the interior of the baffle falls downward toward the bottom of the tank as clarified liquid moves upward within the baffle 34.

The clarified liquid within the baffle 34 enters a standpipe 52. From the standpipe 52 the material enters an aeration chamber 54. An air line 56 that is fluidly connected to the air manifold 40 delivers further air and oxygen into the material in the chamber 54. This replenishes the oxygen within the material and further facilitates the clarifying action of the aerobic bacteria.

Chamber 54 is fluidly connected to an irradiation chamber 58. Chamber 58 houses at least one UV radiation source 60. In exemplary arrangements UV radiation source 60 comprises one or more UV light tubes that are operative to output high levels of UV-C radiation. The UV-C radiation is operative to kill bacterial and other biological organisms in the liquid that passes through the irradiation chamber 58. The action of the UV radiation disinfects the clarified material. The liquid in the irradiation chamber 58 flows by gravity to an outlet 62. Of course it should be understood that the use of UV radiation as a disinfecting method in the treatment system is exemplary, and in other embodiments ozonation or other and/or additional disinfecting methods and equipment may be used.

The exemplary aeration tank 32 includes a further riser 64 which is closable by a removable lid 66. In the exemplary arrangement the riser is positioned so that the UV radiation sources and air manifold 40 are generally accessible through the riser for purposes of servicing and replacing such items.

The treated liquid that passes out of the aeration tank 32 flows by gravity from the outlet 62 to an inlet 68 of a filter tank 70. In the exemplary arrangement the treated liquid further undergoes settling action in the quiescent environment within the interior of the filter tank. In alternative arrangements the filter tank may include a disinfecting UV-C radiation source. The disinfecting radiation source in the filter tank may be provided as an alternative to, or in addition to, the radiation source in the aeration tank. In the exemplary arrangement the liquid within the filter tank passes upwardly through a standpipe 72. In the exemplary arrangement the standpipe 72 is fluidly connected to a filter 74. The exemplary filter 74 includes a plurality of stacked plate filter elements. The stacked filter elements are operative to remove remaining solids in the treated material. Of course it should be understood that in other embodiments other types of filtration media and filtration devices may be used.

In the exemplary arrangement the filter tank 70 includes a riser 76. The opening bounded by the riser is closable by a removable lid 77. In the exemplary arrangement the riser is configured to provide access to the interior area of the filter tank for purposes of replacing the filters, cleaning out the tank interior or performing other service activities.

In the exemplary treatment arrangement the filtered liquid that has passed upwardly through the filter 74 leaves the filter tank 70 through an outlet 78. Liquid from the outlet 78 passes by gravity to an inlet 80 of a sewage treatment water effluent tank 82. The effluent water tank 82 serves as a storage tank for water that has been clarified and disinfected through operation of the sewage treatment system. In the exemplary arrangement a submersible pump 84 is positioned in the interior area of the water tank 82. The pump 84 is in operative connection with an outlet line 86. The exemplary outlet line 86 extends upwardly within the water tank 82 adjacent to an area within riser 88. This arrangement facilitates removal of the pump 84 and the attached outlet line 86 through the opening in riser 88. The riser 88 is selectively closed by a lid 90. The exemplary water tank 82 further includes a riser 92 which is selectively closable by a lid 94. In exemplary arrangement the riser 92 is accessible to provide access to the area of the inlet 80 to the water tank. Of course it should be understood that this arrangement is exemplary and other embodiments other arrangements may be used.

The exemplary outlet line 86 is connected to a water tank outlet 96. The water tank outlet is surrounded by a sheath 98. The sheath 98 is configured to isolate the outlet 96 and other connected piping from the surrounding soil. The sheath also operates in exemplary embodiments to provide a layer of air adjacent to the water piping. Insulating materials which prevent heat transfer may also be included in the sheath. The surrounding layer of air and/or other types of materials provides insulation that reduces the risk that the water in the pipe will be subject to freezing. The sheath in exemplary arrangements is comprised of plastic. This approach is used with the distribution piping to the sprayers used in exemplary embodiments to distribute the effluent water from the water tank 82 as later discussed.

The exemplary water tank 82 further includes level sensors 100 positioned therein. Level sensors 100 are in operative connection with the control circuitry of the treatment system. The exemplary level sensors 100 are operative to detect the level of water currently held in the water tank 82. The control circuitry is operative responsive to detecting that the water level has risen to a particular level to cause the pump 84 to operate to discharge the water from the tank to the system of piping headers and sprayers like those later discussed. The exemplary level sensors further enable detecting when the level in the tank has fallen to a further level which in the exemplary arrangement indicates that most of the water within the tank 82 has been discharged by the pump. Responsive to detecting water at this lower level, the control circuitry is operative to cause the pump 86 to discontinue pumping action and shut off. In exemplary embodiments different types of control systems, level sensors and pumps may be utilized.

In exemplary embodiments the water tank outlet 96 is in operative connection with a water distribution system 102, which is shown schematically in FIG. 2. In this exemplary arrangement the water tank outlet 96 which receives the water pumped out of the tank through operation of the pump, is connected to a horizontal distribution pipe 104. The horizontal distribution pipe 104 is connected to pipes 106 and 108 which extend generally horizontally and which are disposed from one another a horizontal distance. Pipes 106 and 108 are fluidly connected to respective vertically extending header pipes 110, 112. As represented in FIG. 4, in the exemplary arrangement each distribution header pipe 112 extends vertically and is surrounded by a sheath 114 in a manner like that previously discussed. The exemplary sheath 114 extends above the ground level 22. The exemplary sheath includes a top cap 116 through which the header pipe 112 upwardly extends. In the exemplary arrangement the sheath and top cap are comprised of a suitable plastic material which separates the header pipe from the ground and provides an insulating annular layer of air or other insulation between the outside of the header pipe and the inside of the sheath. Of course this approach is exemplary and in other embodiments other approaches may be used.

In the exemplary arrangement a rotatable water distribution sprayer 118 is attached to the top of the vertically extending header pipe. In the exemplary arrangement the sprayer is operative to rotate responsive to thrust produced by the water that exits through the sprayer to provide a dispersed water distribution pattern. In the exemplary arrangement the vertically extending header pipe and the surrounding sheath are configured to extend continuously vertically from the sprayer 118 and within the ground to below the frost line 24. This is done in exemplary systems to minimize the risk of freezing or other issues in a manner like that later discussed.

As further shown in FIG. 2, in the exemplary water distribution system 102, pipes 106 and 108 are fluidly connected to a generally horizontally extending collection pipe 120. In system 102 collection pipe 120 is fluidly connected to an outlet line 122. In some exemplary arrangements where the distribution pipe 104 and pipes 106 and 108 are all vertically higher than the water tank outlet 96, there is generally no need for a horizontal collection pipe and outlet line. This is because in such exemplary arrangements when the action of the pump 84 is stopped, water in the sprayers and vertically extending header pipes and other pipes will drain back into the water tank 82. However, in other arrangements where the levels of the distribution piping are such that the water that has been pumped toward the one or more sprayers in the system cannot drain by gravity back to the water tank 82, a collection pipe 120 and an outlet line 122 which extend downward and provide for the water to drain from the sprayers and vertically extending header pipes is used.

In some exemplary arrangements the outlet line 122 is fluidly connected to a perforated distribution container generally indicated 124. The exemplary perforated distribution container of an exemplary arrangement is shown in FIGS. 5 and 6. The exemplary perforated distribution container includes a drain water holding tank portion 126. The drain water holding tank portion is fluidly connected to the outlet line 122. A drain valve 128 is operative to selectively either fluidly connect or fluidly separate the outlet line 122 and the other piping and vertically extending headers connected thereto, and the perforated distribution container 124. In some exemplary arrangements the drain valve 128 may be an electrically actuated valve such as a solenoid valve that is in operative connection with control circuitry which also controls the pump and other components of the system. In other exemplary arrangements the drain valve 128 may be operative responsive to fluid pressure or other conditions so that the drain valve is closed when the pump is operated to deliver water to the sprayers, and the drain valve opens responsive to a drop in pressure when pumping action is discontinued. Of course these approaches are exemplary of numerous different approaches that may be used.

In the exemplary arrangement the drain water holding tank portion 126 of the perforated distribution container 124 is connected to a conduit 130. The conduit 130 is connected to an elongated liquid release portion 132. In the exemplary arrangement the release portion 132 includes numerous openings that enable water that passes through the conduit 130 to pass from the release portion into the soil that surrounds the release portion. This enables the water to migrate downwardly through the soil for purification purposes and so that the water can eventually reach the aquifer. The exemplary perforated distribution container 124 further includes a removable lid 134 which closes the tank portion. In the exemplary arrangement the tank portion extends upwardly to ground level. This enables access to the valve 128 and the interior of the tank portion 126 for purposes of clean out or other servicing purposes. Further in exemplary arrangements the lower portion of the tank portion 126 and the elongated release portion 132 are positioned below the frost line so as to avoid freezing and any problems that may result therefrom. Of course these approaches are exemplary and in other embodiments other approaches may be used.

In some exemplary arrangements it may be desirable for the system to distribute the effluent water through different sprayers located in dispersed areas at different times. This may be done for example in situations where the operator of the system finds it desirable to deliver the water to different vegetation on the ground at different times. For example certain types of vegetation on the ground may benefit from having more water provided thereto, while other types of vegetation located in different areas in which the water can be delivered, grow better with less water. Further in some arrangements the available pressure and volume from the pump may only be sufficient to operate a subset of the available sprayers at one time. There may also be other reasons why it may be desirable to have selective control over the operation of the available sprayers.

FIG. 3 shows an alternative water distribution system 136. Water distribution system 136 is generally similar to water distribution system 102 except as otherwise mentioned and the same reference numerals will be used to refer to components in common therewith. Water distribution system 136 includes a plurality of valves 138, 137, 133 and 131. In an exemplary arrangement the valves may be solenoid or other selectively controllable valves to allow or shut off flow through the valve. In exemplary arrangements the valves may be controlled by the control circuitry associated with the pump and other system components. For example, when it is desired to deliver water through the sprayer associated with the header pipe 110, the pump may be operated and valve 138 placed in an open condition while the other valves remain closed. This will cause the water to be delivered through the vertically extending header pipe 110 but not the vertically extending header pipe 122. Similarly, when water is to be delivered through the sprayer associated with the header pipe 122, the pump may be operated while valve 137 is open and the other valves are closed. When water is to no longer be delivered through the water distribution system 136, valves 131 and 133 may be opened to enable water to be passed through the outlet line to the perforated distribution container. Of course it should be understood that while the selective delivery of water to only two sprayers is shown, in other arrangements the water distribution system may include many more sprayers and suitable valving arrangements to selectively deliver water onto the ground through each of the sprayers or sets thereof.

An exemplary sprayer 118 is shown in FIG. 7. The exemplary sprayer 118 includes a base 140 and a manifold 142. The base 140 includes a body 144 which is configured to fluidly connect to the top of a vertically extending header pipe. The exemplary body 144 includes a plurality of wrench flats 146. The wrench flats 146 facilitate engagement of the body with a tool that enables turning the body to engage or disengage pipe threads or similar connectors at the end of the header pipe.

The exemplary body further includes an outlet body end 148. The outlet body end 148 includes an outlet body end opening 150. A nipple end 152 of a rotatable hub 154 extends outward from the body through the outlet body end opening 150. The exemplary nipple end 152 includes wrench flats 156. The exemplary wrench flats 156 facilitate holding the hub 154 stationary with a tool when the manifold 142 is threadably engaged or disengaged from the hub. Manifold 142 includes an outlet nozzle 158. The outlet nozzle 158 includes openings 160 for passing water therefrom. The exemplary outlet nozzle 158 and openings 160 are offset from an axis 162 of rotation of the hub and the manifold by a radial distance. The offset of the outlet nozzle from the axis 162 and the thrust produced by the water that passes outward therefrom, causes the manifold 142 and the hub 154 to rotate when water is supplied thereto.

As shown in FIGS. 8 through 12, the exemplary base 140 is normally configured during operation with the axis 162 extending in a vertical direction. The body 144 includes a generally cylindrical internal cavity 164. The cavity is open through a mounting opening 166 at the end opposed of the outlet body end opening 150. The exemplary cavity 164 is internally threaded in the area of the mounting opening 166. The threads 167 facilitate the liquid tight engagement with a correspondingly threaded end of a vertically extending header pipe of the type previously discussed.

The exemplary cavity includes an annular outer seal recess 168 adjacent to the outlet body end opening 150 (see FIG. 12). The annular outer seal recess 168 is positioned axially inwardly of a radially inwardly extending body lip 170. The annular outer seal recess 168 is configured for accepting an outer seal 172 therein. As later discussed, the outer seal 172 is operative to seal the upper axial end of an annular liquid tight jacket, which jacket holds a lubricant material within the body.

In the exemplary arrangement the body further includes an annular radially extending annular land surface 174. The land surface 174 extends radially outward of the wall bounding seal recess 168. The exemplary hub 154 includes an annular flange portion 176. In the exemplary arrangement the annular flange portion 176 extends radially outward on the hub relative to the nipple end 152. In the operative position of the hub 154, the flange portion 156 extends in generally opposed axial relation of the annular land surface 174.

Figure 13:
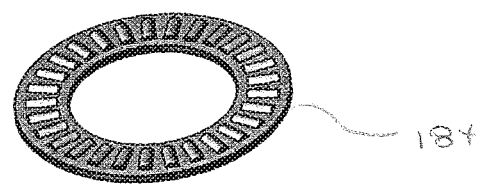
FIG. 13 is an isometric view of an exemplary needle roller thrust bearing used in the exemplary distribution sprayer.

In the exemplary arrangement a thrust bearing assembly 178 extends axially between the land surface 174 and the flange portion 176 of the hub. The thrust bearing assembly of the exemplary arrangement extends in surrounding relation of the hub 154 axially outward from the flange portion 176 toward the nipple end. The exemplary thrust bearing assembly 178 includes an outer thrust washer 180. The outer thrust washer 180 extends in abutting engagement with land surface 174. An inner thrust washer 182 extends in abutting engagement with the flange portion 176. In the exemplary arrangement, a needle roller thrust bearing 184 extends axially intermediate between the outer and inner thrust washers. In the exemplary arrangement the needle roller thrust bearing 184 which is shown separately in FIG. 13, comprises a plurality of angularly spaced radially extending rollers housed in a carrier which serves to contain the rollers therein. The exemplary thrust bearing assembly 178 is operative to resist axially outward forces acting on the hub while enabling the rotation of the hub relative to the body 144. Of course it should be understood that this approach is exemplary and in other embodiments other bearing and axial thrust force supporting arrangements may be used.

In the exemplary body 144, the cavity 164 includes an annular outward extending surface 186. Surface 186 extends radially outward relative to the generally cylindrical portion of the wall adjacent to the thrust bearing assembly. The hub 154 further includes a radially outward extending annular step 188. In the exemplary arrangement the annular radially outward surface 186 in the body and the radially outward extending annular step 188 of the hub are generally radially aligned in the operative position of the hub. A cylindrical hub portion 190 extends axially in the cavity from the step 188 toward the mounting opening 166.

Figure 14:
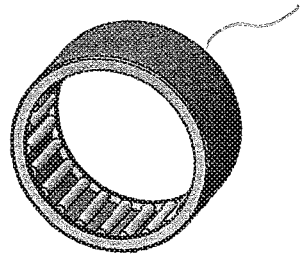
FIG. 14 is an isometric view of an exemplary annular needle bearing used in the exemplary distribution sprayer shown in FIG. 7.

A cylindrical bearing 192 extends in surrounding relation of the cylindrical hub portion 190. In the exemplary arrangement bearing 192 comprises a plurality of axially extending needle rollers as shown in FIG. 14. The cylindrical bearing 192 extends in surrounding relation of hub portion 190 inwardly of an annular wall portion 194 which extends axially from the annular outward surface 186 toward the mounting opening 166. An upper annular face 196 of the cylindrical bearing 192 is held in position by engagement with the annular outward extending step 188 on the hub and the annular outward surface 186 of the body. Such engagement facilitates maintaining the bearing 192 and the hub in the operative hub position while enabling the rotation of the hub responsive to the thrust provided by the water that passes outward through the manifold and the outlet nozzle openings.

In the exemplary embodiment the cylindrical hub portion 190 terminates at a radially inward extending annular flange portion 198. A reduced diameter portion 200 extends axially on the hub from the flange portion 198 toward the mounting opening 166. The annular wall portion 194 which bounds the cavity 164 includes an annular seal engaging surface 202. In the exemplary arrangement the annular seal engaging surface 202 extends adjacent to the threads 167 which extend from the mounting opening. The annular seal engaging surface 202 in transverse cross-section is tapered slightly radially axially inward from the threads.

An inner seal 204 is positioned in engagement with the annular seal engaging surface 202. In the exemplary arrangement inner seal 204 includes an inner annular surface 206. In the exemplary arrangement the inward extending flange portion 198 of the hub is movable in operative engagement with the inner annular surface 206 of the inner seal 204. This arrangement enables the hub 154 to rotate in the cavity 164 and maintains axial positioning of the hub in the operative position. Of course it should be understood that this arrangement is exemplary and other embodiments other arrangements may be used.

In the exemplary embodiment the base includes a brake generally indicated 207 which is in operative connection with the hub 154 and which acts to apply a brake force that resists rotation of the hub. In the exemplary arrangement the brake includes a generally cylindrical internal liquid tight jacket 208 extends between the wall portions bounding cavity 164 within the body 144, and the hub 154. In the exemplary arrangement the liquid tight jacket 208 is sealed at the outlet body end by the outer seal 172. The liquid tight jacket 208 is sealed at the inner axial cavity end by the inner seal 204. This liquid tight jacket 208 of the exemplary arrangement isolates the cylindrical bearing 192 and the thrust bearing assembly 178 from water which passes through the base as well as from any external contaminants which may be in proximity to the nipple end outside the body. In the exemplary arrangement the liquid tight jacket 208 is filled with a lubricant liquid. In the exemplary arrangement the lubricant liquid is a silicone material which maintains a generally constant viscosity and density throughout an entire range of ambient temperatures to which the sprayer is exposed during operation. Thus in the exemplary arrangement the lubricant material, which experiences no significant change in volume with variations in temperature, helps to maintain the isolation of the items within the liquid tight jacket and maintains such items separated from water or other contaminants. As a result in some exemplary arrangements the fluid lubricant causes the brake force opposing rotation of the hub to increase with the rotational speed of the hub. In some arrangements non-Newtonian fluids may be used to achieve suitable variable speed brake force. Of course it should be understood that this approach is exemplary and in other embodiments other brake approaches and brake structures may be used.

In the exemplary arrangement the hub 154 includes an axial passage 210 therethrough. The axial passage 210 places an outlet opening 212 at the nipple end 152 in fluid communication with water in the cavity 164 within the body 144. The nipple end 152 includes an externally threaded portion 214 adjacent to the outlet opening 212. The threaded portion 214 facilitates the releasable engagement of the manifold 142 as well as alternative manifolds later discussed, with the hub.

Figure 16:
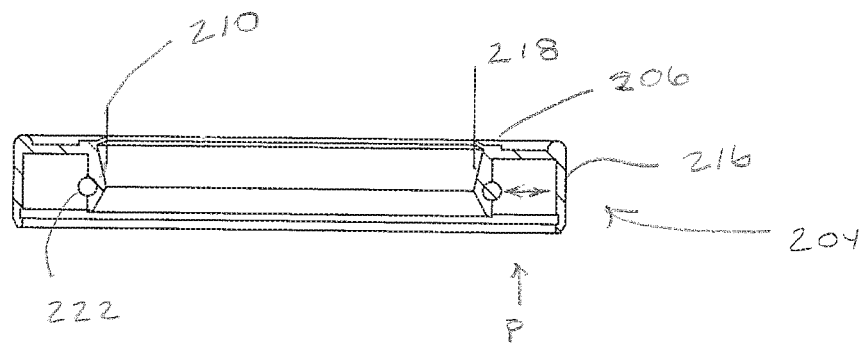
FIG. 16 is a transverse cross-sectional view of the seal shown in FIG. 15.
Figure 15:
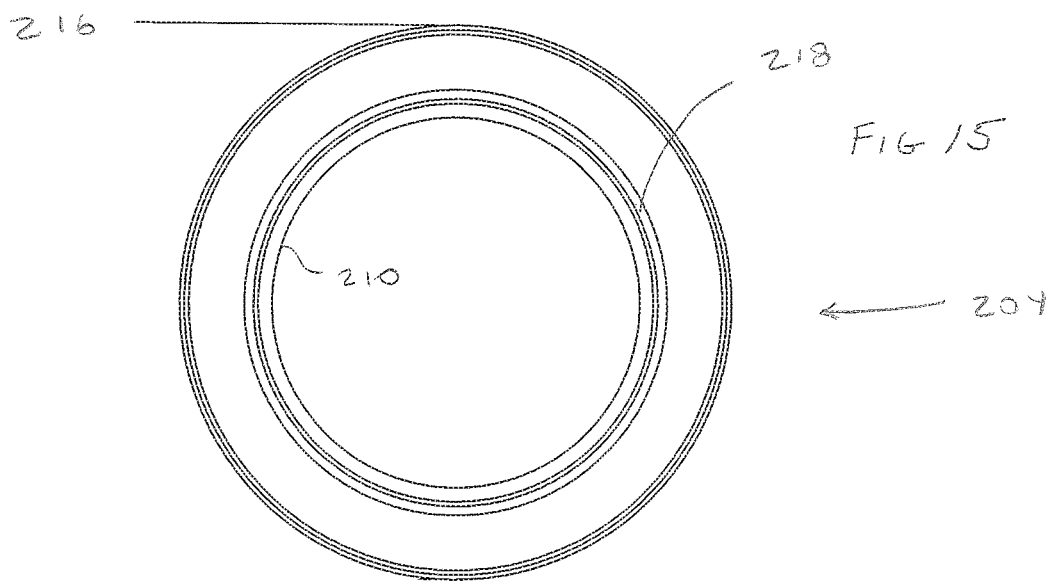
FIG. 15 is a top view of an exemplary lower seal used in the exemplary distribution sprayer.
Figure 25:
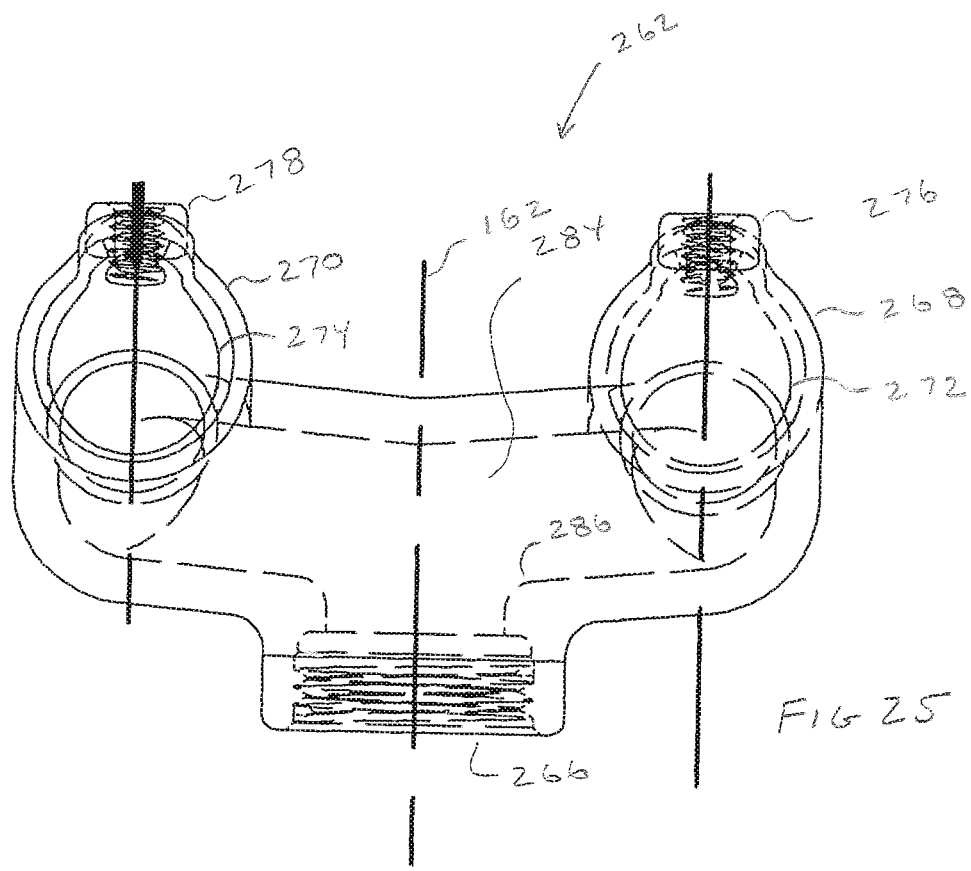
FIG. 25 is a front view of the manifold shown in FIG. 24.
Figure 26:
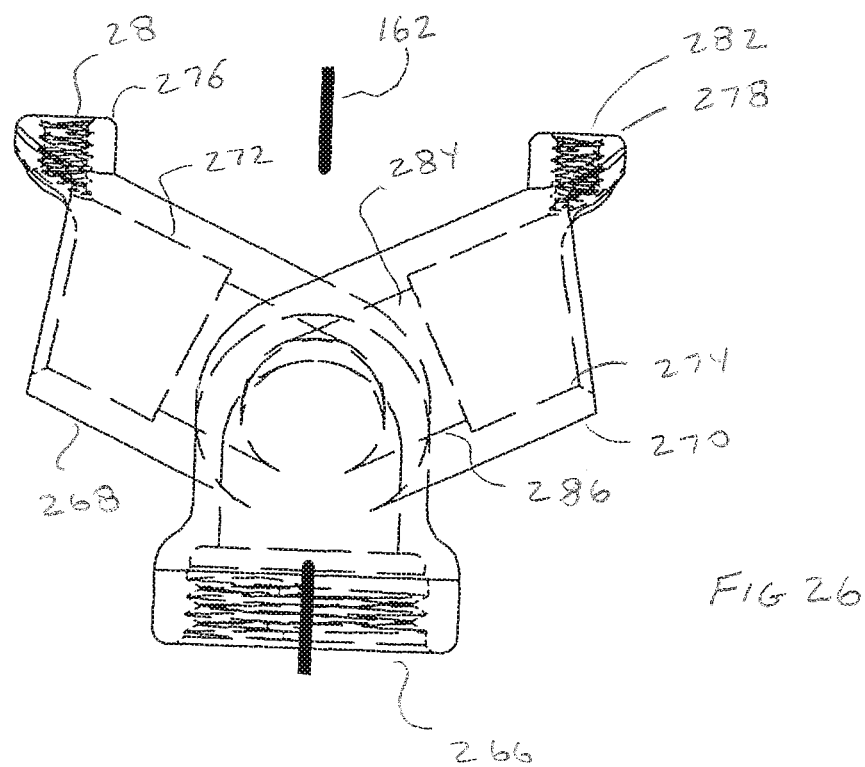
FIG. 26 is a side view of the manifold shown in FIG. 24.

As shown in FIGS. 15 and 16 the exemplary inner seal 204 comprises an annular seal with a generally rigid ring portion 216. The exemplary rigid ring portion 216 is in press fit contact with the annular sealing surface 202 within the cavity as previously discussed. The inner seal further includes a radially inwardly extending resilient annular portion 218. The radially inward extending annular portion 218 annularly engages the reduced diameter portion 200 of the hub to seal the inner axial end of the liquid tight jacket 208.

In the exemplary arrangement the resilient annular portion in transverse cross-section includes a flexible lip portion 210. Flexible lip portion 210 extends radially inwardly as well as in the axial direction toward the mounting opening 166. In the exemplary arrangement an annular spring 222 extends in surrounding relation radially outwardly of the lip portion 210. The spring 222 biases the lip portion to engage the reduced diameter portion 200 of the hub.

Further in the exemplary arrangement the flexible axially extending lip portion is configured so that increased sealing force is applied by the pressure of the water in the cavity 164 acting against the lip portion 210. As represented in FIG. 16, the pressure of the water acting against the seal as represented by Arrow P is operative to apply pressure force that urges the flexible lip radially inward toward engagement with the rotating hub. Thus in the exemplary seal arrangement the pressure of the water further helps to maintain the seal which preserves the integrity of the liquid tight jacket. Of course this approach is exemplary and other embodiments other approaches may be used.

Further in the exemplary arrangement the outer seal 172 is configured to further utilize pressure and force effects to reduce the risk that the integrity of the liquid tight jacket will be compromised. As shown in FIGS. 17 and 18 the outer seal 172 includes a rigid ring portion 224. The rigid ring portion 224 extends in the seal recess 168 and in abutting engagement with the inner side of the body lip 170. An annular radially inward extending resilient portion 226 extends radially inwardly from the ring portion 224 and annularly engages the nipple end 152 in sealing engagement. In transverse cross-section the resilient annular portion includes a flexible axially extending lip 228. A spring 230 extends outwardly of and in surrounding relation of the flexible lip 228. The annular spring 230 serves to bias the flexible lip radially inward and maintain it in engagement with the outer surface of the nipple end. Further in the exemplary arrangement the flexible lip extends axially outward from the ring portion. This configuration of the exemplary arrangement further helps to seal the flexible lip 228 to the nipple end.

For example in exemplary arrangements the nipple end extending outside the body is exposed to the elements such as water, snow and ice. Further the nipple end outside the body can be exposed to further contaminants such as mud, sand, grass clippings and other materials. In the exemplary arrangement such items may collect in the annular space 232 radially outward of the flexible lip 228. The presence of such materials and contaminants in the annular space will generally operate to bias the flexible lip toward sealing engagement with the adjacent nipple end. Thus the presence of contaminants is less likely to compromise the integrity of the liquid tight jacket. In addition, expansion due to freezing of water in the annular space 232 will likewise increase the sealing force provided by the exemplary outer seal configuration. Of course it should be understood that this approach is exemplary and other embodiments other approaches may be used.

The exemplary manifold 142 includes a manifold inlet 234. The manifold inlet 234 is internally threaded to releasably engage with the threaded portion 214 on the nipple end 152 of the hub. A resilient annular seal 236 extends in sandwiched relation between the nipple end and a radially inward contoured portion 238 of the interior area 240 of the manifold. In the exemplary arrangement the outlet nozzle 158 has a cylindrical body 242 that is removably positionable in a nozzle aperture 244. In the exemplary arrangement the outlet nozzle 158 is removable from the nozzle aperture 244 so that the nozzle can be cleaned or replaced with a different type of nozzle if desired. The nozzle type may be selected to provide different properties such as water dispersion, thrust, water output distance or other properties that may be desired in a given sprayer location.

In the exemplary arrangement the nozzle aperture 244 is bounded outwardly on an upper side of the manifold by a brow projection 246. In the exemplary arrangement the brow projection 246 extends outwardly from the nozzle aperture and includes a nozzle fastener opening 248 therein. In the exemplary arrangement the nozzle fastener opening 248 is configured to accept a nozzle fastener 250 therein. In the exemplary arrangement the nozzle fastener 250 comprises a set screw that is movably positionable in the nozzle fastener opening 248. Of course in other embodiments other approaches may be used.

In the exemplary arrangement the body 242 of the nozzle includes a nozzle projection 252 that extends outwardly from the nozzle opening 160. The exemplary nozzle projection 252 includes a nozzle recess 254. The nozzle recess is configured to engage the nozzle fastener 250 therein. Thus the nozzle fastener 250 may be moved by rotation in the threaded nozzle fastener opening 248 to extend into the nozzle recess 254 and thereby hold the nozzle 158 within the nozzle aperture 244. If it is desired to change the nozzle, the nozzle fastener 250 may be rotated to move outwardly and disengage the nozzle recess 254. This enables the nozzle body 252 to be removed from the nozzle aperture 244. When removed from the nozzle aperture, the outlet nozzle 158 may be cleaned or otherwise serviced. Alternatively the outlet nozzle 158 may be replaced with a different outlet nozzle with different properties. Of course it should be understood that these approaches are exemplary and in other embodiments other approaches may be used.

In the exemplary arrangement the interior area 240 of the manifold 142 is configured to facilitate the draining of water therefrom. As previously discussed, the ability to drain the water from the sprayer 118 when water is not being discharged therefrom helps to prevent freezing of the water in the sprayer and other problems. This is why in the exemplary arrangement water is enabled to be drained from the sprayers and the header pipes to below the frost line when the pumping of the water from the effluent tank is stopped. The exemplary manifold configuration includes an end portion 256. The end portion 256 includes the nozzle aperture 244. The exemplary end portion 256 is angled upwardly toward the opening which bounds the aperture. This upwardly angled configuration facilitates the draining of water which may remain in the outlet nozzle 158 when pumping is discontinued, back into the interior area 240 of the manifold.

Further in the exemplary arrangement the interior area 240 of the manifold is bounded by a lower manifold surface 258. In the exemplary arrangement when the axis 162 of the hub 154 extends vertically and is in engagement with the manifold 142, the lower manifold surface 258 is sloped continuously downward between the outlet nozzle and the manifold inlet 234. As shown in FIGS. 8 and 9 as well as FIGS. 20 through 22, in the exemplary arrangement the lower manifold surface 258 may comprise a plurality of surface contours or portions. However, as shown therein such contours and portions slope continuously downward from the outlet nozzle to the manifold inlet so that almost all residual water in the manifold will drain back into the axial passage 210 of the hub, and the water may move vertically downward therefrom in the vertically extending header pipe connected to the base. This facilitates draining the sprayer 118 after each use so that the water stays below the frost line when the sprayer is not in use, and reduces the risk of damage due to freezing and other conditions. Of course the configuration shown is exemplary and other embodiments other approaches may be used.

FIGS. 23 to 26 show an alternative embodiment of the sprayer 260. The exemplary sprayer 260 includes the same base 140 of sprayer 118 previously described. Sprayer 260 uses an alternative manifold 262. Alternative manifold 262 includes a pair of outlet nozzles 264, only one of which is shown in FIG. 23. In the exemplary arrangement the outlet nozzles 264 are opposed to discharge water in generally opposed directions so as to cause the manifold to rotate in the direction of Arrow R.

In the exemplary arrangement manifold 262 includes a manifold inlet 266. Manifold inlet 266 is configured to threadably engage the nipple end 152 of hub 154 in a manner like that previously discussed in connection with manifold 142. The exemplary manifold inlet further includes a resilient seal similar to seal 236 previously discussed.

Manifold 262 includes a pair of upturned end portions 268 and 270. Each end portion includes a respective nozzle aperture 272, 274 therein. Each nozzle aperture is configured to receive an outlet nozzle 264 in releasable engagement therein. Manifold 262 further includes a brow projection 276, 278 adjacent to each respective nozzle aperture. Each respective brow projection includes a respective nozzle fastener opening 280, 282 therein. Each respective nozzle fastener opening is configured to receive a respective nozzle fastener of the type previously discussed therein for purposes of engaging a nozzle recess on a nozzle projection to hold the nozzle in the respective nozzle aperture.

In the exemplary arrangement each outlet nozzle 264 is disposed from the axis 162 a radial distance indicated by Arrow D in FIG. 24. The discharge from the outlet nozzle 264 the radial distance away from the axis produces thrust which provides a rotational force to the manifold and the hub. This rotational force is operative to overcome the brake force and rotate the manifold and the hub connected thereto in a rotational direction in a manner like that previously discussed in connection with manifold 142.

In a manner similar to that of manifold 142, manifold 262 includes an interior area 284. The interior area 284 is bounded by a lower manifold surface 286. The lower manifold surface which is comprised of a plurality of different contours and surface portions is configured to be sloped continuously downward between each of the outlet nozzles and the manifold inlet 266. Thus virtually all water which remains within the manifold after pumping action is discontinued, is drained by gravity from the manifold through the inlet 266 and downward from the base 140. This enables the water to be drained and maintained below the frost line so as to avoid freezing and other issues which could damage or prevent operation of the system. Of course it should be understood that the construction of manifold 262 as well as manifold 142 is exemplary, and numerous other manifold and nozzle configurations may be utilized in connection with embodiments employing the principles that have been described herein.

Figure 39:
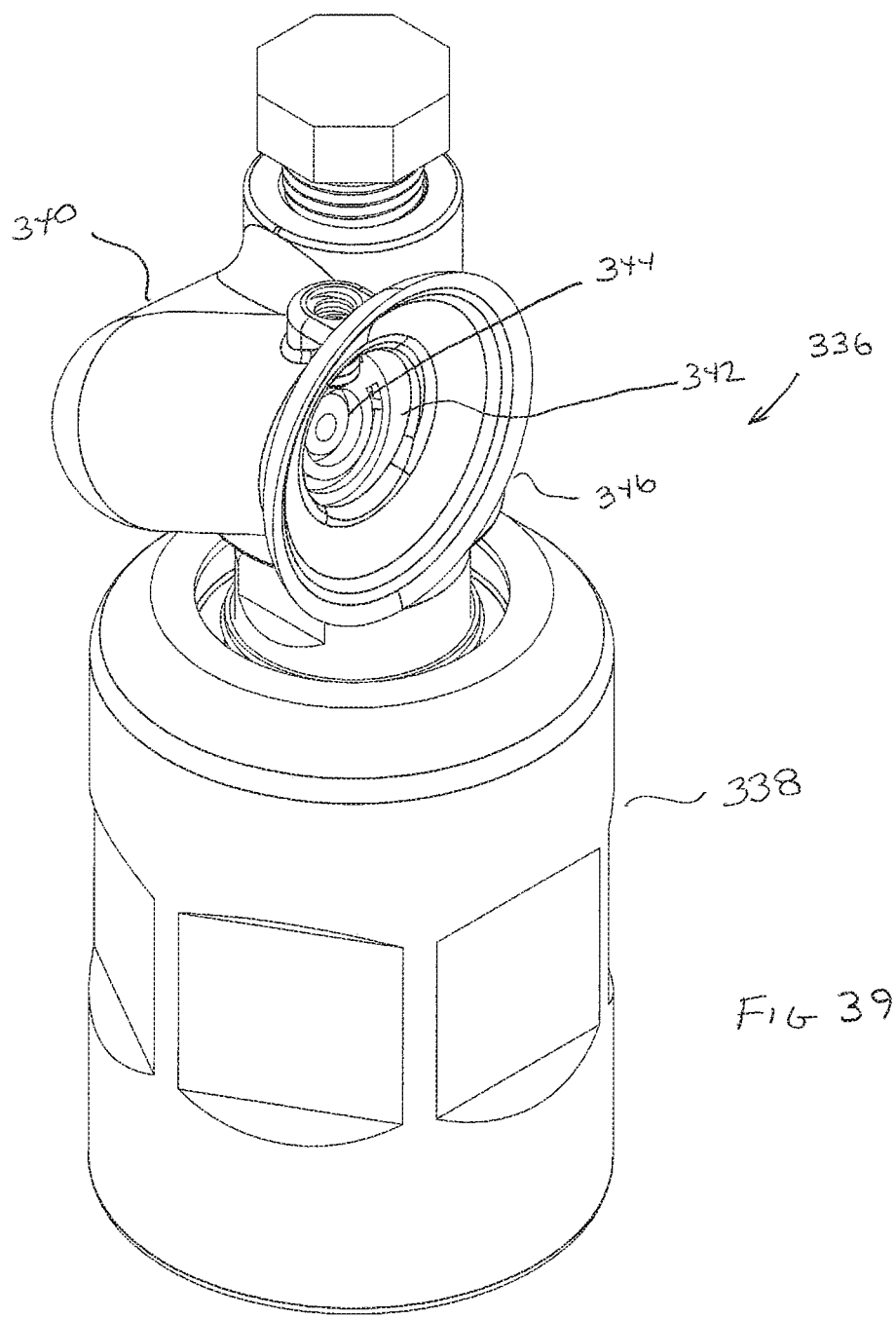
FIG. 39 is an isometric view of a further exemplary wastewater distribution sprayer.

FIG. 39 shows a further alternative embodiment of a sprayer generally indicated 336. Sprayer 336 is generally similar to sprayer 118 previously described except as otherwise noted. Sprayer 336 includes a base 338 and a manifold 340. Manifold 340 includes a nozzle aperture 342 in which a nozzle 344 is releasably positioned. An outward extending deflector having the shape of an annular outward extending bell 346 extends outside the manifold interior area and outwardly and radially away from the nozzle aperture 342. In the exemplary arrangement the deflector bell 346 extends annularly radially outward and away from the nozzle and nozzle aperture on all sides of the nozzle. However it should be understood that this configuration is exemplary and in other embodiments the outward extending deflector may only extend in certain areas outside the manifold interior area, such as outwardly and below the nozzle aperture.

In the exemplary arrangement the deflector bell or other outwardly extending deflector is operative to reduce the risk that some of the water exiting the nozzle collects on the underside of the manifold exterior and flows towards the base 338. Such flow on the exterior bottom surface of the manifold during cold conditions may cause ice accumulation in the area of the rotating nipple end of the hub that extends upward through the base. Such ice accumulation may interfere with sprayer operation. In the exemplary arrangement the configuration of the deflector bell 346 which extends outwardly and away from the nozzle opening, causes water to drip off the deflector bell at a location radially away from the nipple end of the hub. As a result during cold conditions water does not travel along the bottom of the manifold toward the base. Of course it should be understood that the configuration of the deflector bell is exemplary and in other embodiments other configurations may be used.

Figure 40:
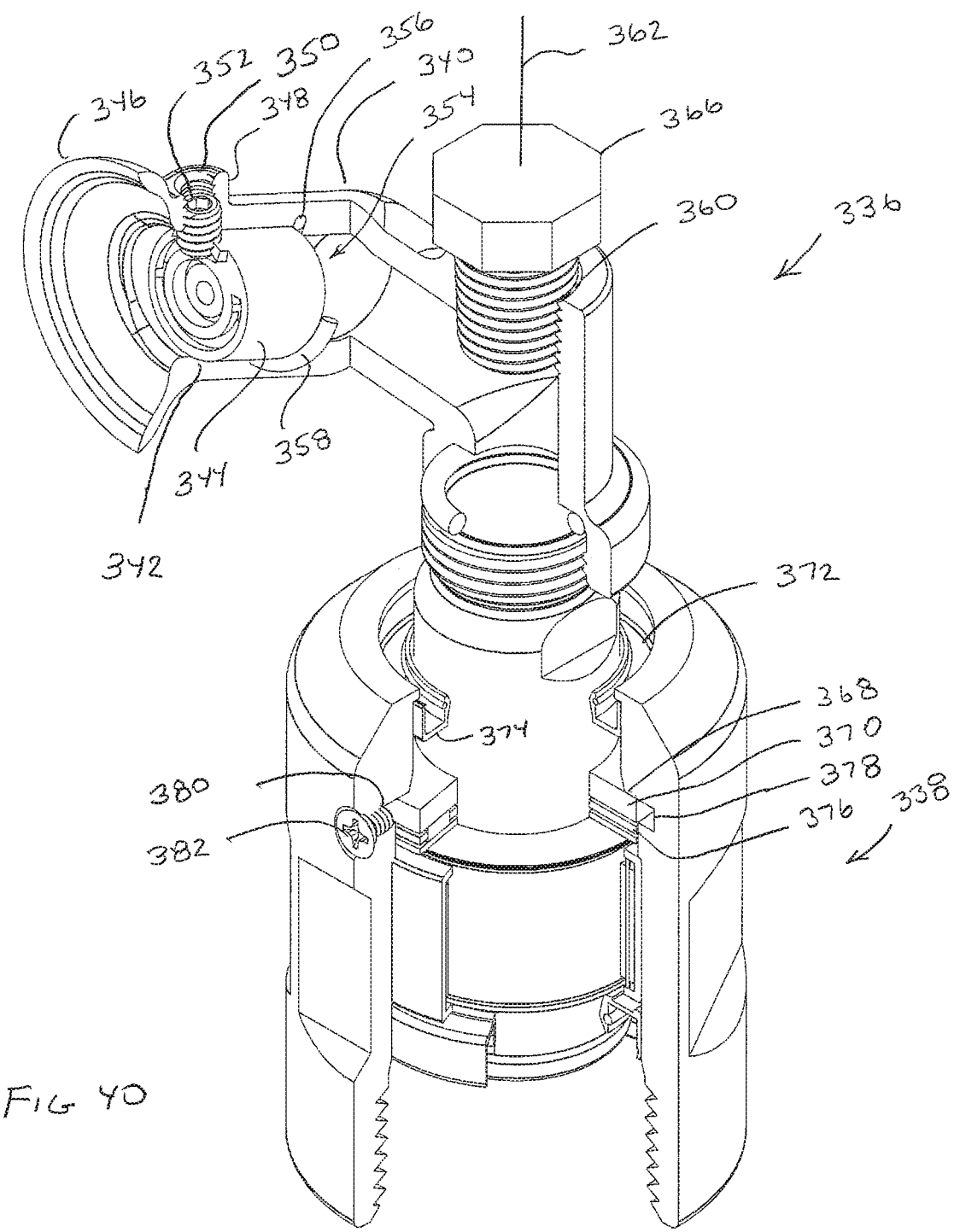
FIG. 40 is an isometric partial cutaway view of the distribution sprayer shown in FIG. 39.

As shown in FIG. 40 in the exemplary manifold 340 the deflector bell 346 includes a brow portion 348. The brow portion 348 includes a nozzle fastener opening 350 that accepts a nozzle fastener 352. The nozzle fastener is releasably engageable with a nozzle projection of the nozzle 344. As a result the nozzle fastener 352 enables selectively holding the nozzle fixed in the operative position in the nozzle aperture 342 or enabling the nozzle 344 to be disengaged from the manifold 340. Further in the exemplary embodiment the manifold interior area 354 of manifold 340 includes an annular recess 356 adjacent an inward end of the nozzle 344 when the nozzle is in the operative position. A resilient seal 358 is positioned in the recess 356. The seal 358 provides sealing engagement between the wall bounding the manifold interior area and the nozzle so as to reduce the risk of leakage in the area of the nozzle aperture on the outside of the nozzle and also helps to hold the nozzle in the operative position. Of course it should be understood that this approach is exemplary and in other embodiments other approaches may be used.

Figure 43:
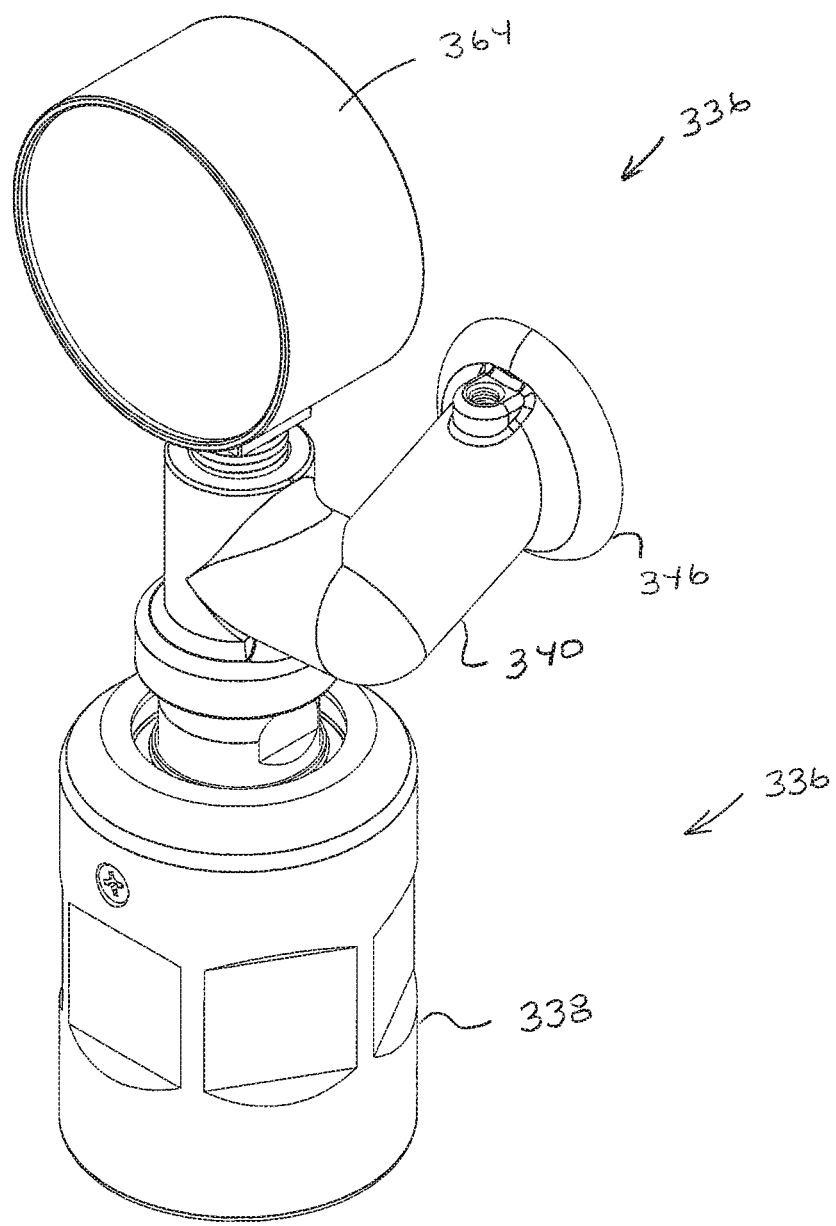
FIG. 43 is a isometric view of the sprayer shown in FIG. 39 with a pressure indicator attached thereto.

Manifold 340 further differs from manifold 142 in that manifold 340 includes a port 360. Port 360 is positioned in aligned relation with the axis of rotation 362 of the manifold. The port 360 extends from outside the manifold and into the manifold interior area 354. The exemplary port 360 is threaded and configured to releasably receive a pressure indicator such as a pressure sensor or a pressure gauge 364 as shown in FIG. 43. The engagement of a pressure indicator with the port enables determining the available pressure of liquid within the manifold for purposes of configuring the operation of the system. While the sprayer 336 may be operated in some arrangements with the pressure indicator positioned within the port 360, during modes of operation when there is not a need to know the pressure within the manifold interior area, the port 360 may be closed by a plug 366 or other releasable fitting. Of course it should be understood that this arrangement is exemplary and in other embodiments other approaches may be used.

Figure 41:
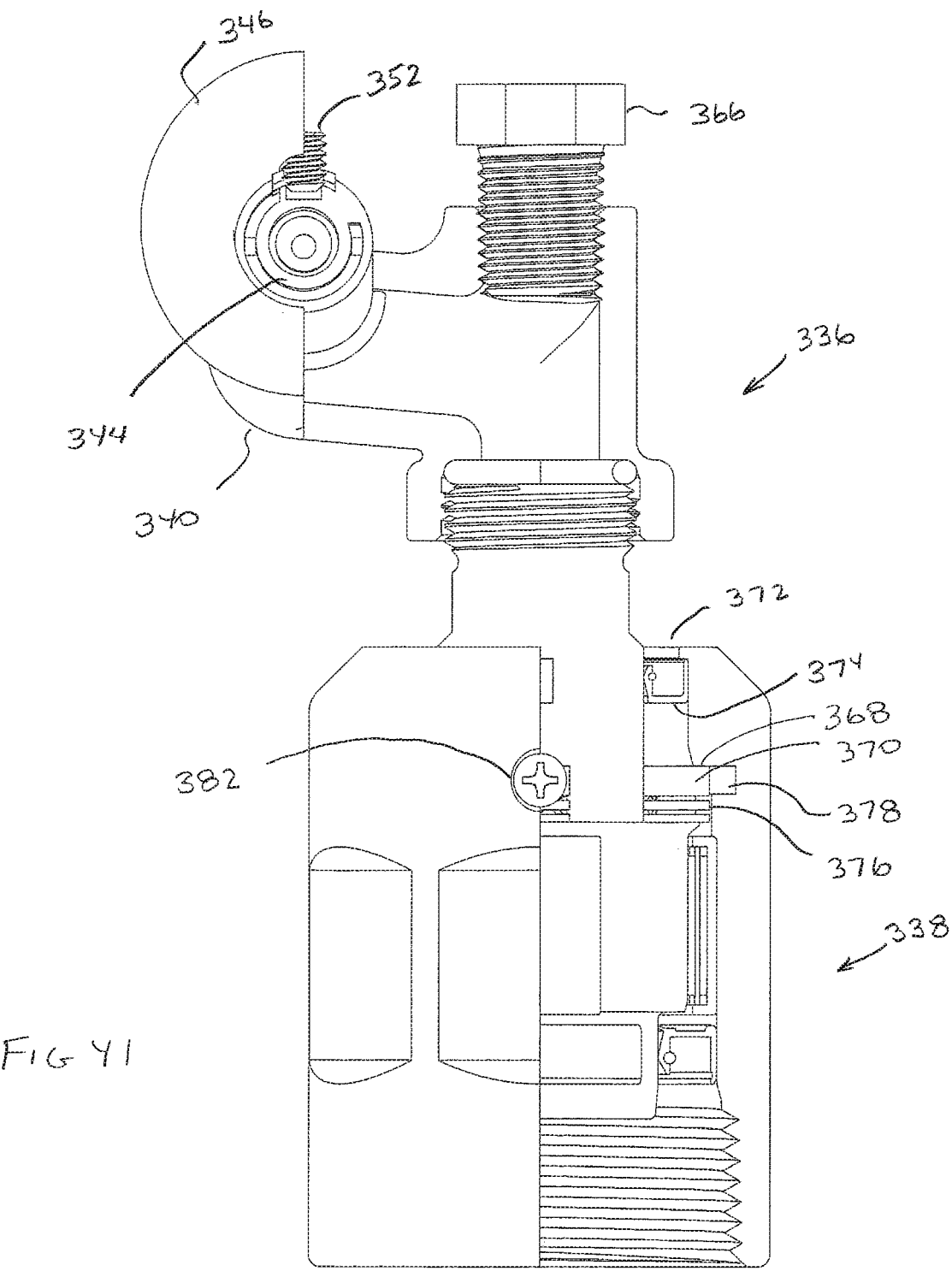
FIG. 41 is a partial cutaway side view of the distribution sprayer shown in FIG. 39.
Figure 42:
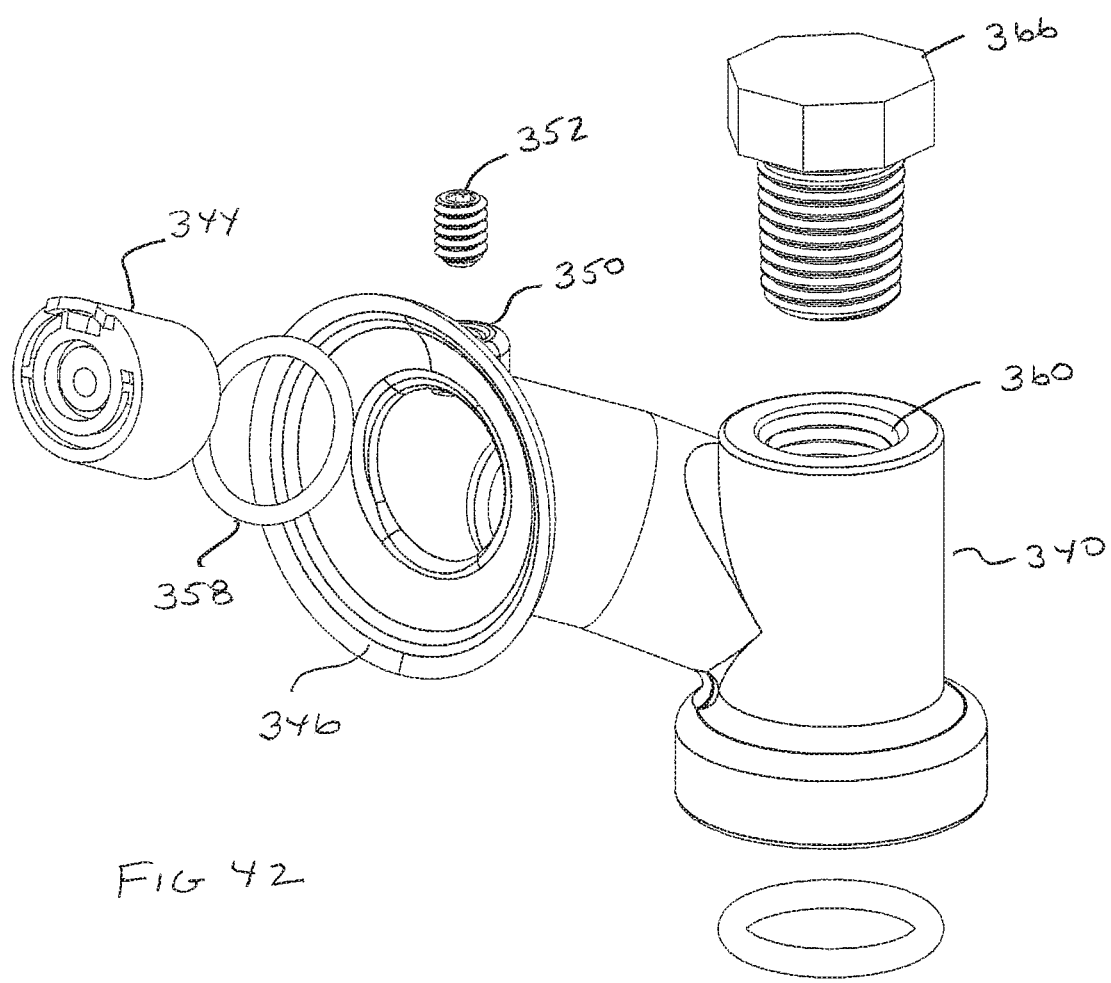
FIG. 42 is an exploded perspective side view of the exemplary distribution sprayer shown in FIG. 39.

In the alternative arrangement shown in FIGS. 39-43 the base 338 is also somewhat different than the base 140 previously described. While base 338 has many features which are the same as base 140, some different features are provided. For example, as represented in FIGS. 40-41 the land surface 368 which is in abutting relation with the outer thrust washer 370, is disposed further axially away from the outlet body end opening 372 and the outer seal 374 than in the arrangement of base 140. The arrangement of base 338 provides additional space for housing the lubricant fluid in the fluid tight jacket which provides the brake force. In addition in this exemplary arrangement the additional space helps to assure that the thrust bearing 376 which extends below the outer thrust washer 370, is immersed in the lubricating fluid.

The exemplary base 338 further includes an annular groove 378 that extends radially outwardly and in surrounding relation of the outer thrust washer. The annular groove 378 serves to hold lubricating fluid which helps to assure that the fluid acts on the thrust bearing and the adjacent thrust washers above and below the thrust bearing. Base 338 further includes a fluid fill opening 380. The fill opening 380 extends from outside the base 338 to the area of the annular groove 378 of the liquid tight jacket. The fill opening 380 enables adding lubricant material to the liquid tight jacket if necessary. During normal operation the fill opening is closed by a screw plug 382. Of course it should be understood that these features are exemplary and other embodiments different or alternative features to provide such functions may be used.

Figure 44:
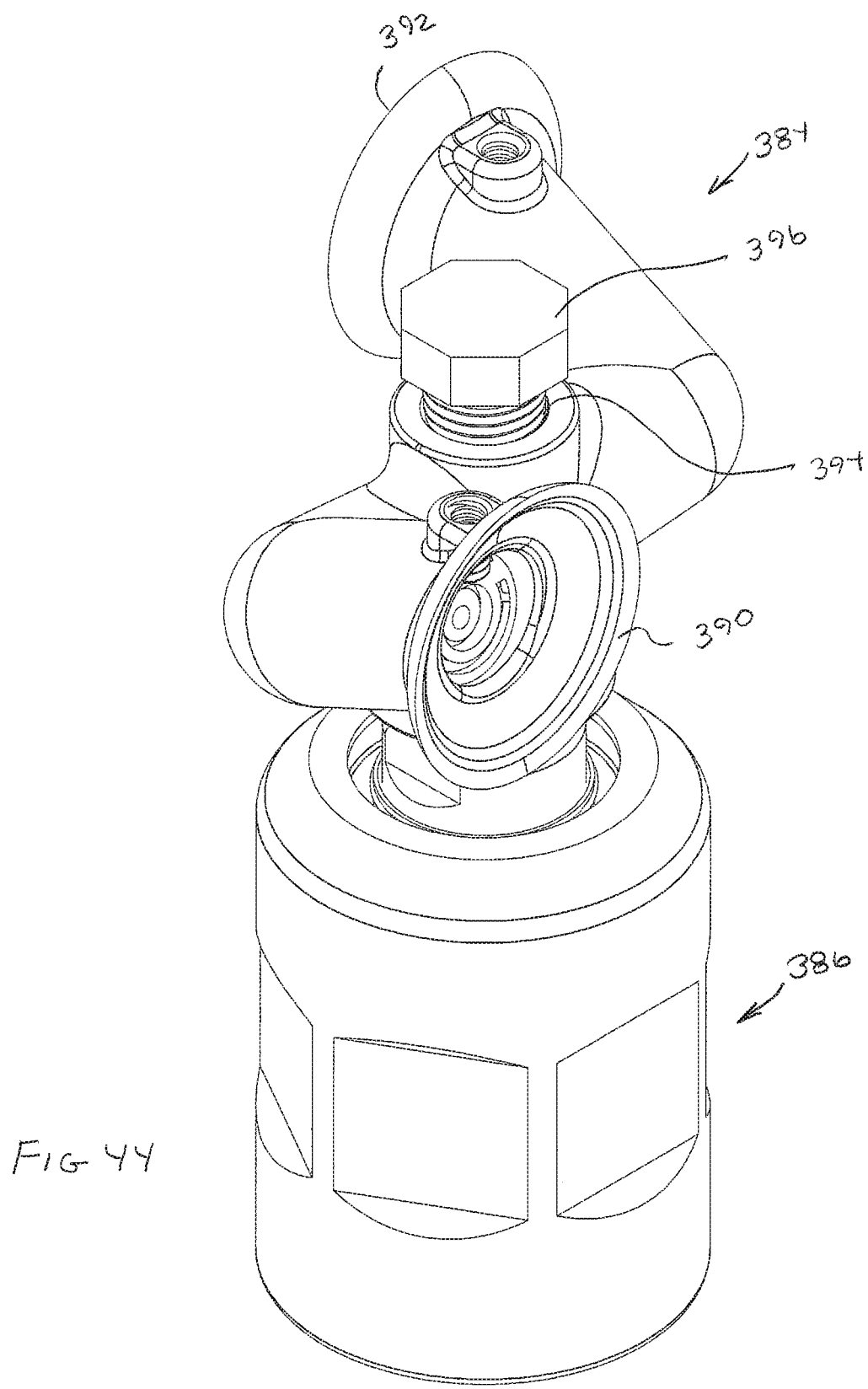
FIG. 44 is an isometric view of a further exemplary distribution sprayer with the manifold including a pair of alternative outlet nozzles.

FIG. 44 shows an alternative arrangement of a sprayer 384. Sprayer 384 includes a base 386 which may be the same as base 338 or base 140 previously described. Sprayer 384 includes a manifold 388. The exemplary manifold 38 is a dual nozzle manifold which is generally similar to manifold 262 that was described previously.

Manifold 388 includes a pair of deflection bells 390, 392 that are disposed outside the manifold interior area and that extend outward and radially away from a respective adjacent nozzle. Each of the deflector bells of manifold 388 may be similar to the deflector bell 346 described in connection with manifold 340. Of course it should be understood that alternative configurations of outward extending deflectors which operate to avoid liquid accumulating and running down the bottom of the manifold toward the base 386 may be used.

Further manifold 388 also includes an axially positioned port 394. Port 394 extends from outside the manifold to the manifold interior area similar to port 360 of manifold 340 previously discussed. The port 394 is configured to releasably receive therein a pressure indicator such as a pressure gauge which can be used for purposes of determining the pressure in the manifold. When not connected to a pressure indicator, the port 394 may be closed by a plug 396. Of course it should be understood that this configuration is exemplary and other embodiments other manifold configurations and arrangements may be utilized.

Figure 27:
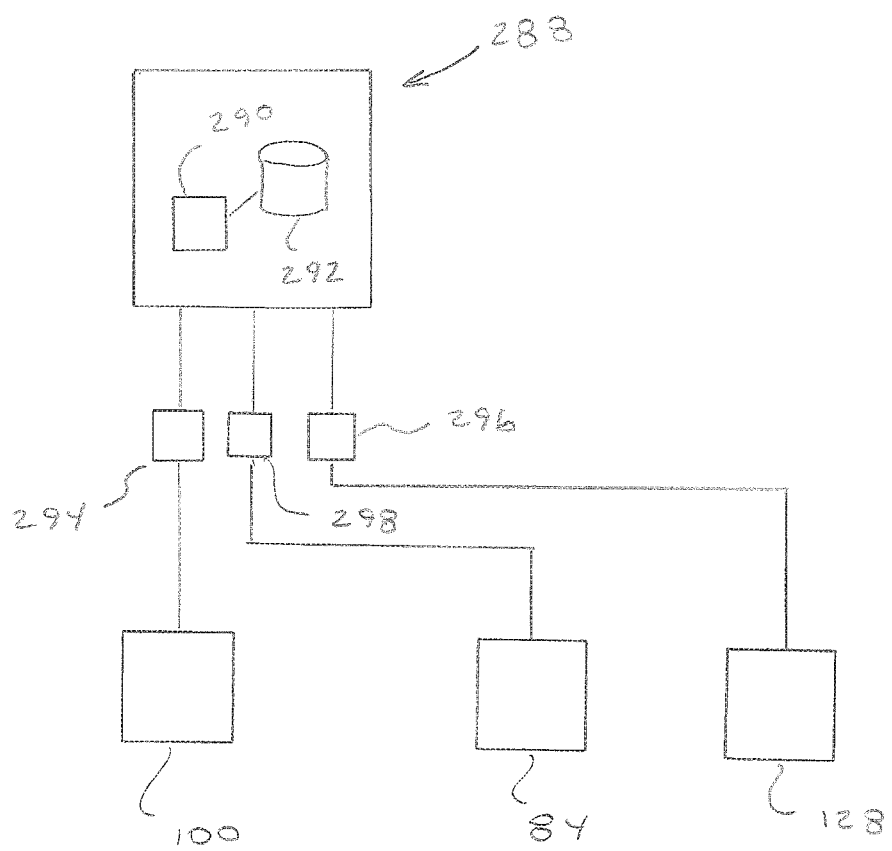
FIG. 27 is a schematic view of circuitry used in connection with an exemplary spray distribution apparatus.
Figure 28:
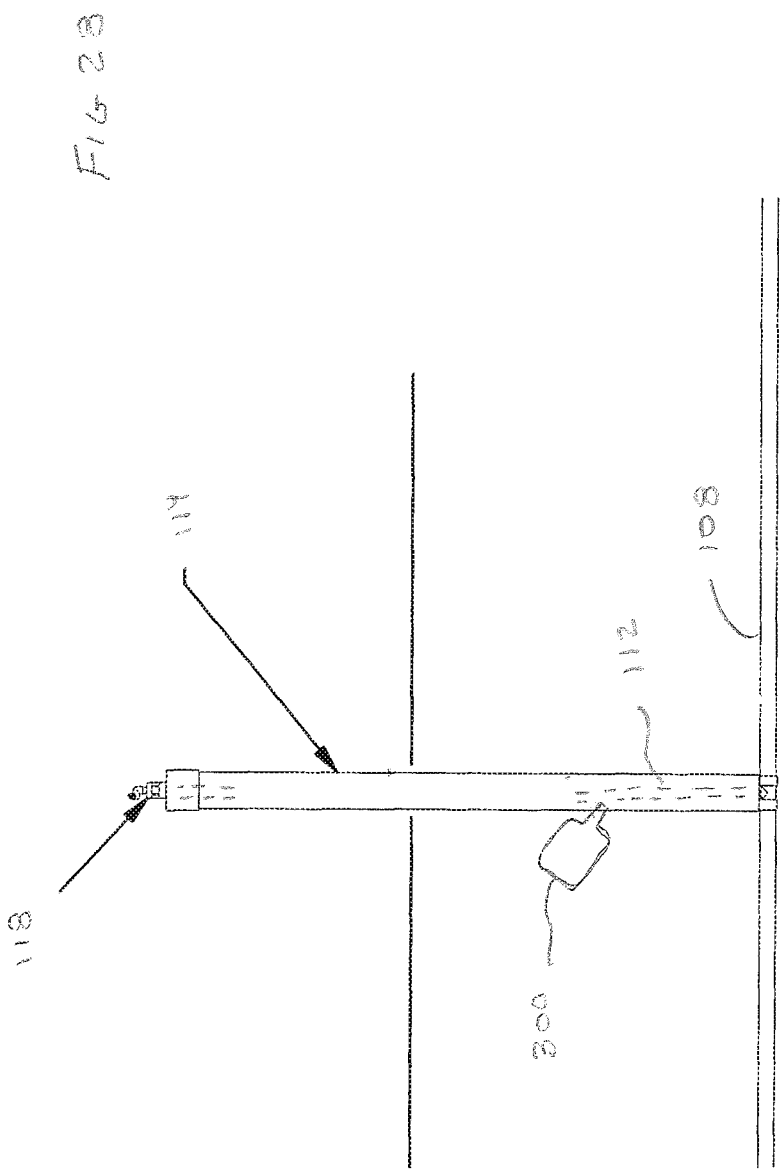
FIG. 28 is a schematic side view of an alternative vertically extending header pipe and sprayer, including an accumulator.
Figure 29:
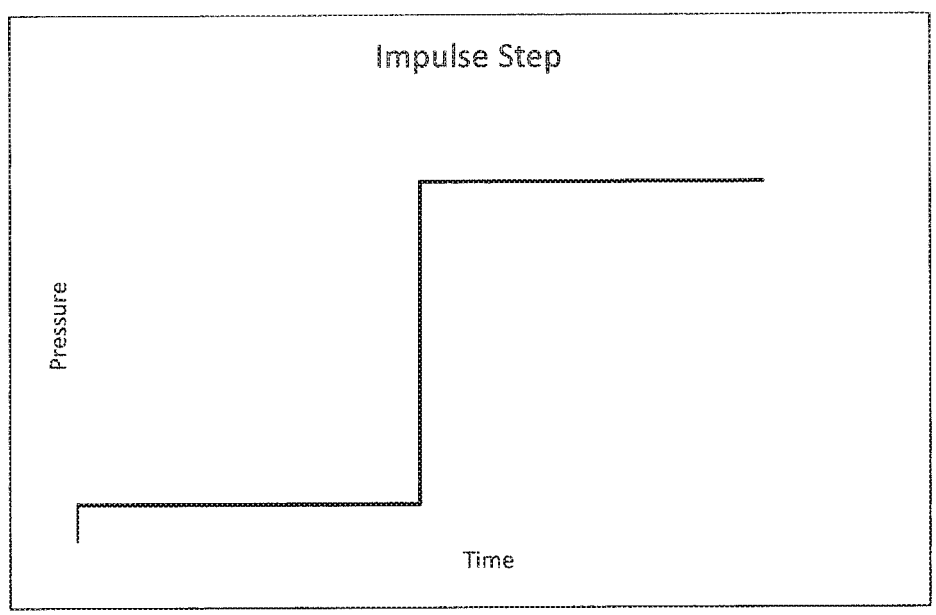
FIG. 29 is a graph representing how exemplary control circuitry associated with the spray distribution apparatus may control a pump to provide the delivery of water pressure versus time.
Figure 30:
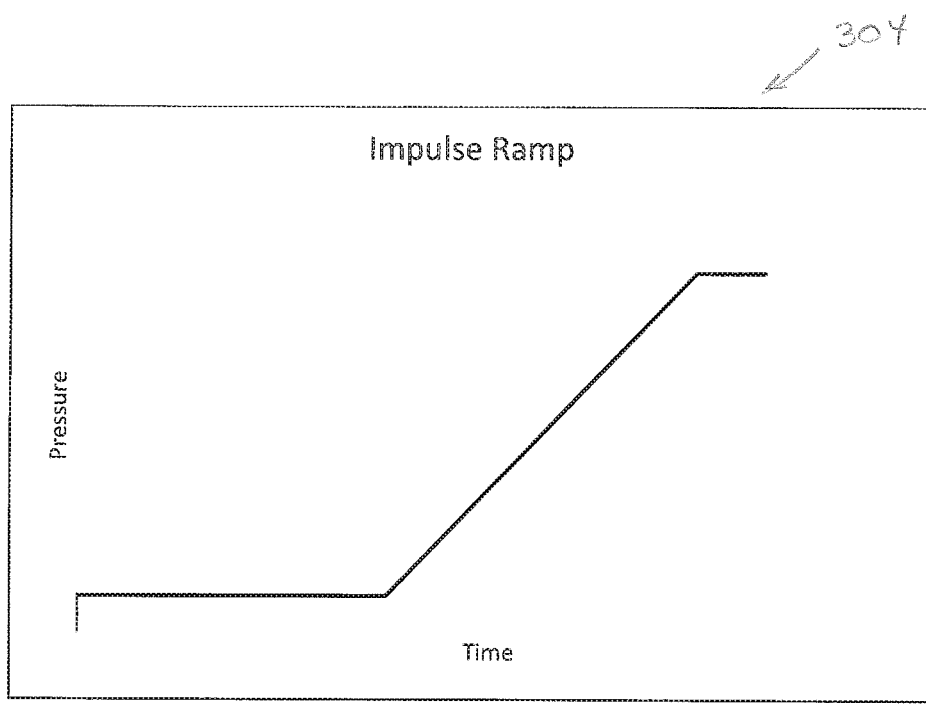
FIG. 30 is a further graph representing how exemplary control circuitry associated with the spray distribution apparatus may control a pump to provide the delivery of water pressure versus time.

FIG. 27 schematically shows circuitry associated with an exemplary embodiment of the wastewater spray distribution apparatus. It should be appreciated that the schematic representation is simplified for purposes of demonstrating the principles of operation. Further in some embodiments the circuitry shown will be integrated with circuitry associated with other devices that are part of the system.

In the exemplary arrangement control circuitry 288 is operative to control the pump and valves associated with the system. In the exemplary arrangement the control circuitry includes one or more circuits that are operative to communicate electrical signals with and control the operation of the devices connected in the system. In the exemplary arrangement the control circuitry 288 includes at least one circuit including a processor schematically indicated 290, and at least one data store schematically indicated 292. In exemplary arrangements the processor may include a processor suitable for carrying out circuit executable instructions that are stored in the one or more associated data stores. The processor includes or is in connection with a nonvolatile storage medium including instructions that include a basic input/output system (BIOS). For example, processors may correspond to one or more of a combination of a CPU, FPGA, ASIC or any other integrated circuit or other type of circuit that is capable of processing data and instructions.

The data store or data stores may correspond to one or more of volatile or nonvolatile memories such as random-access memory, flash memory, magnetic memory, optical memory, solid-state memory or other devices that are operative to store circuit executable instructions and data. Circuit executable instructions may include instructions in any of a plurality of programming languages and formats, including without limitation, routines, subroutines, programs, scripts, threads of execution, objects, methodologies and functions which carry out the actions such as those described herein. Structures for processors may include, correspond to and utilize the principles described in the textbook entitled Microprocessor Architecture, Programming and Applications With The 8085, by Ramesh S. Gaonker (Prentice Hall 2002) which is incorporated herein by reference in its entirety.

In exemplary arrangements processors produced by Intel Corporation or Advanced Micro Devices may be used as part of the control circuitry. Of course it should be understood that these processes are exemplary of many different types of processors that may be used.

The exemplary data stores used in connection with the exemplary embodiments may include any one or more of several types of mediums suitable for holding circuit executable instructions. These may include, for example, magnetic media, optical media, solid-state media or other types of media such as RAM, ROM, PROM, flash memory, computer hard drives or any other form of non-transitory computer readable storage media suitable for holding data and circuit executable instructions. Exemplary control circuitry may further include other components such as hardware and/or software interfaces for communications with devices included in the system as well as external devices and systems.

In the exemplary arrangement the control circuitry is in operative connection with the one or more level sensors 100 previously discussed. As shown schematically, the level sensors are in communication with the control circuitry through one or more suitable interfaces 294. The drain valve 128 as well as other valves such as valves 138, 137, 133 and 131 are also in connection with the control circuitry. It should be understood that although only the drain valve 128 is schematically shown in FIG. 27, other valves which are part of the system and that are controlled to operate in coordinated relation by the control circuitry are in operative connection therewith. As represented in FIG. 27 the drain valve 128 is operatively connected to the control circuitry through an interface 296.

Also in operative connection with the control circuitry is the pump 84. The pump is in operative connection with control circuitry through an interface 298.

It should be understood that in some arrangements the pump may be of a type that operates at a single speed and has only either an on or off condition. In other exemplary arrangements the pump may be a variable speed pump which can be operated at different pressures and pumping rates responsive to operation of the control circuitry.

In some exemplary arrangements where the pump operates to provide almost immediate full speed operation, the exemplary sprayers 118, 260 may be particularly advantageous. This is because the exemplary brake 207 which includes the liquid in the liquid tight jacket, is operative to provide a rotational brake force which increases with increased rotational speed of the hub. This variation in the brake force provides a damping force that slows the rate of change in the rotational speed of the hub in the rotational direction in response to the thrust provided by the water that passes through the one or more outlet nozzles. This is because the liquid lubricant housed in the liquid tight jacket provides a brake resisting force that increases with speed to prevent rapid changes in rotational speed that might otherwise occur when the force of water quickly supplied by a pump initially rushes outward from the sprayer. Without such a rotational brake force that increases with speed being applied, the sprayer may begin rotating at a higher rate of speed than is desirable, which may correspond to a water distribution pattern that is not desired. Further without the application of the brake force the sprayer may continue to operate at an undesirable rated speed even after the pressure and flow forces from the water being delivered by the pump have stabilized. However it should be understood that brake 207 is exemplary and in other embodiments other types of brakes which provide fixed or variable brake force may be used.

Further in some exemplary arrangements additional provisions may be made to reduce the risk that sprayers rotate at an improper speed. For example, an accumulator may be positioned in connection with the header pipe leading to the sprayer. The use of an accumulator in the line may reduce the effects of rapid changes in pressure forces that would otherwise be applied to the sprayer in response to pump startup. FIG. 28 is an arrangement similar to the previously discussed in FIG. 4. In FIG. 28 however an accumulator 300 has been fluidly connected to the header pipe 112 in the flow path in advance of the sprayer 118. In this exemplary arrangement if the control circuitry operates to start the pump at full speed, the accumulator 300 will absorb through expansion of an internal actuator chamber, a significant portion of the initial force of the leading interface of the water that passes upward through the header pipe toward the sprayer. The absorption of a significant portion of this initial pressure wave energy by the accumulator reduces the risk that the sprayer will react to the arrival of the water by beginning to rotate at an undesirable high rotational speed. This approach in combination with a brake, such as a brake that provides greater brake force with higher speed as provided by the liquid lubricant in the liquid tight jacket, further helps to assure that the exemplary sprayers will operate at the desired rotational speed and provide the desired water distribution pattern.

In other exemplary arrangements the control circuitry 288 may operate to control a variable speed pump which operates to pump the water from the water effluent tank 82. In some exemplary arrangements the circuit executable instructions associated with the control circuitry operate to cause the pump to provide pressure in accordance with the graph 302 shown in FIG. 29. In this exemplary arrangement when the controller receives a signal from the sensors 100 that water is to be discharged from the tank 82, the controller operates to close the drain valve 128 (if one is present in the system) and begin operation of the variable speed pump. In this arrangement the controller operates the pump in accordance with its stored circuit executable instructions to initially cause the pump to operate at a relatively low pressure. The low-pressure operation of the pump is continued for a set time considered sufficient to fill the lines of the water distribution system to the point of reaching to the sprayers. Once the pump operates at the initial low-pressure for the set time necessary to fill the lines, the controller causes the pump to increase its pressure to the normal pressure rate. Operating at the normal pressure and flow then causes the sprayers to begin to rotate against the brake force of the brake. The sprayers increase rotational speed as the brake force is overcome and eventually reaches a steady rotational speed based on the pressure and flow rate provided by the pump.

Once the sensors 100 detect that the water level within the tank 82 has fallen to a level at which pumping should be discontinued, the controller operates to cease supplying power to the pump 84 causing the cessation of pumping operation. When pump operation is stopped, in systems that do not include a drain valve 128 and a perforated distribution container 124, the water flows downward out of the manifold and the bases of the sprayers, and downwardly through the vertically extending header pipes back into the tank 82. In exemplary arrangements the piping is configured so that the level of the water remaining in the header pipes falls to a level below the frost line so as to assure that no freezing of the water will occur. Alternatively in systems that include a drain valve 128 and a perforated distribution container 124, the control circuitry 288 operates to cause the drain valve 128 to be opened when pump operation is stopped. This causes the water in the sprayers and the header pipes to be drained into the perforated distribution container 124. Also in such exemplary arrangements the level of the water falls to below the frost line so that no damage to the system due to freezing occurs.

FIG. 30 shows an alternative graph 304 corresponding to operation of a variable speed pump by exemplary control circuitry. In this exemplary arrangement the control circuitry again initiates operation of the pump responsive to the detection of the water level by the level sensors at a relatively low pressure. The low-pressure operation of the pump is continued for a programmed set time that is sufficient for purposes of filling the lines with water to the level of the sprayers. After the initial period of operation at the low-pressure level, the control circuitry operates to gradually increase the pressure supplied by the pump. The gradual increase continues until the full operating pressure and flow rate is achieved.

As can be appreciated, this exemplary arrangement gradually increases the flow through the spray heads so that the rotational speed of the manifold gradually increases toward the desired rotational speed which produces the desired water spray pattern. In this exemplary arrangement the brake force provided by the brake such as by the liquid in the liquid tight jacket further helps to assure that the rotational speed of the sprayers does not exceed the desired design speed. When the liquid level in the water tank falls in this exemplary control arrangement, the water again drains from the sprayers and the header pipes to below the frost line, either back to the tank or to the perforated distribution container depending on the configuration of the system. In other exemplary arrangements the control circuitry may operate to gradually increase the pump pressure and flow rate from the zero-pressure condition to the operating condition, without an initial timed period of operation at low pressure. Such an approach may also assure achieving desired sprayer water distribution. Of course it should be understood that these control arrangements are exemplary and in other embodiments other control arrangements may be used.

In some exemplary arrangements it is useful to be able to hold the hub 154 of an exemplary sprayer 118 in a rotationally fixed position. This may be helpful for purposes of holding the hub 154 and the nipple end 152 stationary so that a manifold, such as manifold 142 can be threaded into engagement thereto, or detached therefrom. It is also sometimes helpful to hold the hub with the attached manifold stationary so that outlet nozzles such as outlet nozzle 158 can be removed from or installed in connection with the manifold. It is also sometimes useful to be able to hold the hub 154 stationary for testing purposes. For example, an individual installing or testing the system may prefer that the hub and manifold not rotate while they test to determine if the spray pattern from the manifold is suitable for the location in which the sprayer 118 is installed. This can minimize the risk of the individual installing or testing the system getting wet while the spray pattern or pressure is observed and evaluated. In other situations it may be desirable to hold the hub 154 stationary so that the sprayer does not rotate. This may be desirable in certain situations where the manifold and spray nozzle is to distribute the water only into a selected fixed area of the ground surface. It may also be desirable to hold the hub stationary in other circumstances as well.

FIGS. 31 through 34 show a hub lock 306 used with the exemplary embodiment of the sprayer 118. The exemplary hub lock 306 has an integrally formed body 308. The exemplary body 308 may be comprised of plastic, metal or other suitable rigid or semi-rigid material. The exemplary body 308 includes a hub engaging upper yoke 310 and a body engaging lower yoke 312. The upper yoke and the lower yoke are connected through a connector portion 314 of the body.

The upper yoke 310 includes an upper yoke recess 316 therein. The upper yoke recess 316 is bounded on opposed lateral sides by a pair of side walls 318. The pair of side walls of the upper yoke are spaced apart a lateral distance so that they engage the wrench flats 156 on hub 154 in close fitting relation. The side walls 318 are configured so that when the flats 156 of the hub 154 are engaged with the side walls, the hub 154 cannot rotate in the recess 316.

The lower yoke 312 includes a lower yoke recess 320. The lower yoke recess 320 is bounded by a pair of laterally spaced side walls 324. The lower yoke side walls 324 are laterally spaced to engage the wrench flats 146 of the body 144 in close fitting relation. Side walls 324 are configured so that when the side walls are engaged with the wrench flats 146 of the body 144 the body cannot rotate within lower yoke recess 320.

The exemplary hub lock 306 further includes a locking lever 322. Locking lever 322 is rotationally movable about a pivot pin 326. The exemplary locking lever 322 includes a handle projection 328. The handle projection 328 extends outwardly from the front face of the locking lever. The handle projection 328 is configured to facilitate finger engagement for movement of the locking lever.

Figure 32:
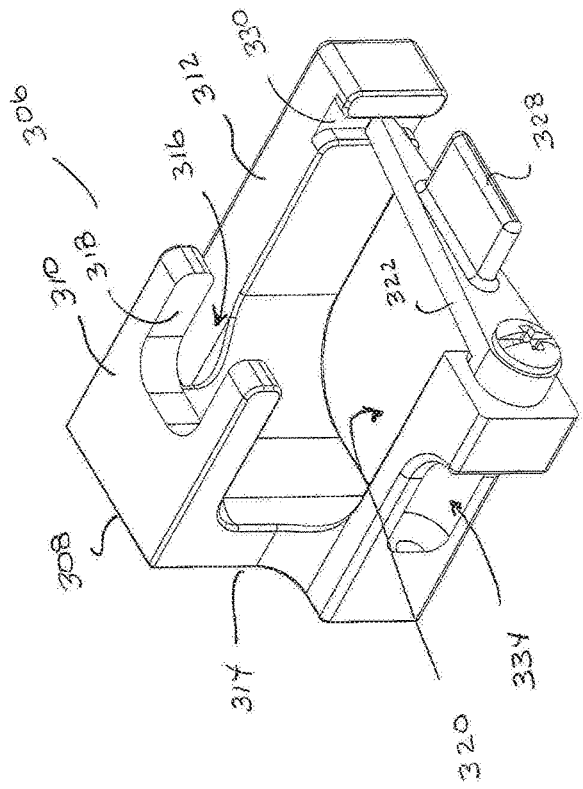
FIG. 32 is a view of the exemplary hub lock shown in FIG. 31 with the locking lever in a closed position.
Figure 34:
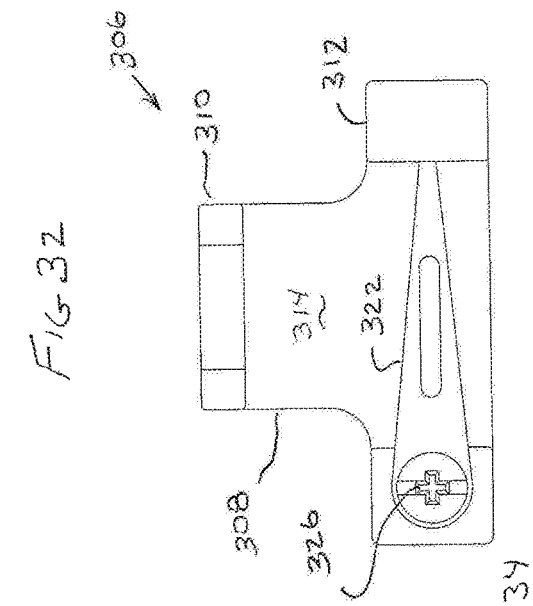
FIG. 34 is a front plan view of the hub lock with the locking lever in the closed position.

In the exemplary arrangement the lower yoke includes a catch slot 330. The catch slot extends on the opposite side of the lower yoke from the pivot pin 326. The catch slot 330 is configured to receive a distal end 332 of the locking lever therein. As represented in FIGS. 31 through 34 the locking lever 322 is manually movable between an open position shown in FIGS. 31 and 33 in which the lower yoke recess 320 is accessible from the front of the hub lock 306, to a closed position shown in FIGS. 32 and 34 in which the lower yoke recess 320 is closed by the locking lever 322. As shown in FIGS. 32 and 34 in the closed position of the locking lever 322, the distal end 332 of the locking lever is engaged in the catch slot 330. The exemplary body also includes a recess 334 on one side of the lower yoke 312. The recess 334 of the exemplary arrangement provides access for a suitable fastener or other device that holds the pivot pin 326 in close fitting engagement with the body 308. In the exemplary arrangement the pivot pin 326 is configured so that when the locking lever 322 is manually rotated to a selected rotational position, the locking lever maintains the set position and is does not move therefrom due to gravity or forces other than deliberate manual movement. Of course this configuration is exemplary, and in other embodiments other structures and configurations may be used.

FIGS. 35 through 38 show the exemplary hub lock 306 in engagement with the exemplary sprayer 118. In the engaged position of the hub lock the sidewalls 318 of the upper yoke 310 are engagement with the wrench flats 156 on the hub 154. In the engaged position, the hub 154 extends in the upper yoke recess 316. The upper yoke extends vertically between the bottom of the manifold 142 which engages the nipple end 152 of the hub 154, and the outlet body end 148 of the body 144.

Figure 35:
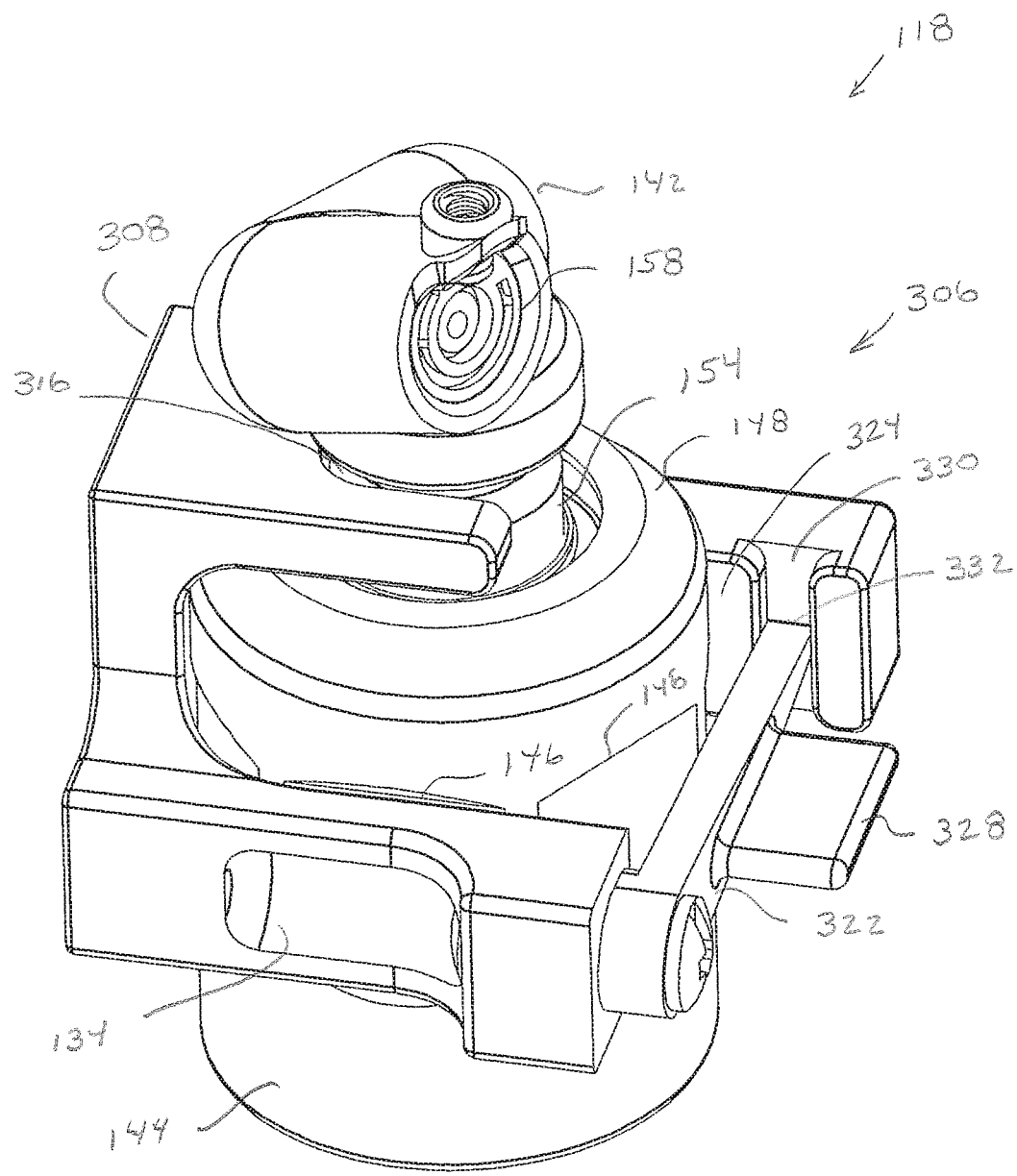
FIG. 35 is a right front top perspective view of the hub lock engaged with the exemplary sprayer.
Figure 36:
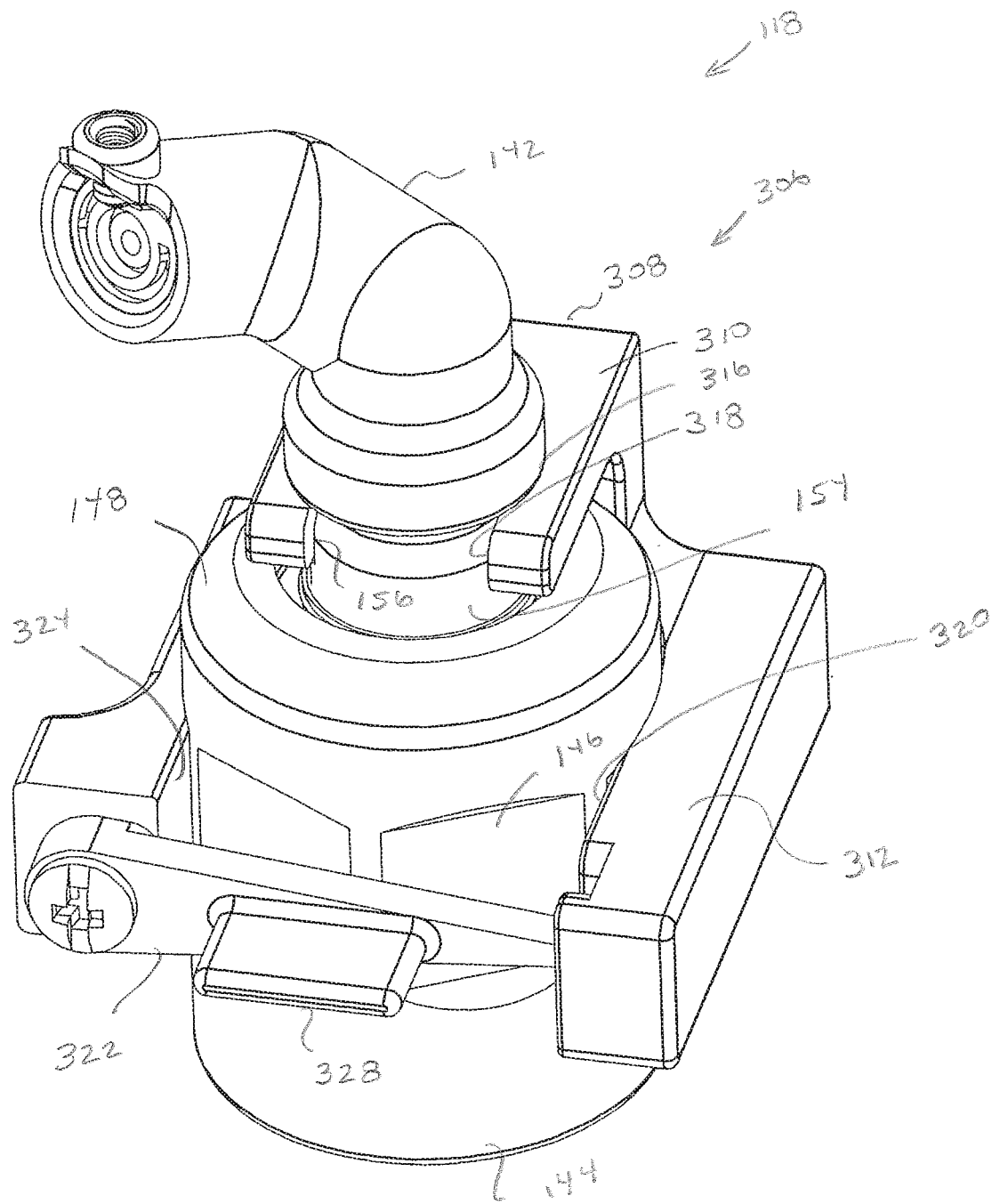
FIG. 36 is a left front top perspective view of the hub lock engaged with the exemplary sprayer.
Figure 37:
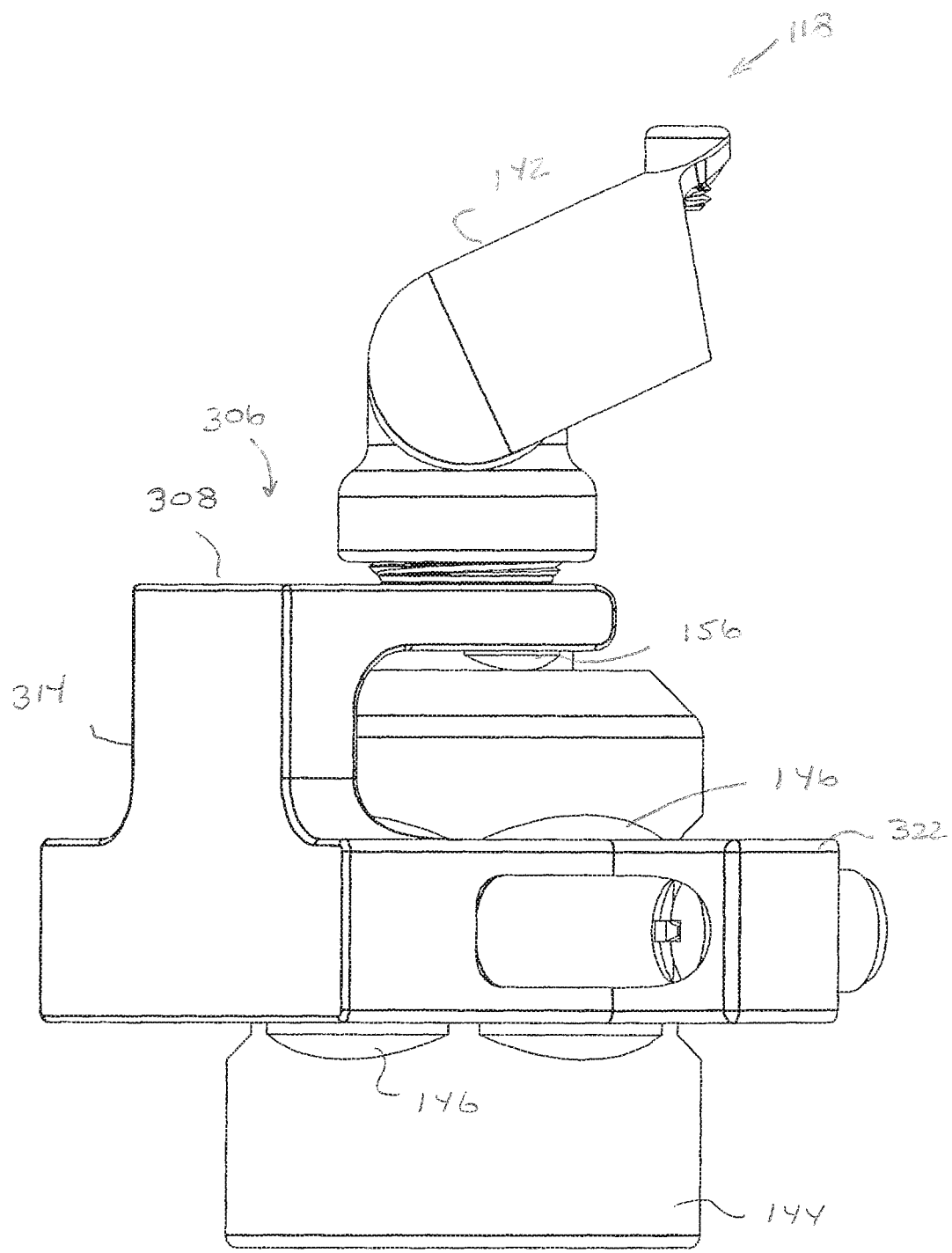
FIG. 37 is a right side view of the hub lock engaged with the exemplary sprayer.
Figure 38:
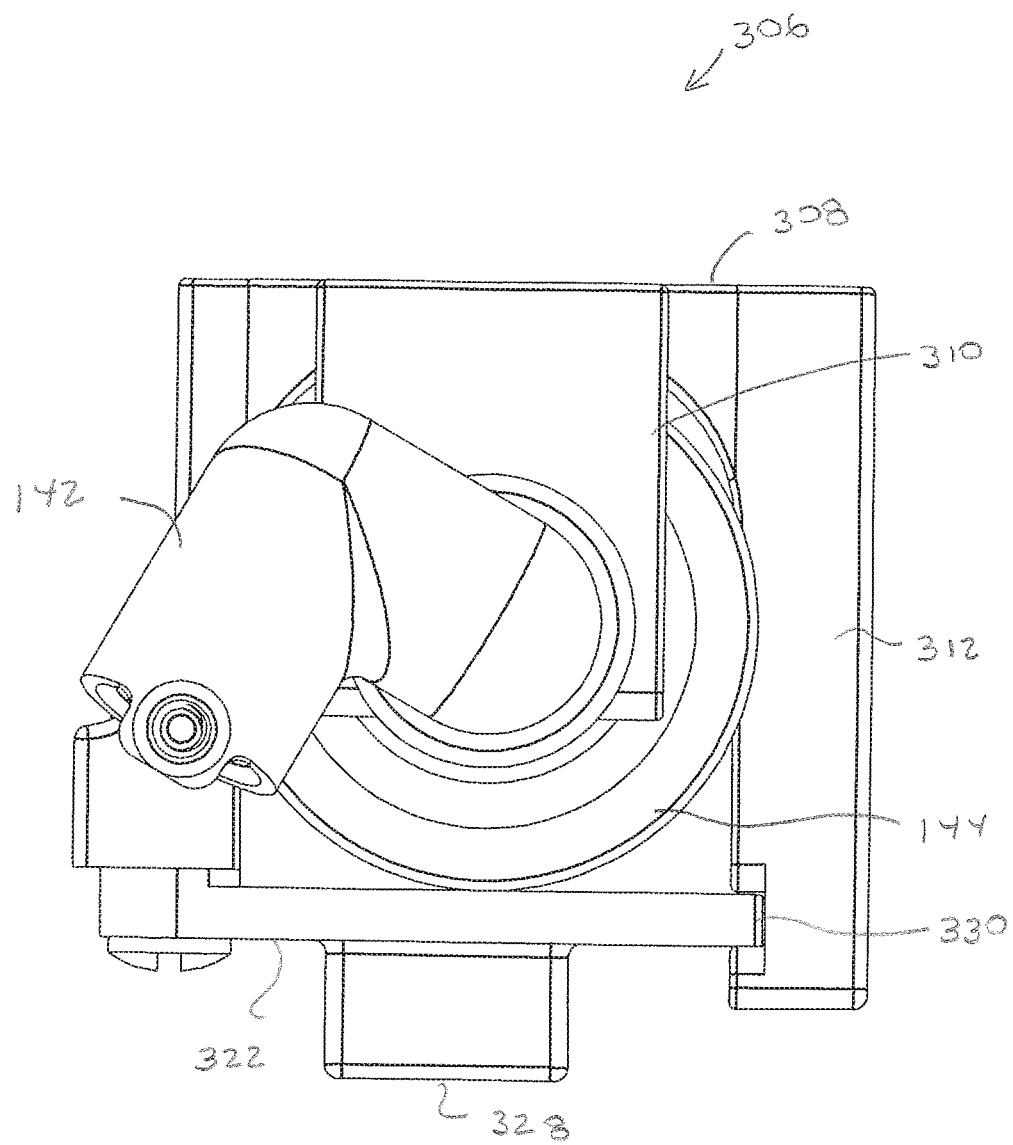
FIG. 38 is a top view of the hub lock engaged with the exemplary sprayer.

Also in the engaged position of the hub lock 306, the side walls 324 which bound the lower yoke recess 320 engage the wrench flats 146 on the body 144. As shown in FIG. 35 because the exemplary body 144 includes a plurality of angularly disposed wrench flats 146, the lower yoke 312 may be positioned in any of numerous angular positions which correspond to a pair of opposed wrench flats 146. This enables the exemplary hub lock 306 to be positioned in different selected angular positions in engagement with the body 144. This may be helpful in situations where access to the body is more readily accessible from one particular lateral side thereof. Of course it should be understood that this configuration is exemplary and in other embodiments other configurations may be used.

When the hub lock 306 is in engagement with the sprayer 118, the locking lever 322 is in the closed position. In this position the distal end 332 of the locking lever is in engagement with the catch slot 330. The positioning of the locking lever 322 in the closed position helps to hold the hub lock 306 in engagement with the sprayer 118. This is because in the closed position of the locking lever the inner face of the locking lever opposite the handle projection 328 is in close adjacent relation with the outer face of the body 144. As a result, of the exemplary hub lock cannot be disengaged from the sprayer by vibration or other forces that may act on the sprayer during work activity or testing.

With the hub lock 306 engaged with the exemplary sprayer as shown in FIGS. 35 through 38, and with the locking lever 322 in the closed position, the hub 154 is held stationary by the sidewalls 318 bounding the upper yoke recess 316. The hub lock 306 is further held stationary by the engagement of the sidewalls 324 of the lower yoke recess 320 with the wrench flats 146 on the body 144. In the engaged configuration and in the closed position of the locking lever 322, the hub lock 306 resists rotational forces that may otherwise be applied that would tend to rotate the hub 154. Such rotational forces may be associated with threadably engaging or disengaging manifold 142 or an alternative manifold with the hub. Such forces may also include forces associated with installing or removing the spray nozzle 158 from the manifold. Other rotational forces that are resisted are rotational thrust forces of water spraying from the nozzle or nozzles of the attached manifold during spray pattern or similar testing.

Figure 31:
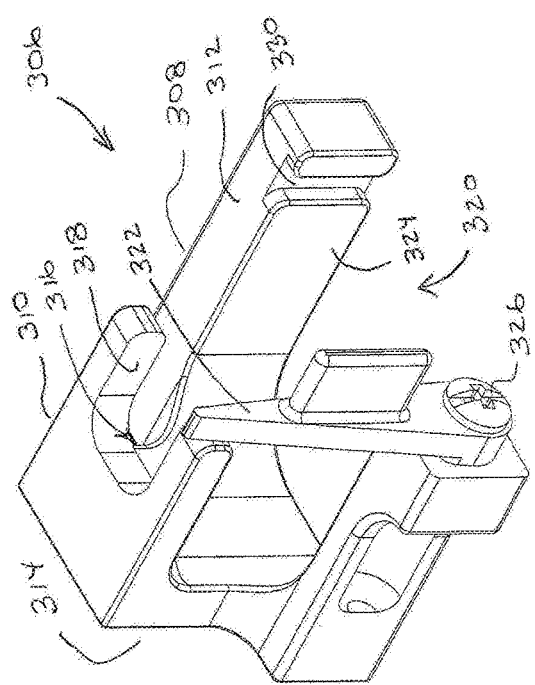
FIG. 31 is a perspective view of an exemplary hub lock used with the exemplary embodiment of the sprayer, with a locking lever in an open position.
Figure 33:
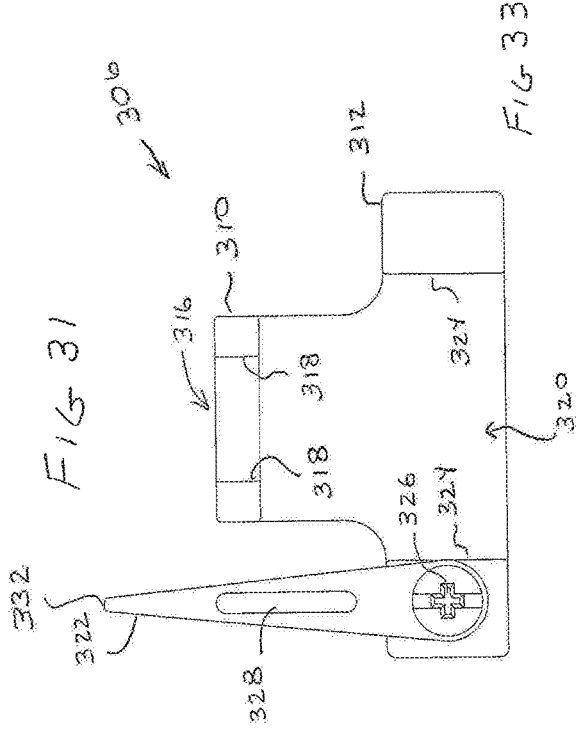
FIG. 33 is a front plan view of the hub lock with the locking lever in the open position.

In the exemplary arrangement when it is desired to remove the hub lock 306 from the sprayer, the locking lever 322 is rotated from the closed position shown in FIGS. 35 through 38 to the open position shown in FIGS. 31 and 33. With the locking lever 322 in the open position the hub lock 306 may be moved so that the hub 154 is no longer engaged in the upper yoke recess 316 and the body 144 is no longer engaged in the lower yoke recess 320. With the hub lock disengaged, the hub 154 and attached manifold 142 are free to rotate in the manner previously described. Of course it should be understood that these structures of the hub lock and the sprayer are exemplary and other embodiments alternative or different structures may be used.

FIGS. 45 and 46 show yet another alternative embodiment of a sprayer 398. Sprayer 398 includes a base 400 and a manifold 402. Manifold 402 includes a single nozzle 404. The manifold 402 rotates in engagement with a nipple end 406 of a hub 408 in a manner similar to the previously described embodiments. Exemplary manifold 402 includes many features of the previously described manifold embodiments. The hub 408 has a slinger 410 attached thereto. The slinger of the exemplary arrangement rotates in engaged relation with the hub 408 and extends radially outward from the hub to beyond the outer surface of the body.

FIGS. 47 and 48 show an alternative sprayer 412. Sprayer 412 includes a base 400 which is the same as that used with sprayer 398. Sprayer 412 includes a manifold 414. Manifold 414 includes a pair of nozzles 416. The nozzles 416 are each radially disposed from the axis of rotation 418 of the hub 408 and are pointed perpendicular to the axis and in generally opposed directions. The exemplary manifold 414 also includes many of the features previously described in connection with manifolds that have been previously discussed.

FIGS. 49 through 66 show numerous features of the exemplary base 400. The exemplary base 400 includes features like those of the previously described sprayer bases 140, 330. Base 400 includes a body 420. Body 420 includes an axially elongated internal cavity 422 in which the hub 408 is rotatable. Similar to the previously described hubs, hub 408 includes a threaded nipple end 406 that is releasably engageable with a manifold inlet on the upper side of the base outside of the body 420.

The axially elongated cavity 422 of body 420 includes an outer cavity portion 424. The outer cavity portion includes an internally threaded outer cavity end 426. Axially inwardly of the threaded end 426 of the outer cavity portion is a smooth annular portion 428. Inwardly of the hub from the annular portion 428 is a hexagonal pocket 430. The hexagonal pocket 430 is bounded inwardly by a radially inward extending surface 432.

The hexagonal pocket 430 includes a circular opening 434 through which the hub 408 extends and in which the hub is rotatable. Axially inwardly of the of the circular opening 434, the body includes an inner cavity portion generally indicated 436. Inner cavity portion 436 includes a radially outward extending step 438. An annular wall 440 bounds the inner cavity portion 436 axially inwardly of the radially outward extending step 438. The annular wall 440 terminates at a radially outward extending surface 442. The inner cavity portion 436 terminates inwardly in an enlarged threaded inner cavity end 444 at an inlet end of the body. The inner cavity end 444 is configured to releasably engage a header pipe or other suitable conduit that delivers liquid into the inlet end of the body. Of course it should be understood that this configuration is exemplary and variations on configuration of the cavity 422 may be made in various different embodiments.

Figure 55:
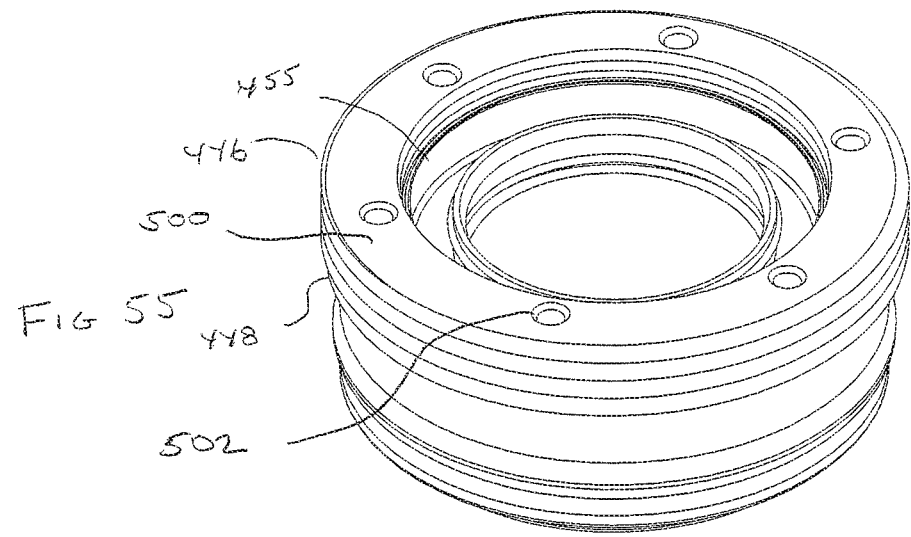
FIG. 55 is a top perspective view of an exemplary cap of the base shown in FIG. 49 with the outer seal and outer bushing installed therein.
Figure 56:
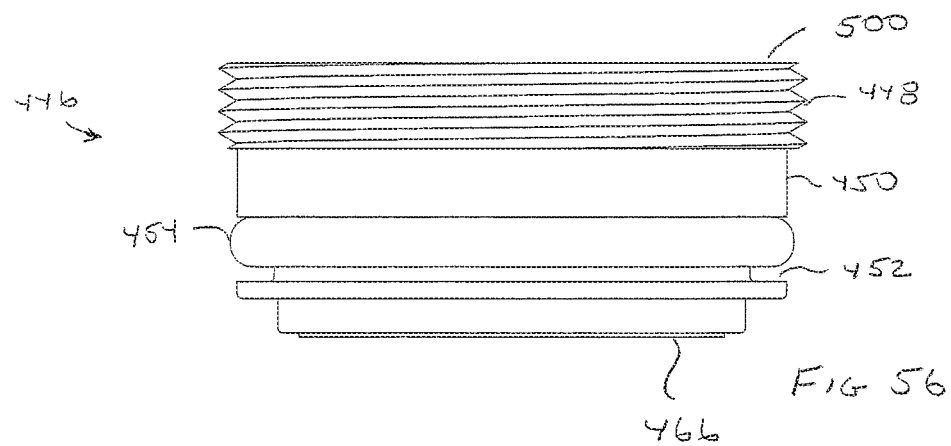
FIG. 56 is a side view of the cap, outer seal and outer bushing assembly of FIG. 55.
Figure 57:
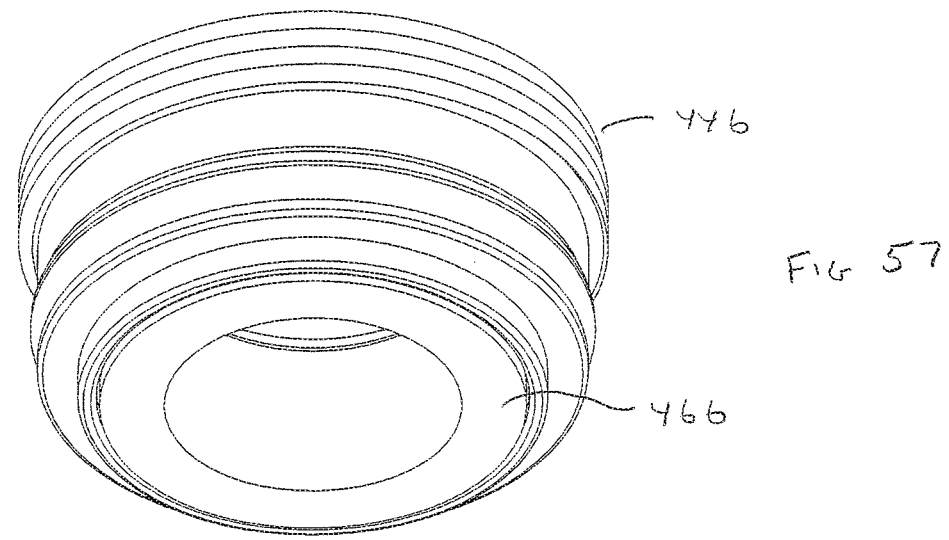
FIG. 57 is a front bottom perspective view of the cap, outer seal and outer bushing assembly of FIG. 55.
Figure 58:
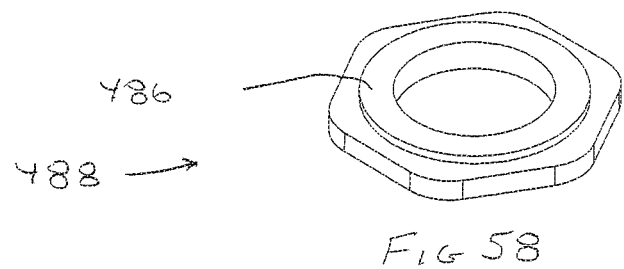
FIG. 58 is a front top perspective view of a stator portion of the brake of the base shown in FIG. 49.
Figure 59:
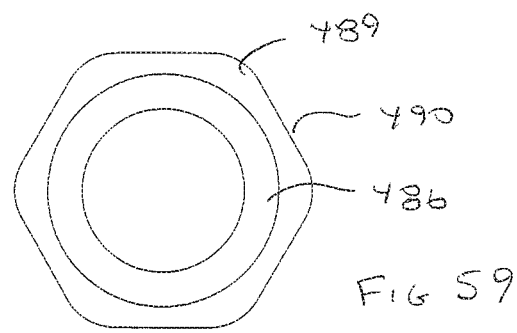
FIG. 59 is a top view of the stator shown in FIG. 58.
Figure 60:
FIG. 60 is a side view of the stator shown in FIG. 58.
Figure 61:
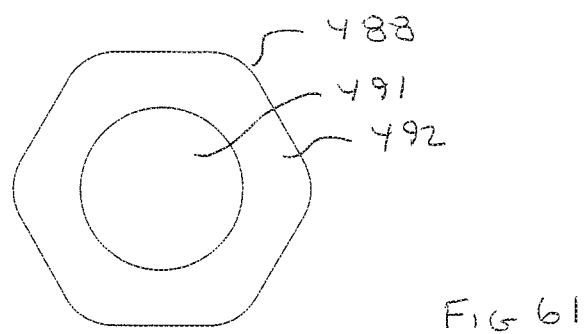
FIG. 61 is a bottom view of the stator shown in FIG. 58.
Figure 62:
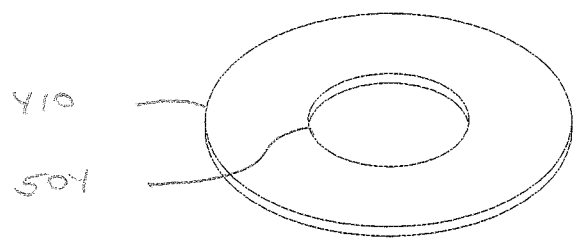
FIG. 62 is a front perspective view of a slinger of the exemplary base shown in FIG. 49.
Figure 63:
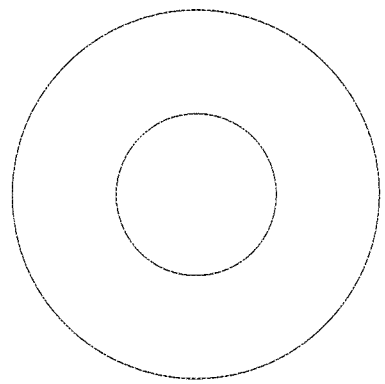
FIG. 63 is a top plan view of the slinger.
Figure 64:
FIG. 64 is a side cross-sectional view of the slinger.
Figures 65, 66:
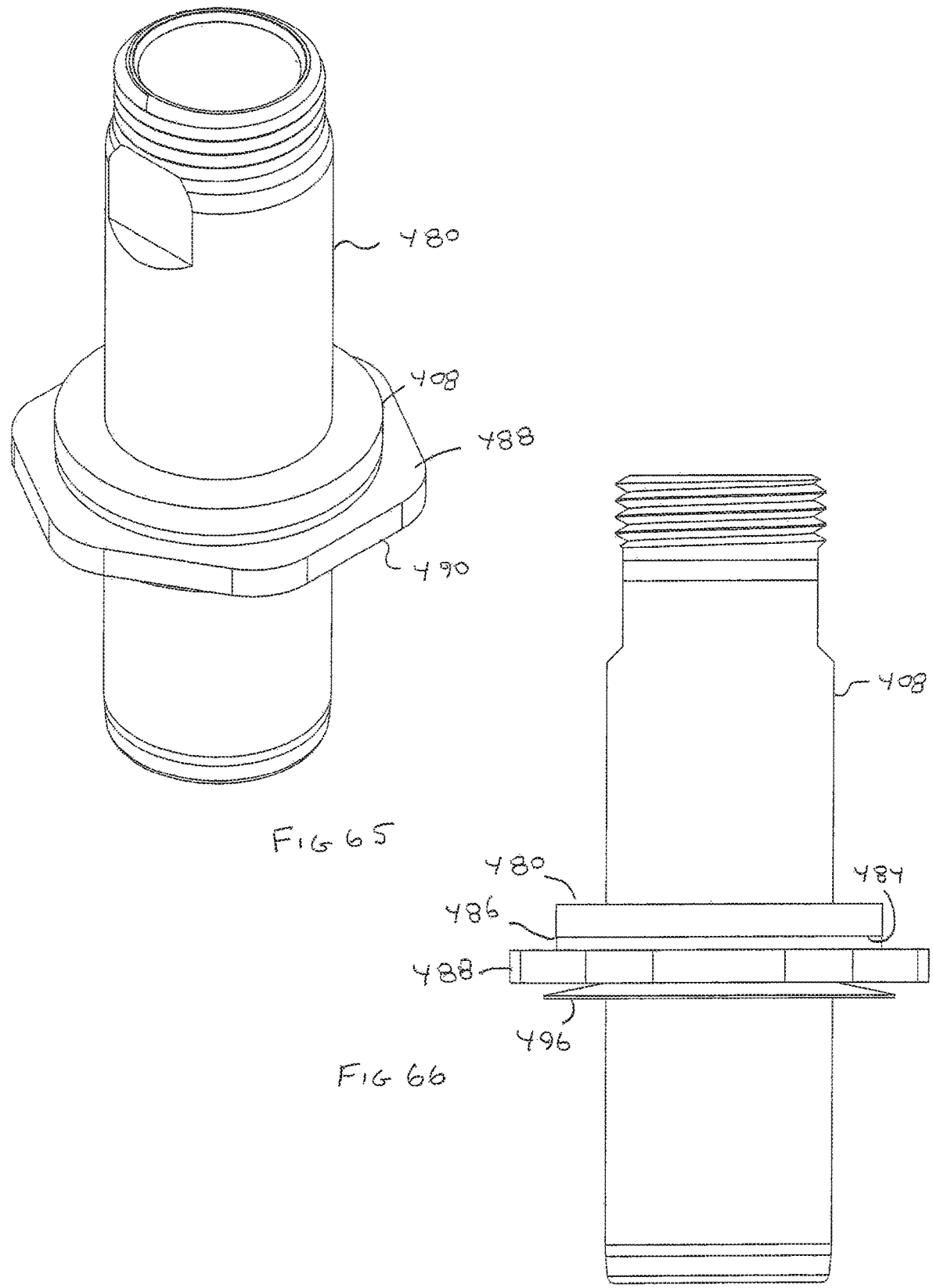
FIG. 65 is a front top perspective view of the hub and stator of the exemplary base of FIG. 49.
FIG. 66 is a side view of the hub, stator and annular spring of the exemplary base of FIG. 49.

A cap 446 which is shown in greater detail in FIGS. 55-57 is rotatably positioned in the outer cavity portion 424. The cap 446 includes a threaded outer cap portion 448 that is threadably engaged with the threaded outer cavity end 426. The cap 446 further includes axially inwardly of the threaded portion 448, an inner annular portion 450. The inner annular portion 450 is radially disposed inwardly of annular portion 428 of the body. The exemplary inner annular portion 450 includes an annular cap outer recess 452. A resilient annular seal 454 extends in the annular cap outer recess. Seal 454 provides sealing engagement between the inner annular portion 450 of the cap 446 and that the wall bounding the annular portion 428 of the body 420.

The exemplary cap 446 includes an outlet body end opening 455. The cap further includes an outer annular seal recess 456. An outer seal 458 is positioned within the outer annular seal recess 456. The outer seal 458 provides fluid tight sealing engagement between the cap 446 and the hub 408. The cap 446 inwardly of the seal 458 includes an annular cap bore 460. The bore 460 terminates inwardly at a radially outward extending inner cap surface 462. Radially outward extending surface 462 terminates at an annular axially inward extending inner cap projection 464.

An outer bushing portion 466 is positioned in the cap bore 460. The hub 408 extends in rotatable journaled relation in the bushing portion 466. The exemplary bushing portion 466 is integral of a cylindrical barrel portion 468. The bushing 466 further includes an annular radially outward extending step portion 470. Annular step portion 470 extends in nested relation and terminates radially inwardly of the annular inner cap projection 464. In exemplary arrangements the bushing 466 may be comprised of a suitable low friction material such as a plastic or bronze which enables the hub 408 to rotate in journaled relation therewith. Of course this configuration is exemplary and other embodiments other approaches may be used.

An inner bushing portion 472 is positioned in the inner cavity portion 436. In the exemplary arrangement the inner bushing portion 172 is in axially abutting relation with the radially outward extending step 438 and the annular wall 440. The exemplary inner bushing portion 472 is also comprised of a suitable low friction material that enables the hub 408 to rotate therein in journaled relation. An inner seal 474 is positioned in abutting engagement with the radially outward extending annular surface 142. The inner seal 474 is in resilient sealing engagement with the outer surface of the hub which rotates therein. Similar to the hubs previously described, hub 408 includes an axial passage 476 through the hub 408 that extends from the inner cavity portion 436 to the nipple end 406. The inner seal 474, the outer seal 458 as well as the seal 454 help to assure that liquid passes through the body 420 only through the axial passage 476 of the hub 408 and that liquid that flows through the body does not extend in the cavity 422 outwardly of the inner seal 474. Of course it should be understood that this approach is exemplary and other embodiments other configurations may be used.

The exemplary body 420 includes a brake 478. The brake 478 operates to provide a brake force that resists rotation of the hub in a manner similar to that previously described. In the exemplary arrangement of body 420, the brake 478 includes an annular disc rotor portion 480 which extends radially outwardly on the hub. The exemplary disc rotor portion 480 includes an outer annular face 482 and an inner annular face 484 which are alternatively referred to herein as radially extending rotor walls. In the exemplary arrangement the outer annular face 482 is in abutting engagement with the annular radially outward extending step portion 470 of outer bushing 466.

In the exemplary arrangement the inner annular face 484 of the disc rotor portion 480 is in engagement with an annular friction disc portion 486 of a stator 488. As best shown in FIGS. 58-61, the stator 488 of the exemplary embodiment has a hexagonal body 489 which has an outer body perimeter 490 that is configured to be positioned in close-fitting engagement with the cavity wall bounding the hexagonal pocket 430. This configuration helps to assure that the stator remains rotationally stationary within the hexagonal pocket. This exemplary stator 488 includes a central opening 491 through which the hub extends and is rotatable therein. The exemplary stator is axially movable in the hexagonal pocket in a manner that is later discussed. The annular friction disc portion 486 extends axially outwardly on the stator body 489. The exemplary stator 488 includes a bottom face 492 that is substantially flat.

Figure 67:
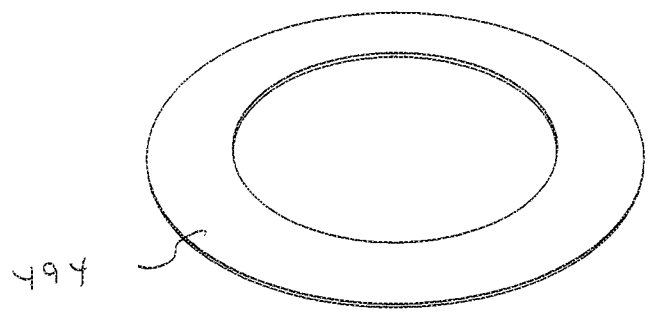
FIG. 67 is a front top perspective view of an exemplary annular spring.
Figure 68:
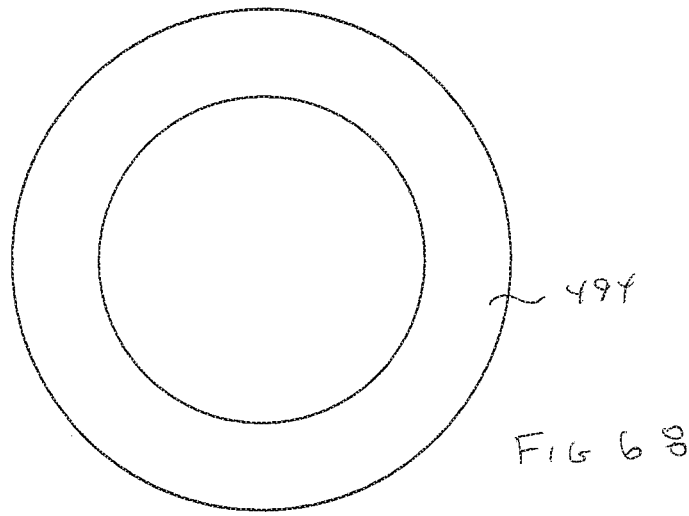
FIG. 68 is a top view of the exemplary annular spring shown in FIG. 67.
Figure 69:
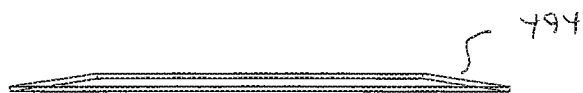
FIG. 69 is a side view of the exemplary annular spring shown in FIG. 67.
Figure 70:
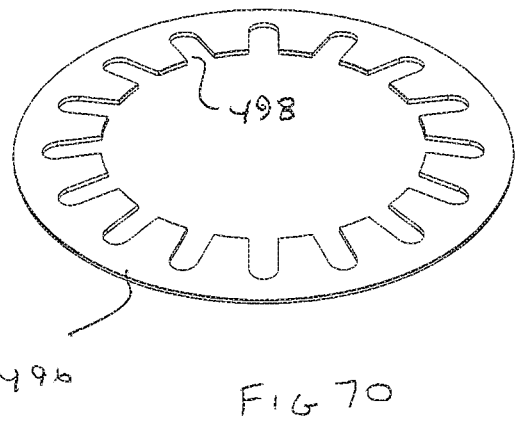
FIG. 70 is a front top perspective view of an alternative annular spring.
Figure 71:
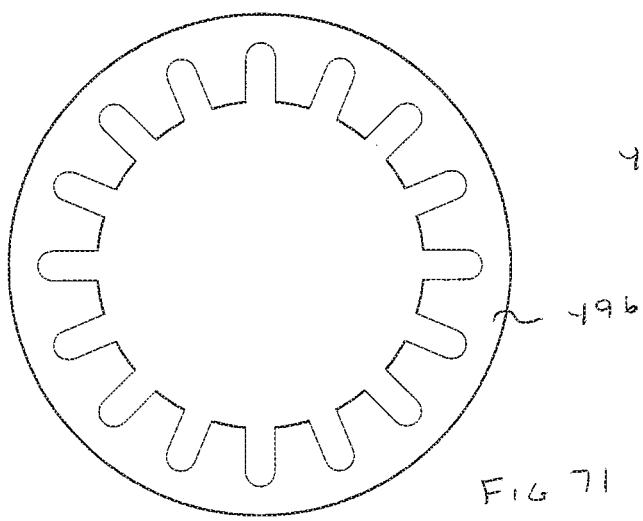
FIG. 71 is a top view of the exemplary annular spring shown in FIG. 70.
Figure 72:
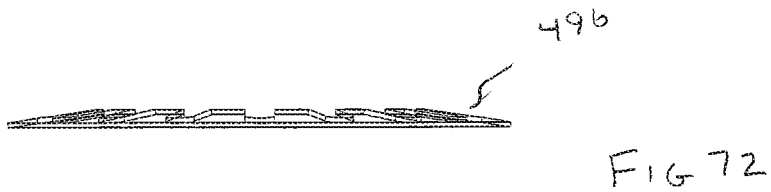
FIG. 72 is a side view of the exemplary annular spring shown in FIG. 70.

In the exemplary arrangement an annular spring 494 extends in surrounding relation of the hub 408 and inwardly of the bottom face 492 of the stator 488. In the exemplary arrangement the annular spring 494 comprises a Belleville spring which biases the friction disc portion 486 toward engagement with the inner annular face 484 and resists axially inward movement of the stator 488. An exemplary annular Belleville spring 494 that may be used in some embodiments is shown in FIGS. 67-69. However it should be understood that other types of annular springs or other forms of deformable resilient bodies may be utilized as a spring in exemplary arrangements. For example, an alternative annular spring 496 is shown in FIGS. 70-72. The alternative annular spring 496 also comprises a Belleville spring but includes radially extending slots 498 that extend from the central internal opening of the spring. Such slots and the size and angular displacement thereof may provide for a spring with a selected compressive spring force that differs compared to a solid annular spring. However it should be understood that various types of springs and configurations may be utilized in various embodiments.

In the exemplary arrangement the cap 446 includes an annular outer cap face 500. As best shown in FIG. 55 the annular outer cap face 500 includes a plurality of angularly spaced tool engaging recesses 502. In alternative arrangements the outer cap face may include tool engagement projections. The tool engaging recesses 502 or alternatively tool engageable projections of the exemplary arrangement are engageable with a tool that may be used for selectively rotating the cap 446.

Further in the exemplary arrangement of the base 400, the slinger 410 is positioned in outwardly overlying relation of the outer cap face 500. In the exemplary arrangement the slinger 410 is in releasable engagement with the hub 408 and rotates therewith when the slinger is in the operative position. The exemplary slinger which is shown in greater detail in FIGS. 62-64, includes an opening 504 through which the nipple end 406 of the hub extends in close-fitting relation. The close-fitting overlying relation of the slinger to the face 500 of the exemplary embodiment and continuous radial surfaces of the slinger generally prevents contaminants or other material from reaching the outlet body end opening 455 or the area of the outer seal 158. Further the rotation of the slinger 410 with the hub 408 further helps to cause contaminants that fall downwardly onto the slinger to be thrown outwardly away from the body through centrifugal force. Of course it should be understood that this slinger configuration is exemplary and other embodiments other types of slinger devices and slinger configurations may be used.

In the exemplary operation of the base 400 the amount of brake force that is applied through operation of the brake 478 is settable through rotation of the cap 446. As can be appreciated from FIGS. 49 and 73, rotation of the cap 446 causes the cap to be selectively moved axially inward and outward relative to the body 420 due to the engagement of threaded portion 448 of the cap threaded outer cavity end 426. As the cap 446 is moved axially inward the annular radially outward extending step portion 470 of the outer bushing 466 moves axially inwardly while pressing against the outer annular face 482 of the disc rotor portion 480 of the hub.

The axially inward movement of the brake rotor portion 480 causes the inner annular face 484 to move axially inwardly while in biasing engagement with the annular friction disc portion 486 of the stator 488. The annular spring 494 is compressed due to inward axial movement of the disc rotor portion 480 as the stator body moves axially inwardly in the hexagonal pocket 430. Such inward movement of the stator body causes greater spring force to be applied by the friction disc portion 486 of the stator against the inner annular face 484. The axial force acting between the annular radially outward extending step portion 470 of the bushing 466 and the outer annular face 482 also contributes to the brake force, but the amount of such force is substantially less than that provided by the stator against the inner annular face 484 due to the relatively low friction properties of the bushing 466 in the exemplary arrangement. The increased axial force of the stator increases the brake force applied by the stator acting against the inner annular face 484 of the disc rotor portion 480 of the hub.

Figure 73:
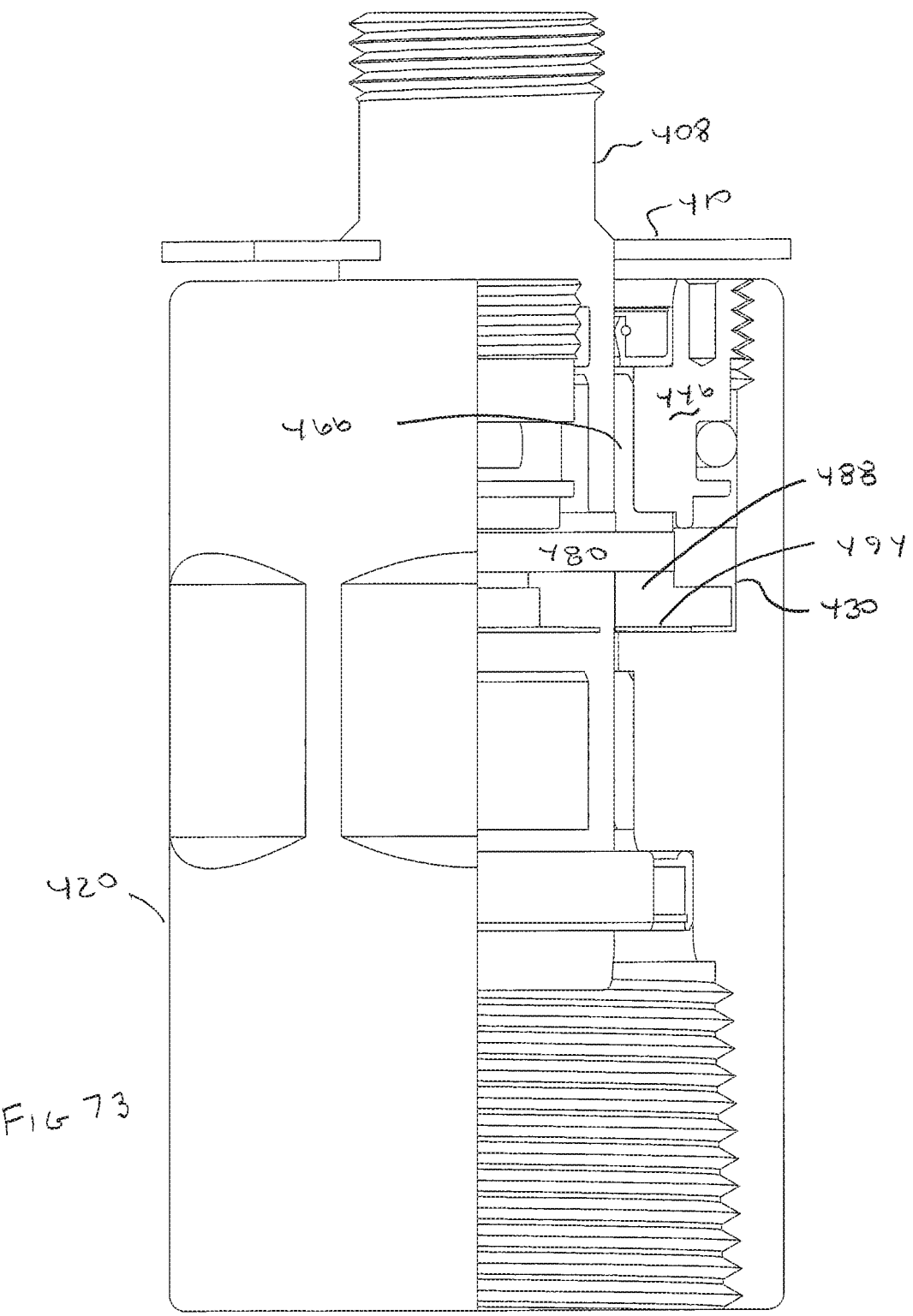
FIG. 73 is a sectional view of the base shown in FIG. 49 with the annular spring fully compressed.
Figure 74:
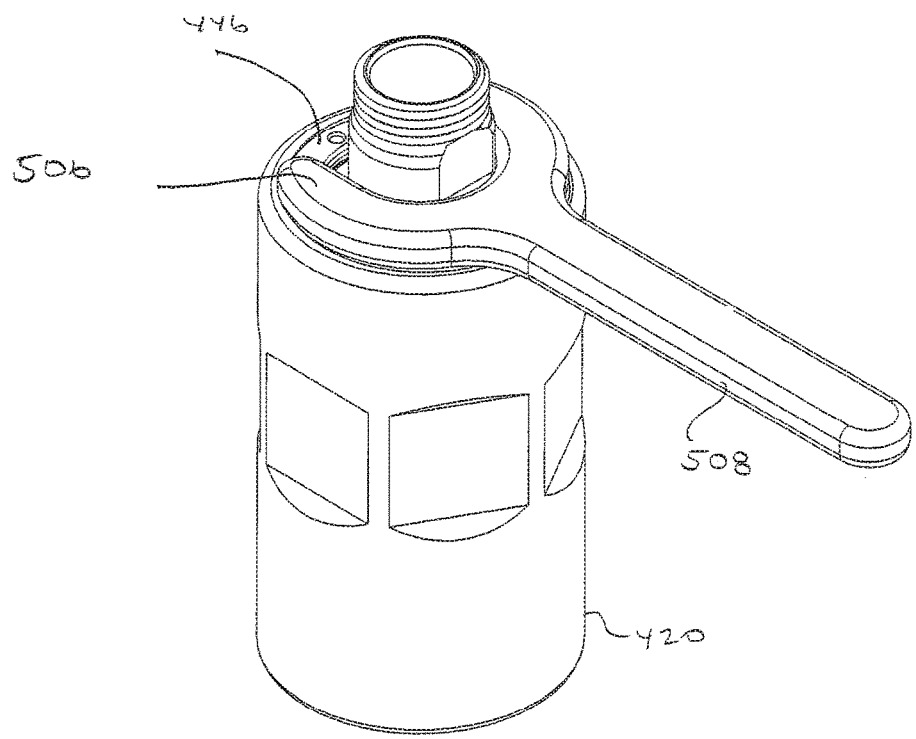
FIG. 74 is a front top perspective view of the exemplary base shown in FIG. 49 with a tool in engagement with the rotatable cap.
Figure 75:
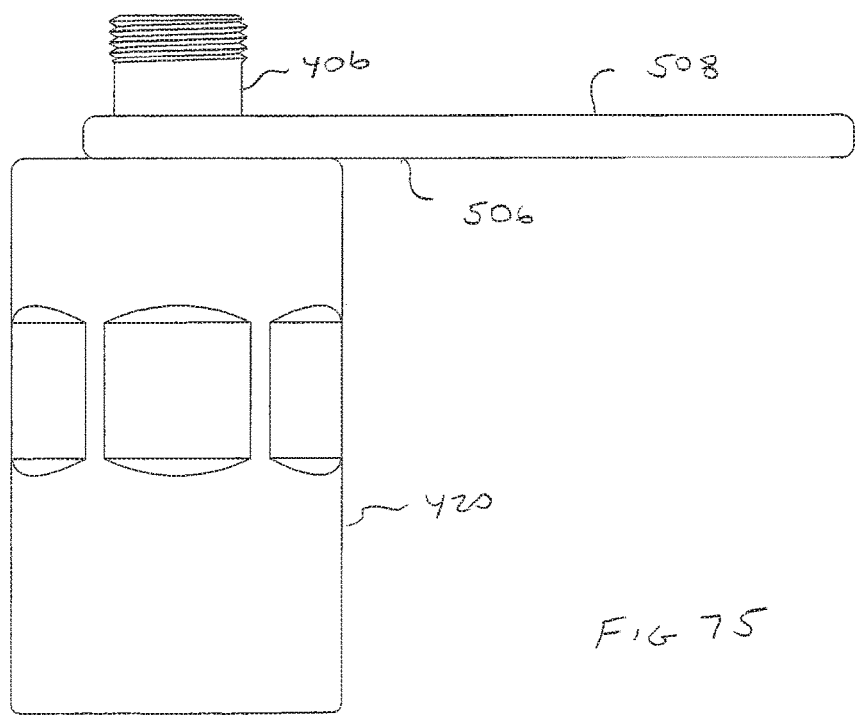
FIG. 75 is a side view of the base and tool shown in FIG. 74.
Figure 76:
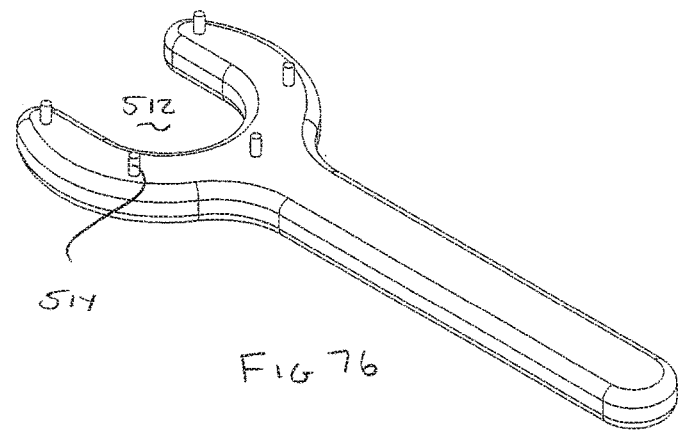
FIG. 76 is a back bottom perspective view of a tool usable for rotation of the cap of the exemplary base.
Figure 77:
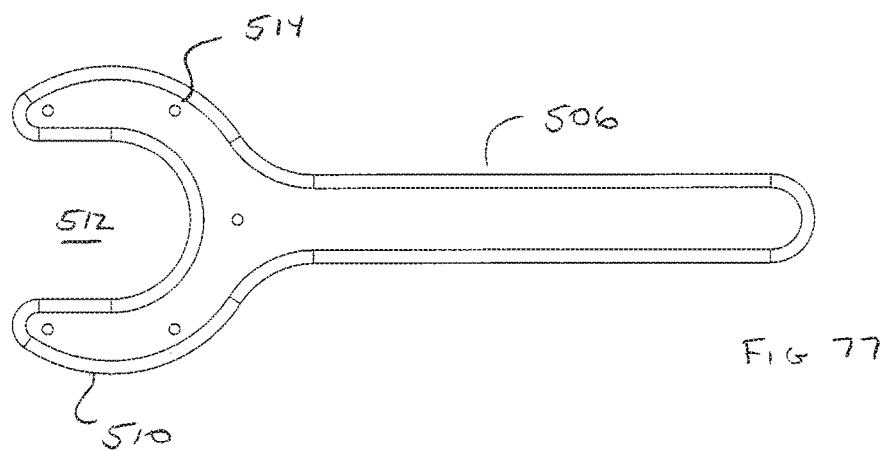
FIG. 77 is a bottom view of the tool shown in FIG. 76.
Figure 78:
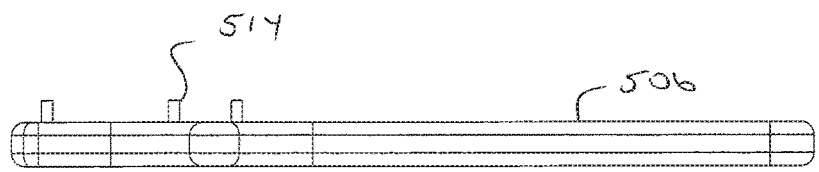
FIG. 78 is a side view of the tool shown in FIG. 76.

As can be appreciated the further axially inward that the cap 446 is moved in the body 420 the more the annular spring 496 is compressed. In the exemplary arrangement the annular spring 496 can be compressed until the spring is substantially flat as shown in FIG. 73. As can be appreciated this ability to set the brake force of the exemplary arrangement enables selectively controlling the rotational properties of the base 400 and the exemplary sprayers of which the base is a part. Of course it should be understood that this configuration is exemplary and other arrangements other approaches and configurations may be used.

FIG. 74 through 78 show an exemplary tool 506 that may be utilized for purposes of rotating the exemplary cap 446. The exemplary tool 506 includes a manually graspable handle portion 508. The exemplary handle portion 508 enables the user to manually grasp the tool and obtain greater leverage to achieve rotation of the cap 446.

The exemplary tool 506 includes a generally U-shaped portion 510 that includes a central recess 512. Recess 512 is configured to extend in generally surrounding relation of the nipple end 406 of the hub. The U-shaped portion 510 includes a plurality of angularly spaced outward extending pins 514 thereon. The pins are configured to each extend in a tool engaging recesses 502 of the cap 446. Thus the engagement of the pins 514 with the recesses 502 enables sufficient torque to be transmitted from the tool 506 to readily rotate the cap and selectively adjust the brake force that operates to resist rotation of the hub 408 as may be desired for the particular sprayer. Of course it should be understood that this approach is exemplary and other types of apparatus may be utilized for purposes of providing adjustment and/or axial movement to a brake to adjust braking force.

Figure 79:
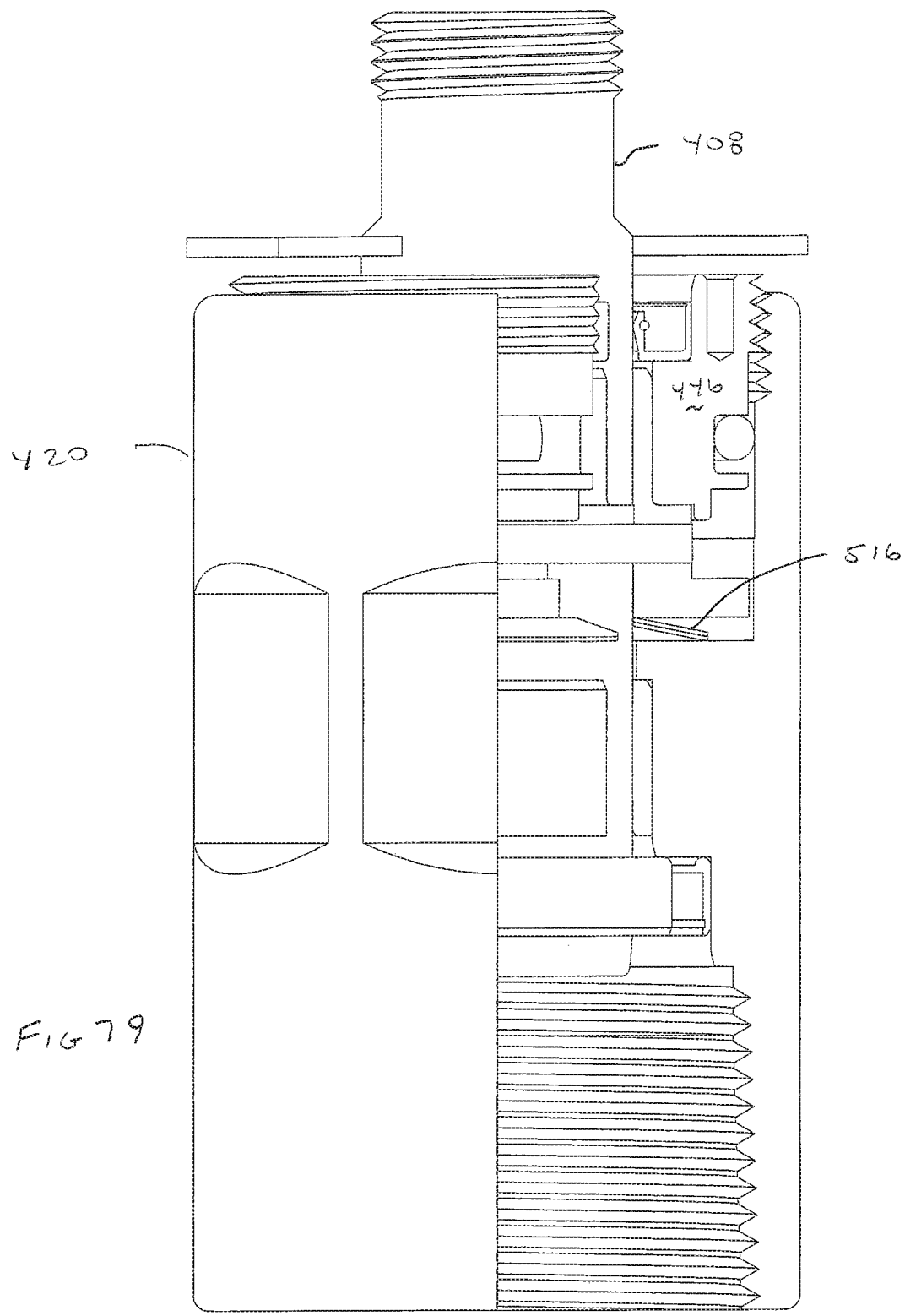
FIG. 79 is a sectional view of the base shown in FIG. 49 with a pair of annular stacked springs arranged in parallel.
Figure 80:
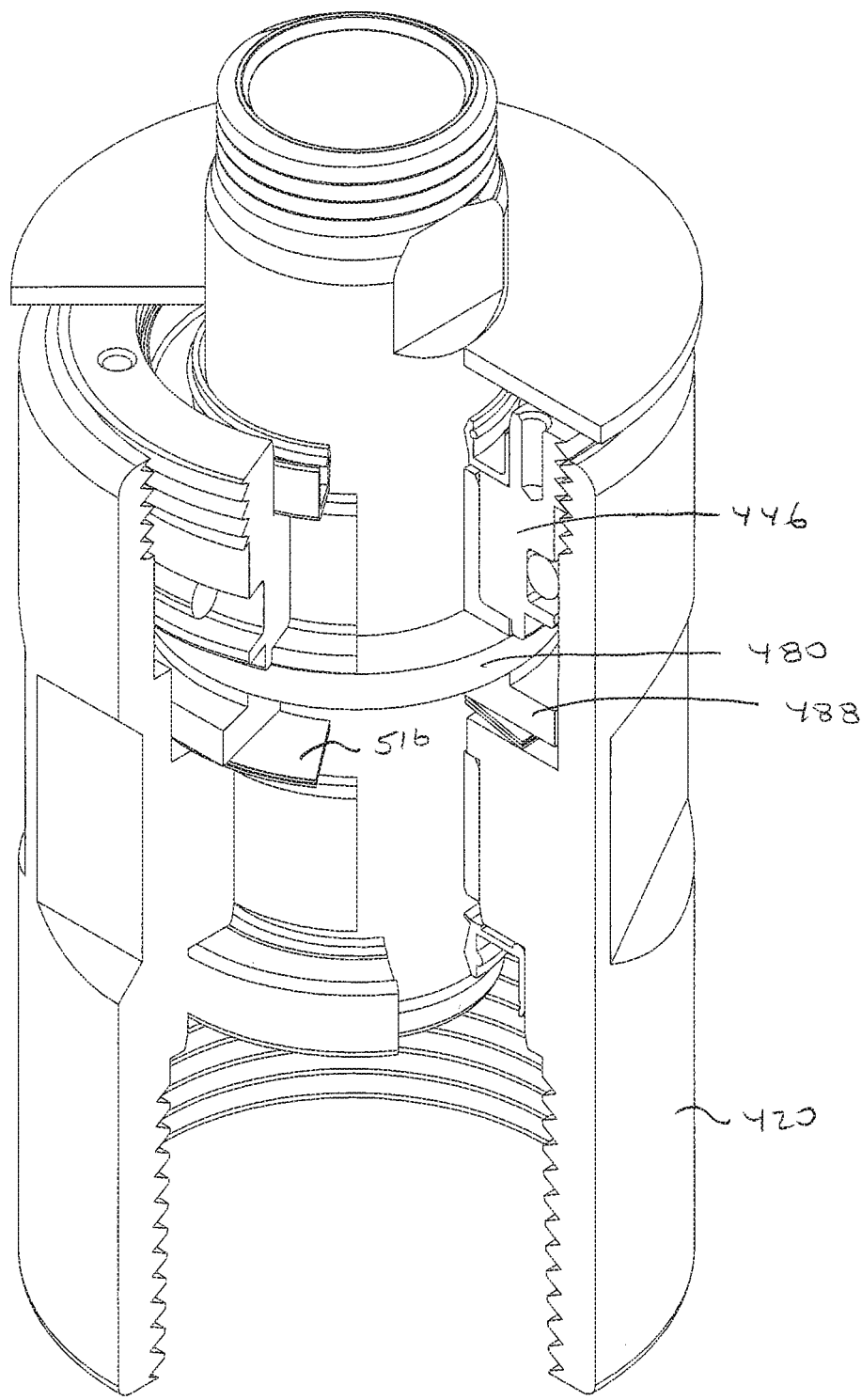
FIG. 80 is a front top perspective sectional view of the base shown in FIG. 79.

FIGS. 79 and 80 show body 420 as previously described with a different arrangement of annular springs which are operative to be selectively compressed and apply a selected level of brake force which resists rotation of the hub 408. In this alternative arrangement a pair 516 of parallel stacked annular springs apply the variable brake force as the cap 446 is rotated to move selectively inward and outward in the body. In this exemplary arrangement the pair 516 comprises two overlying parallel Belleville springs. In such exemplary arrangements the pair of stacked springs is operative to provide a greater resistive spring force for a given amount of inward movement of the cap 446. As can be appreciated the arrangement shown in FIGS. 79 and 80 may be employed when a greater brake force is desired compared to that achievable with a single annular spring.

Figure 81:
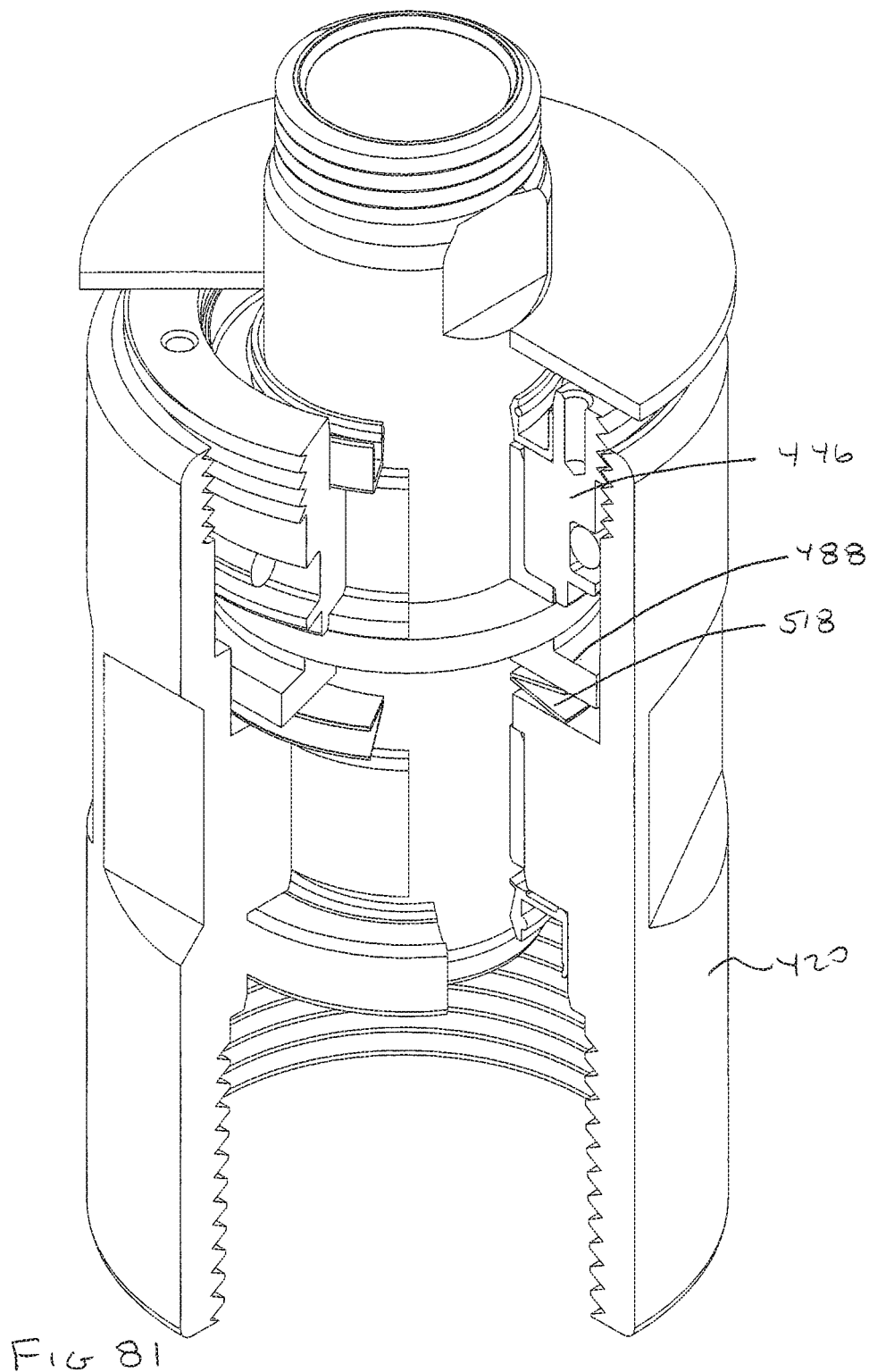
FIG. 81 is a front top perspective sectional view of the base shown in FIG. 49 but with a pair of annular stacked springs positioned in series.
Figure 82:
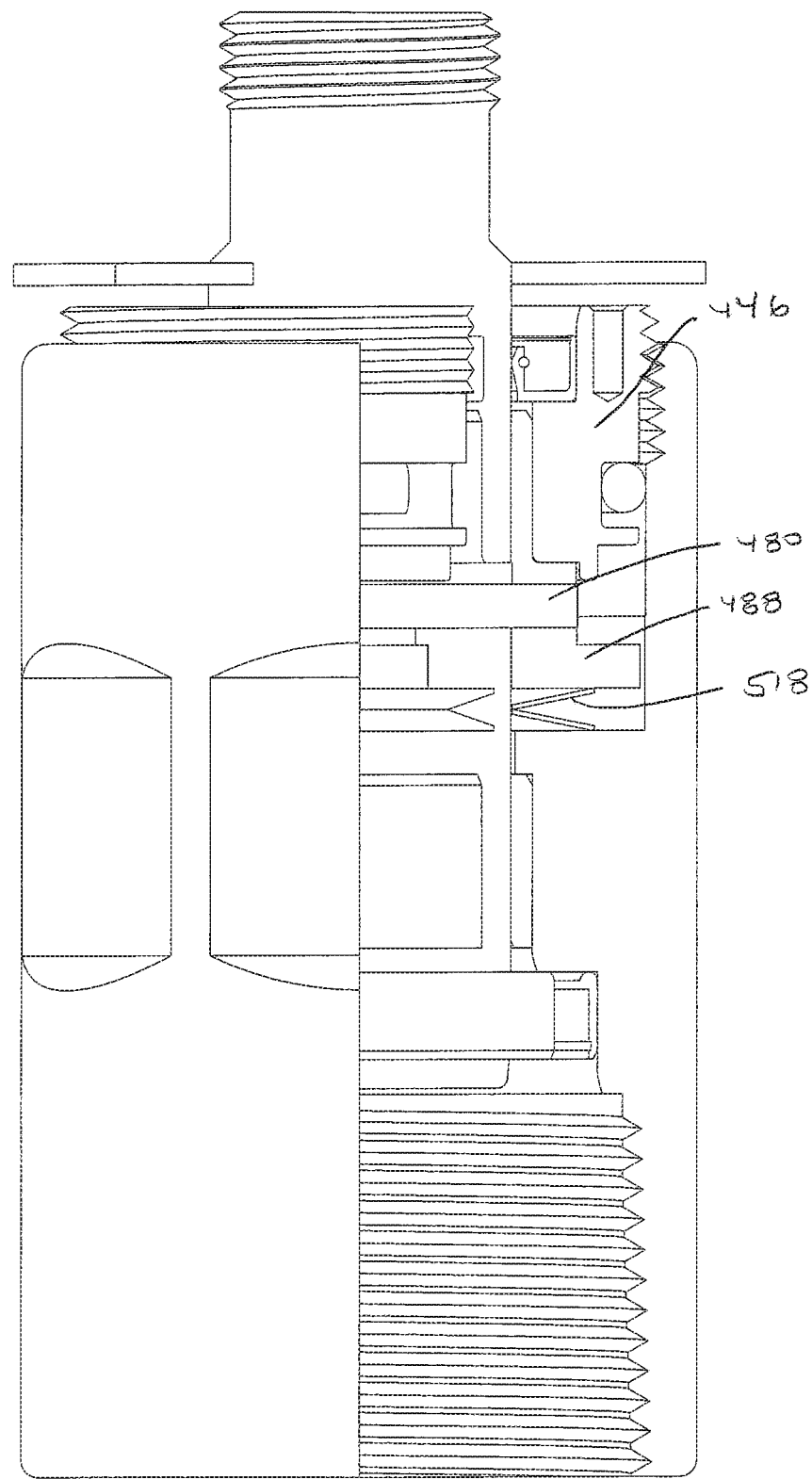
FIG. 82 is a side sectional view of the base as shown in FIG. 81.

FIGS. 81 and 82 show body 420 as previously described with yet another spring arrangement. In this arrangement a pair 518 of stacked annular springs arranged in series are operative to apply a selected brake force responsive to the axial position of the cap 446 in the body. In this arrangement the annular springs are arranged to provide a greater length of axial travel of the stator 488 for adjustment of the brake force. The amount of the brake force that may be applied may also be adjustable based on the nature of the annular springs. Of course it should be understood that this spring arrangement, like the other spring arrangements described herein, are exemplary and in other embodiments other spring arrangements and configurations may be used.

FIGS. 83-92 show a further alternative embodiment of a manifold generally indicated 520. Manifold 520 has many features of the manifolds previously described. Manifold 520 includes a manifold inlet 522 that is releasably engageable with the nipple end of a hub. Manifold 520 further includes a port 524 which is suitable for releasably engaging a pressure indicator or a plug in a manner like that previously described. The exemplary manifold 520 is configured to have a pair of nozzles, each of which is radially disposed from the axis of rotation 526. The nozzles are directed perpendicular to the axis and in opposed directions so as to impart rotational force to the manifold in a manner like that previously discussed.

Figure 87:
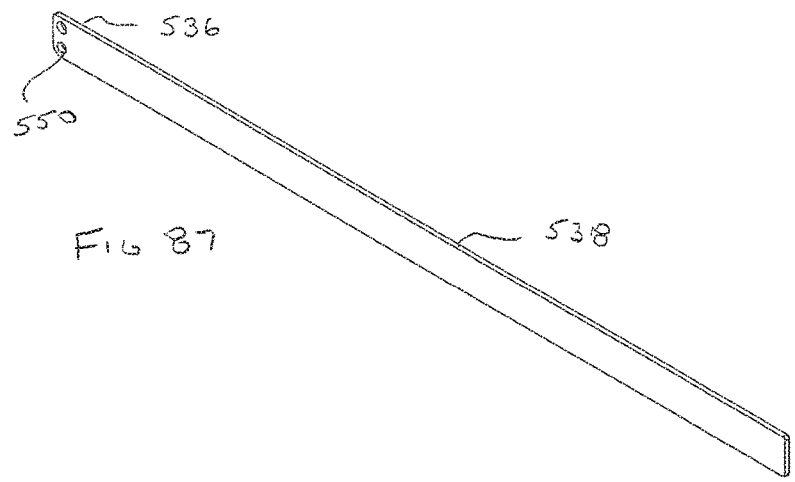
FIG. 87 is a front top right perspective view of an exemplary flap configured to be attached to the manifold shown in FIG. 83.
Figure 88:
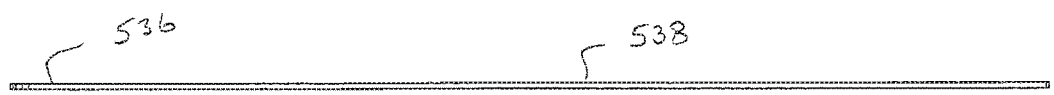
FIG. 88 is a top view of the exemplary flap shown in FIG. 87.
Figure 89:
FIG. 89 is a front view of the exemplary flap shown in FIG. 87.
Figure 93:
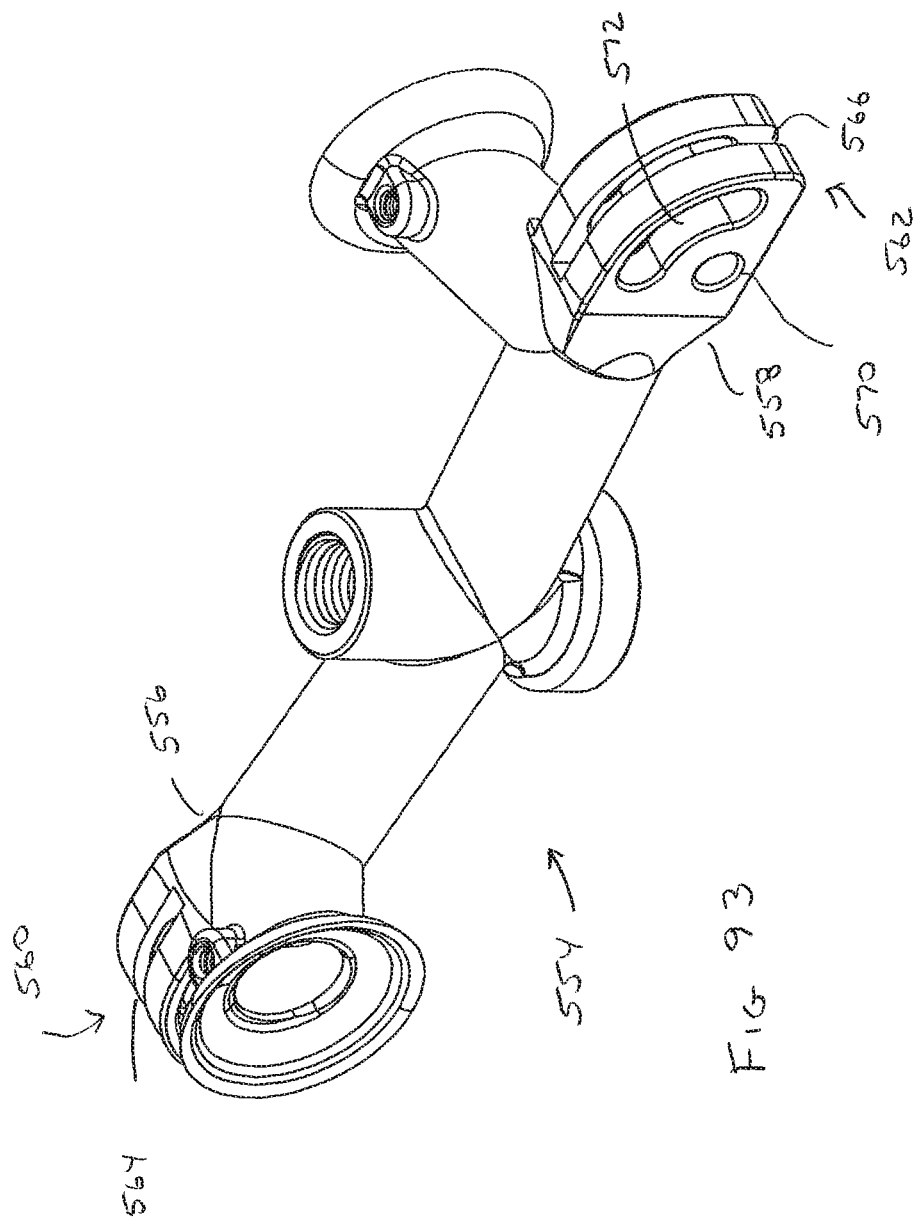
FIG. 93 is a top front right perspective view of an alternative manifold including a pair of flap engaging projections.
Figure 94:
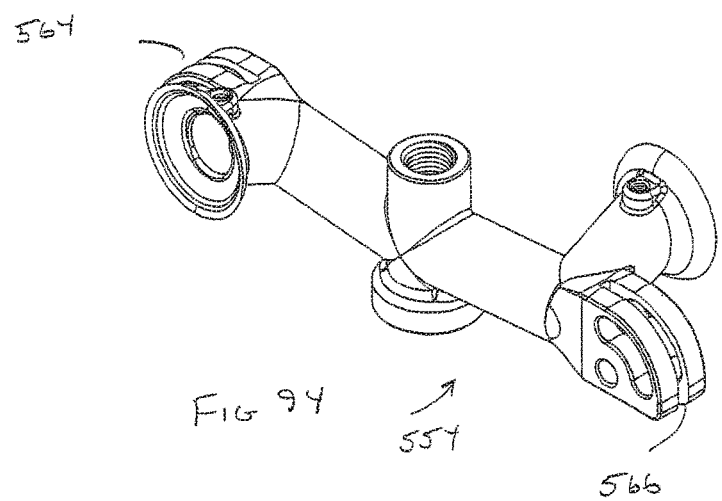
FIG. 94 is a smaller view of the manifold shown in FIG. 93.
Figure 95:
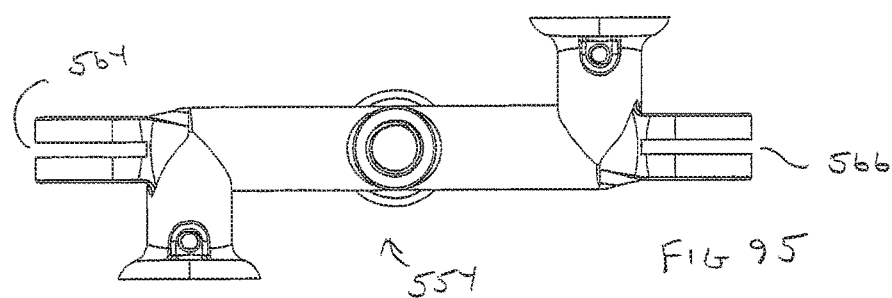
FIG. 95 is a top view of the manifold shown in FIG. 93.
Figure 96:
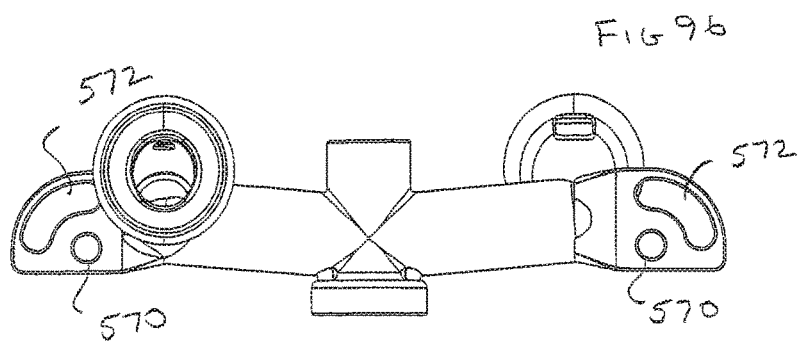
FIG. 96 is a front view of the manifold shown in FIG. 93.
Figure 97:
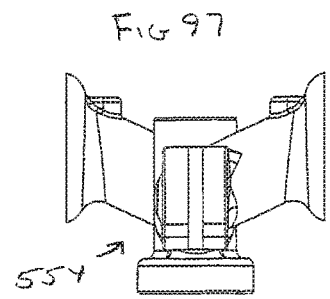
FIG. 97 is a side view of the manifold shown in FIG. 93.
Figure 104:
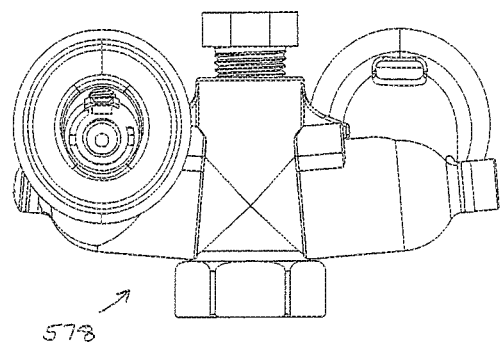
FIG. 104 is a front view of the manifold shown in FIG. 101.
Figure 105:
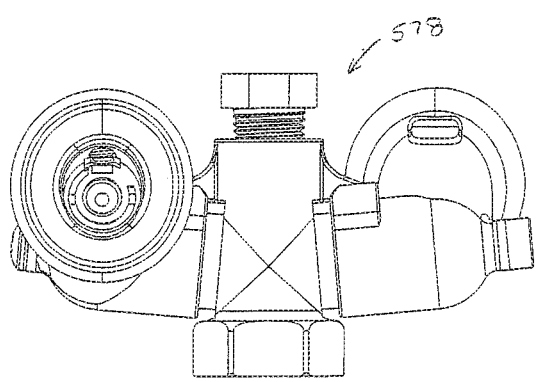
FIG. 105 is a front view of the manifold shown in FIG. 102.
Figure 106:
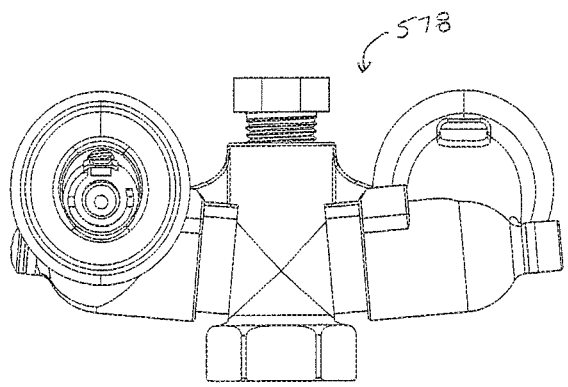
FIG. 106 is a front view of the manifold shown in FIG. 103.
Figure 107:
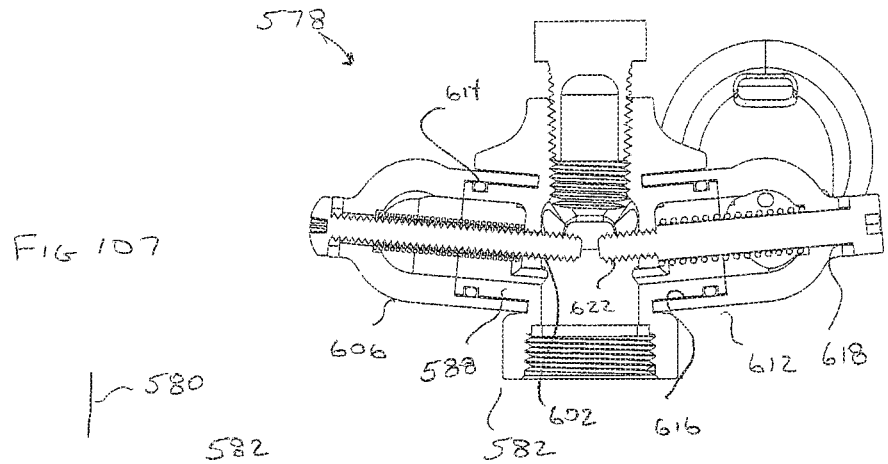
FIG. 107 is an axial cross-sectional view of the manifold shown in FIG. 101.
Figure 108:
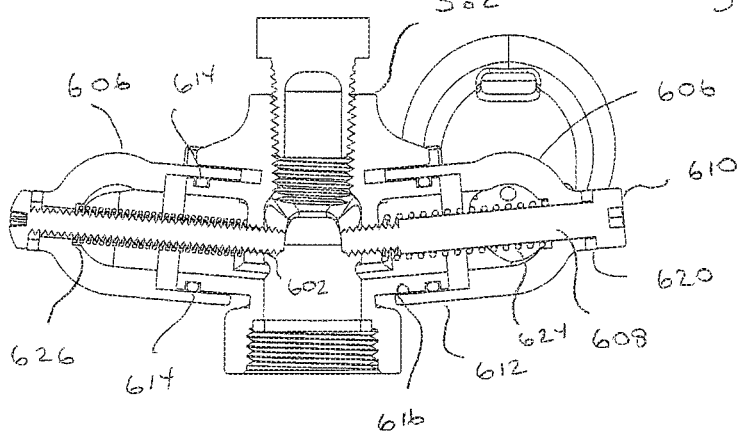
FIG. 108 is an axial cross-sectional view of the manifold shown in FIG. 102.
Figure 109:
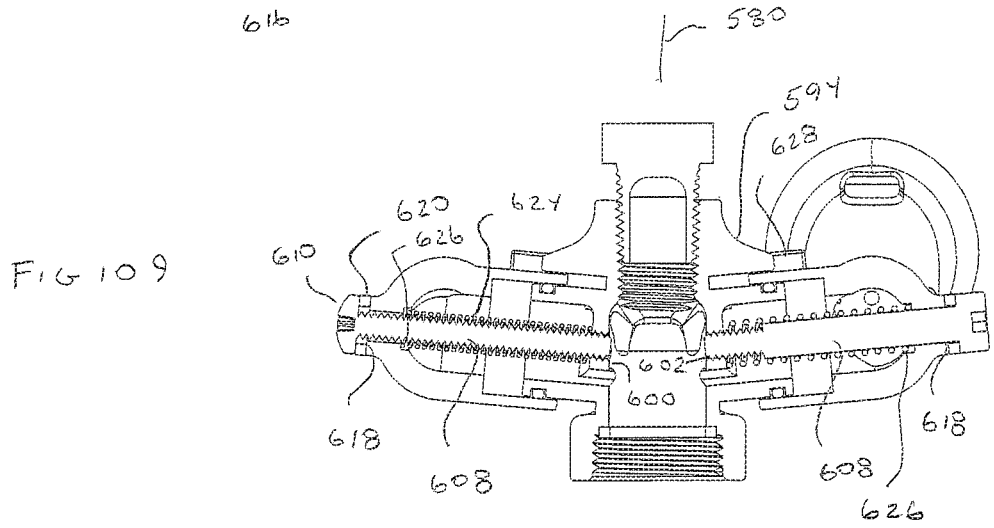
FIG. 109 is an axial cross-sectional view of the manifold shown in FIG. 103.
Figure 110:
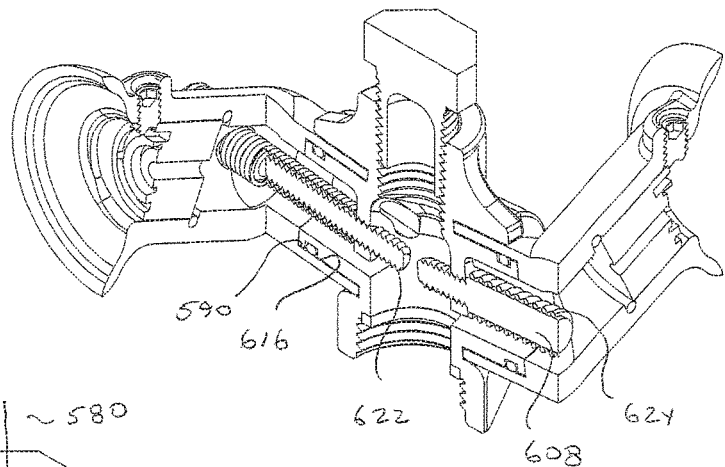
FIG. 110 is a perspective sectional view of the manifold shown in FIG. 101.
Figure 112:
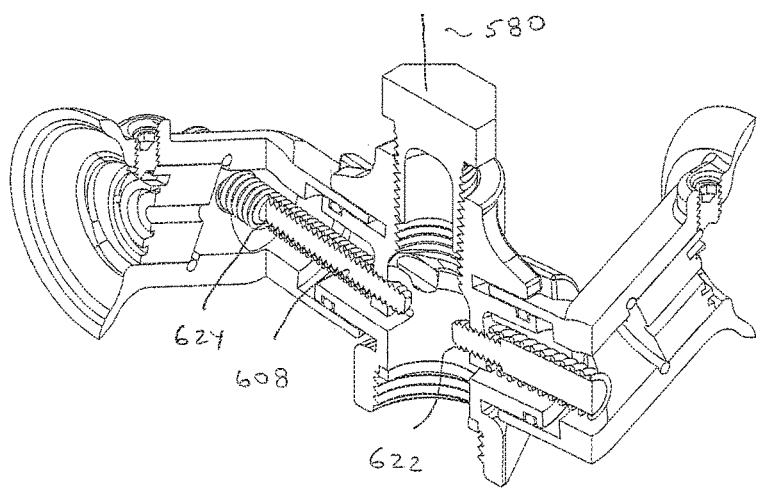
FIG. 112 is a perspective sectional view of the manifold shown in FIG. 102.
Figure 113:
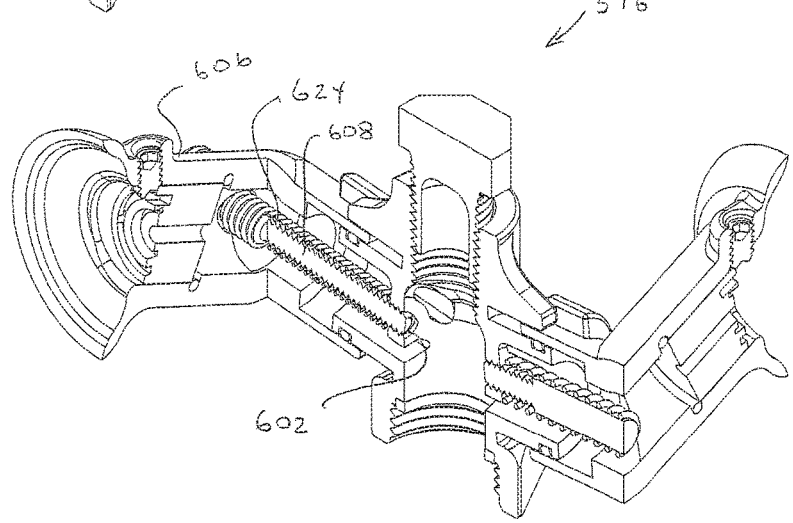
FIG. 113 is a perspective sectional view of the manifold shown in FIG. 103.
Figure 111:
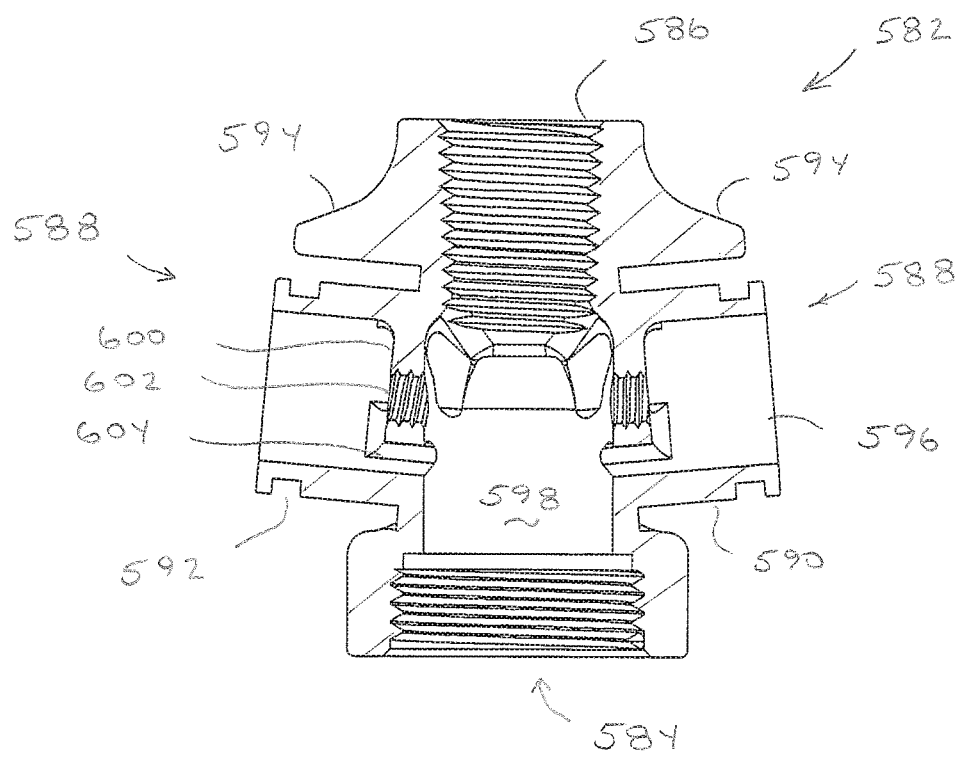
FIG. 111 is a front cross sectional view of a head of the exemplary manifold shown in FIGS. 101-103.
Figure 114:
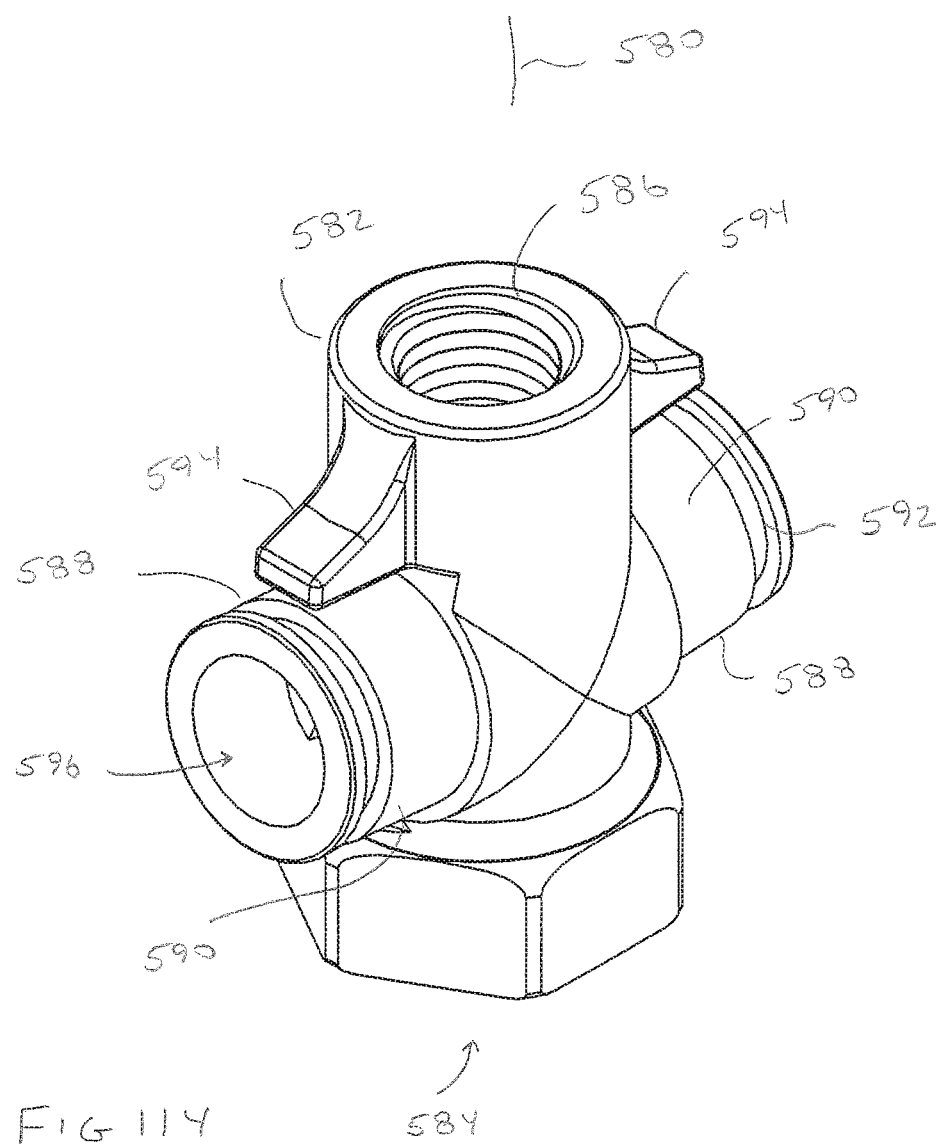
FIG. 114 is a front top left perspective view of the head of the exemplary manifold shown in FIGS. 101 through 103.
Figure 116:
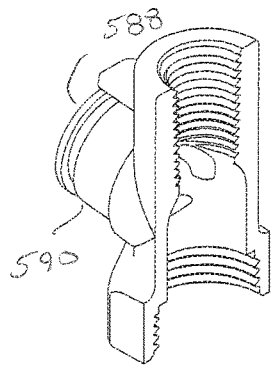
FIG. 116 is a top right perspective view of the section of the head shown in FIG. 115.
Figure 117:
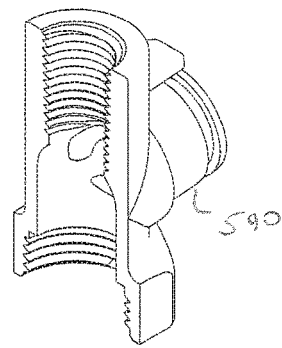
FIG. 117 is a top left perspective view of the section of the head shown in FIG. 115.
Figure 115:
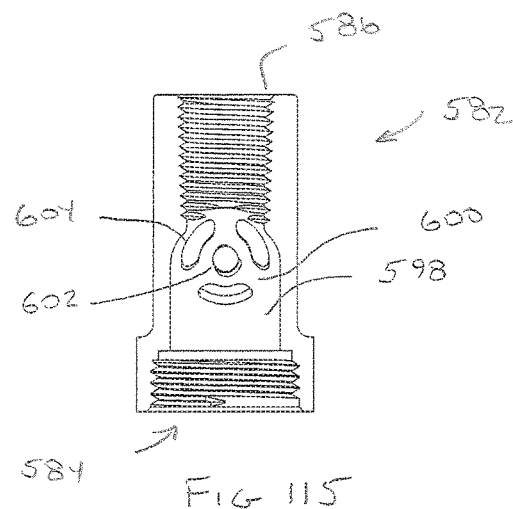
FIG. 115 is a side cross-sectional view of the head shown in FIG. 114.
Figure 118:
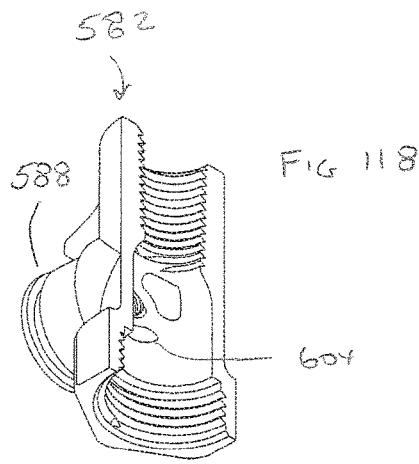
FIG. 118 is a bottom right perspective view of the section of the head shown in FIG. 115.
Figure 119:
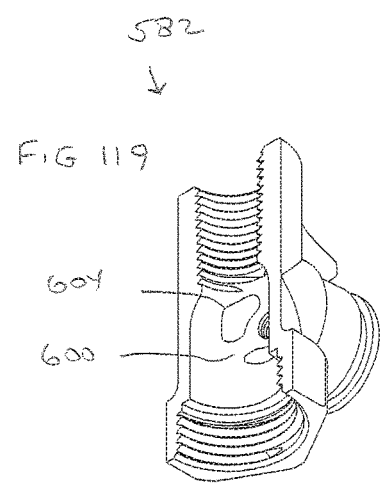
FIG. 119 is a bottom left perspective view of the section of the head shown in FIG. 115
Figure 120:
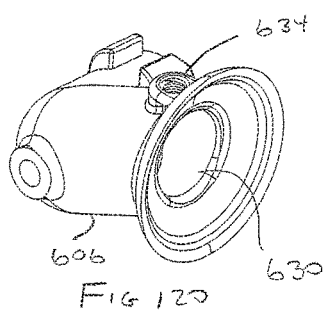
FIG. 120 is a top front right perspective view of an exemplary arm of the manifold shown in FIG. 101.
Figure 121:
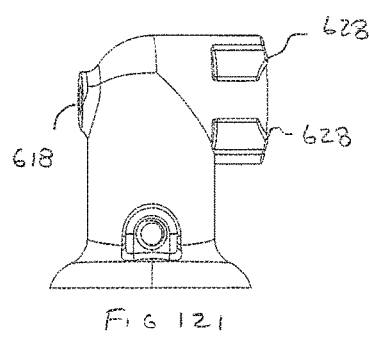
FIG. 121 is a top view of the arm shown in FIG. 120.
Figure 122:
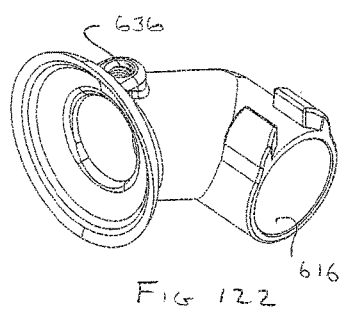
Figure 123:
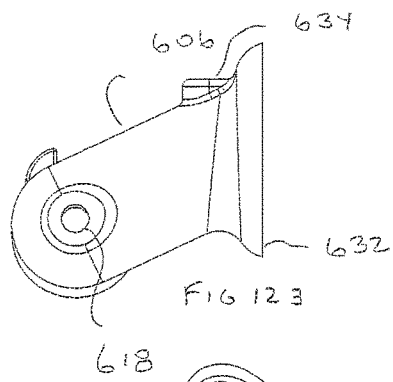
Figure 124:
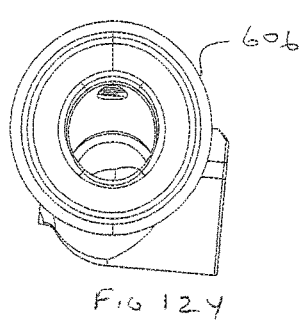
Figure 125:
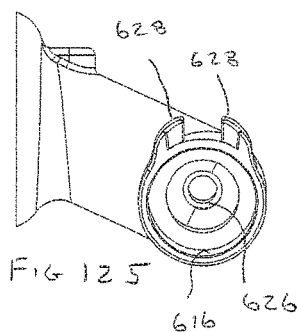
Figure 126:
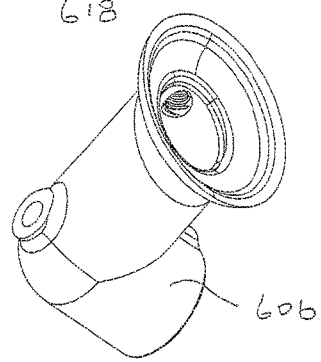
Figure 127:
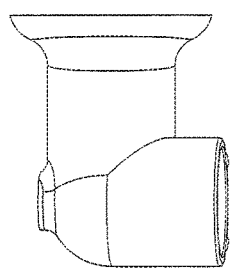
Figure 128:
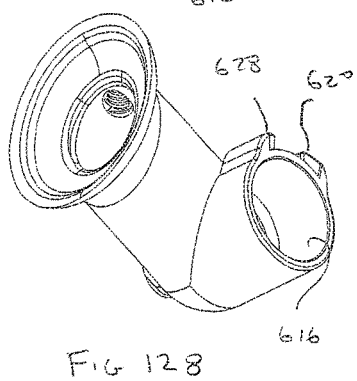
Figure 130:
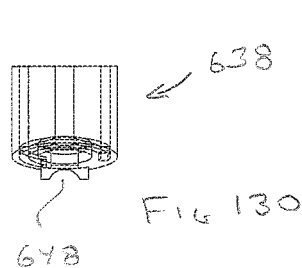

Exemplary manifold 520 includes a pair of opposed side end portions 528, 530. A flap engaging projection 532, 534 extends radially outwardly from each side end portion. Each flap engaging projection is configured for releasably engaging a proximal end 536 of a flap, an exemplary embodiment of which flap is shown in FIGS. 87 through 89.

In this exemplary embodiment each flap engaging projection includes a clevis 540, 542. Each clevis includes a pair of spaced projections that bound a recess 544, 546. Each recess is sized for receiving the proximal end 536 of a flap therein. In the exemplary arrangement each projection of the respective clevis includes a pair of disposed fastener accepting openings 548 therethrough. As shown in FIGS. 87 and 89 each flap proximal end 536 includes flap openings 550. The flap openings 550 and the fastener accepting openings 548 are of similar configuration such that respective releasible fasteners can be extended through respective ones of the flap openings and fastener accepting openings so as to hold a flap 538 in releasably fixed engagement with each side end portion of the manifold 520.

As shown in FIGS. 90 through 92 respective flaps 538 can be attached to each of the side end portions 528, 530 of the manifold 520. In the exemplary embodiment flaps 538 extend radially outward relative to the axis of rotation 526. In the exemplary arrangement each of the flaps 538 terminate radially outwardly at a distal end 552. The distal ends of the respective flaps are positioned at the same distance radially away from the axis of rotation in the exemplary embodiment. This is done to assure that the forces acting on the manifold and the hub of the sprayer to which the manifold is connected are substantially balanced.

As can be appreciated the distance of the distal ends 552 of the flaps away from the axis of rotation may be different in different arrangements. The length of the flaps may be varied to change the inertial force as well as the air resistance braking force that must be overcome in order for the manifold to rotate at a given rotational speed. By changing the length of each of the flaps 538 the inertia and air resistance may be varied to achieve the desired speed of manifold rotation. Further it should be appreciated that in other arrangements the configuration of the flaps, the weight distribution along the length of the flaps and other factors may also be varied to achieve desired speed of rotation and other operational properties of the manifold. Of course it should be understood that these approaches are exemplary and other embodiments other approaches may be used.

FIGS. 93 through 100 show yet a further embodiment of an exemplary manifold 554. Manifold 554 is generally the same as manifold 520 except as explicitly described. Manifold 554 includes an opposed pair of side end portions 556, 558 each of which includes a respective flap engaging projection that comprises a respective clevis 560, 562. Each clevis includes a pair of respective parallel projections that bound a respective recess 564, 566. Each recess is sized for accepting a proximal end 536 of a flap 538 therein.

Similar to the manifold 520 previously discussed, each clevis 560, 562 includes a pair of fastener accepting openings therein that can be placed in aligned relation with the flap openings 550 of a flap 538. However, in the exemplary arrangement of manifold 554 the fastener accepting openings include a pivot opening 570 and an elongated curved slotted opening 572. Each of the pivot opening 570 and the slotted opening 572 extend in aligned relation to each projection of each respective clevis 560, 562. Each of the openings 570, 572 are configured to receive releasable fasteners therein. The releasable fasteners can also be extended through the flap openings 550 of a respective flap 538 when positioned in the respective recess of the respective clevis. In exemplary arrangements the projections of each clevis are comprised of material which is generally rigid but is sufficiently deformable so as to enable the releasable fasteners to deform at least one of the projections of the clevis to engage and hold the proximal end of a flap in fixed immovable engagement with the clevis when the fasteners are tightened. Of course it should be understood that this approach is exemplary and in other embodiments other approaches may be used for holding a flap in fixed engagement with the manifold.

FIGS. 98-100 show the exemplary manifold 554 in engaged relation with a pair of opposed flaps 538 in three exemplary angled positions. In the exemplary arrangement each flap is held in fixed engagement with the manifold through a pair of fasteners 574, 576. Fastener 574 extends through the slotted opening 572 while fastener 576 extends through the pivot opening 570. In a first position of the flaps in which the flaps extend directly horizontally and radially outward from the ends of the manifold as shown in FIG. 98, fasteners 574, 576 are positioned in generally vertically aligned relation. In this position shown in FIG. 98 the flaps 538 generally correspond to the horizontal arrangement shown in FIG. 90.

By loosening each of the respective fasteners 574 and 576 each respective flap 538 is rotationally movable about the pivot opening 570 and fastener 576 to any of a plurality of angular positions. In the exemplary arrangement the flaps may be moved so that each flap extends at substantially any acute angle relative to a line parallel to the axis of rotation that extends through the respective pivot opening 570. By changing the angular position of each of the flaps 538 and then tightening the fasteners 574, 576 with the respective distal end of the flap in the desired position, the inertial properties and the drag properties that are applied by the flaps and that oppose rotation of the manifold 554 may be selectively varied. The selected variation of the rotational properties of the manifold enable providing a supplemental brake force which is additive to that provided by the brake in the respective base to which the manifold is attached so as to provide selected rotational properties for the particular manifold. Alternatively in some arrangements the flaps may supply the brake force without a brake being operative in the base. Of course it should be understood that these approaches are exemplary and other embodiments other approaches may be used.

FIGS. 101 through 128 show an alternative exemplary embodiment of a manifold 578. Manifold 578 includes features similar to the manifold previously discussed except as explicitly described. The exemplary manifold 578 is configured to enable each nozzle to be radially spaced away from an axis of rotation 580 of the manifold a selected distance. Because in the exemplary arrangement each nozzle is operative to output a jet of water in a direction that is generally perpendicular to a radial direction through the axis, varying the radial distance of each nozzle from the axis is operative to change the force produced by each nozzle that acts to rotate the manifold 578. This ability to vary the force which acts to rotate the manifold, in combination with the brake of the base or flaps of the exemplary arrangements, enables selectively varying the rotational speed and other properties of each manifold.

In the exemplary arrangement the manifold 578 includes a central head 582. The exemplary head 582 which is shown separately in FIGS. 111 and 114, includes a manifold inlet 584 in the bottom thereof for releasably engaging a nipple end of a hub of the sprayer base similar to manifolds that have been previously described. The head 582 further includes a port 586 similar to previously described manifolds.

The exemplary head 582 further includes a pair of opposed annular cylindrical necks 588. Each exemplary neck 588 extends radially outward and upward relative to the manifold inlet. Each neck includes an annular cylindrical outer surface 590. The neck outer surface 590 includes an annular seal engaging recess 592 therein. A radially outward extending head projection 594 is disposed above each respective neck 588. Each head projection 594 is disposed away from the annular neck outer surface 590.

Each neck includes a central opening 596. As shown in side cross section FIGS. 115 through 119 the exemplary head 582 includes a central axially extending chamber 598. The central chamber 598 is bounded radially inwardly of each neck opening 596 by a wall portion 600. Each wall portion that corresponds to a respective neck includes a threaded opening 602. A plurality of fluid openings 604 extends through the wall portion 600 in spaced relation from the threaded opening 602. Each of the fluid openings 604 provide fluid communication through the wall portion 600 between the central chamber of the head 598 and the neck central opening 596 of a respective neck. It should be pointed out that in the exemplary arrangement the fluid openings 604 are configured such that the manifold interior area and particularly the lower manifold surface, are enabled to be sloped continuously downward between the nozzles of the manifold and the manifold inlet so as to enable water to drain from the manifold in a manner like that previously discussed. Of course this approach is exemplary and other embodiments other approaches may be used.

In the exemplary embodiment of the manifold 578, the manifold includes a pair of angled arms 606. Each arm extends radially outward from the head 582 and is generally L-shaped. The exemplary arms 606 each include a nozzle of the type previously discussed that causes a jet of water to be discharged generally perpendicular to and radially away from the axis of rotation 580. Each arm is in operative connection with an adjusting rod 608 that extends radially inward through the arm. Each adjusting rod terminates outwardly of the arm in a rotatable end 610. Rotating the adjusting rod is operative to cause the arm to be selectively moved either radially closer to or radially further away from the head 582 and the axis of rotation 580.

As shown in greater detail in FIGS. 107 through 110, 112 through 113 and 120 through 128 each arm includes an annular cylindrical sleeve portion 612 which is alternatively referred to as a sleeve. Each annular sleeve portion 612 extends in outwardly overlying relation of a respective neck 588 of head 582. The annular sleeve portion is movable in radially outwardly overlying telescoping fluid tight relation with the respective neck throughout a range of radially disposed positions. An annular seal 614 that is positioned in the seal recess 592 in the neck outer surface 590 is operative to maintain fluid tight engagement between the outer surface of the neck and an inner annular surface 616 of the annular sleeve portion 612. The annular resilient seal 614 is operative to maintain such fluid tight engagement throughout the range telescoping positions of each respective annular sleeve portion relative to the respective neck.

Each adjusting rod 608 extends inside the respective arm from the externally accessible rotatable end 610 through an opening 618. A resilient gasket 620 is positioned in surrounding relation of the opening 618 and between a circular inner face of the rotatable end 610 so as to prevent the escape of liquid through the opening 618. Each adjusting rod 608 includes an inwardly threaded portion 622. The inwardly threaded portion 622 is threadably engaged in the threaded opening 602 in the wall portion 600 of the head. A rod spring 624 extends in surrounding relation of each respective adjusting rod 608. The respective rod spring 624 extends between an inner wall 626 which bounds the interior area of the arm adjacent to the opening 618, to the radially outer face of the wall portion 600 adjacent to the threaded opening 602. The rod spring is operative to bias the respective arm 606 radially outward from the head 582.

In the exemplary arrangement each arm includes on an outer upper surface of the annular sleeve portion 612, a pair of outward extending angularly spaced arm projections 628. The arm projections 628 are spaced so that the head projection 594 may extend between the arm projections and be slideably movable between the arm projections in close-fitting relation. In the exemplary arrangement each head projection 594 and pair of spaced arm projections 628 comprise a guide which is operative to keep the respective arm in the proper angular orientation relative to the head 582. The operation of the guide which prevents relative rotational movement of the neck and sleeve, helps to assure the proper angular orientation of the respective arm is maintained as the arm is moved radially inward and outward.

As represented in FIGS. 107 through 110 and 112 through 113 the rotation of the rotatable end 610 of an adjusting rod 608 causes the rotatable end of the adjusting rod to move radially inward or radially outward from the axis of rotation 580. This is caused by the engagement of the inward threaded portion 622 of the adjusting rod 608 with the respective threaded opening 602 in the interior of the head 582. As the adjusting rod is rotated the annular sleeve portion 612 of the respective arm moves in telescoping relation with the immediately adjacent neck outer annular surface 590 of the respective neck 588. As the sleeve portion moves in telescoping relation relative to the neck, the seal 614 maintains the sleeve portion in the neck in fluid tight engagement so that no fluid escapes from the arm portion except through the respective nozzle. The respective rod spring 624 that extends in surrounding relation of a respective adjusting rod 608 maintains the respective arm outwardly biased against the seal and inner face of the rod end 610 to assure that gasket 620 prevents fluid loss through the opening 618 and that the respective arm moves inwardly and outwardly and coordinated relation with the adjusting rod.

FIGS. 101, 104, 107 and 110 show the exemplary manifold 578 with the radially extending arms 606 thereof moved to a fully inward position. This corresponds to the nozzles of the arm 606 having the closest radial distance to the axis of rotation 580. As a result for given flow and pressure of liquid through the manifold this position represents the manifold producing the lowest rotational force when liquid is discharged therefrom.

FIGS. 102, 105, 108 and 112 show the exemplary manifold 578 with the arms 606 moved to an intermediate position. In this intermediate position the arms are disposed radially outwardly from the axis of rotation 580 further than in the fully inward position. As a result in this intermediate position the nozzles of the manifold produce a greater rotational force for given pressure and flow rate of liquid.

FIGS. 103, 106, 109 and 113 show the exemplary manifold 578 with the arms 606 extended to the full extent radially outward from the axis of rotation 580. In this position the manifold produces the greatest rotational force for a given pressure and flow rate of liquid therethrough. Of course it should be understood that in the exemplary arrangement the radial distance of each respective nozzle associated with an arm may be positioned radially outward anywhere within a range from the most inward the most outward position. Further it should be understood that while in the example configurations shown both arms are at the same radially outward positions, it is also possible to have each of the arms adjusted to be at different radial distances from the axis of rotation. Of course it should be understood that these structures used to provide the radially movable and changeable manifold arms are exemplary and in other embodiments other structures and configurations may be used.

Further it should be understood that although the exemplary manifold 578 includes a pair of opposed arms, other manifold arrangements may include different numbers of arms and other arm arrangements. For example in some arrangements a manifold may have only one arm. Other manifold arrangements may include three or more arms. In some alternative manifold arrangements the head may have multiple necks but only some of the necks may be in connection with arms that include outlet nozzles. Some necks may be connected to a plug arm other blind channel from which liquid does not escape. In this manner not all of the necks that are included on the head may be utilized. Of course it should be understood that numerous different alternative arrangements may be used.

In the exemplary arrangements each of the arms 606 include a nozzle aperture 630 similar to the nozzle apertures of manifolds previously discussed. Each nozzle aperture has adjacent thereto an outward extending annular deflector bell 632 which operates to deflect liquid and prevent the liquid from collecting and running back towards the base to which the manifold is attached. In the exemplary arrangement each deflector bell has a brow portion 634 integrally formed therewith. Each brow portion includes a nozzle fastener opening 636 that is configured for receiving a nozzle fastener which is suitable for holding a nozzle in releasably fixed engagement within the nozzle aperture 630 in a manner like that previously discussed. Of course it should be understood that these arrangements are exemplary and other embodiments other arrangements and fluid outlets may be utilized.

FIGS. 129 through 135 show views of an exemplary nozzle 638. Similar to nozzles previously discussed, the exemplary nozzle 638 includes a cylindrical body 640. The body 640 includes an axially extending passage 642 that extends through the body and terminates outwardly at an outlet opening 644. The cylindrical body of the exemplary embodiment further includes on a top side, a nozzle projection 646. The nozzle projection 646 includes a central nozzle projection recess 648 that is configured for engaging an inward end of a nozzle fastener. The exemplary nozzle 638 includes a tapered forward face 650. The forward face includes annular recesses 652 therein. In the exemplary arrangement the annular recesses 652 extend generally perpendicular to the tapered forward face 650. Thus this exemplary arrangement helps to avoid the retention of water on the forward face 650 including in any of the annular recesses 652. This further helps the exemplary nozzle to avoid ice accumulations during cold operation to help assure reliable system operation. Of course it should be understood that these arrangements are exemplary and other embodiments other approaches may be used.

FIGS. 136 through 157 show a further alternative manifold arrangement. A manifold 654 that is shown in FIG. 136, FIGS. 138 through 142 and 146, includes a head 656 and a disengageable arm 658. The exemplary head 656 is similar in many respects to head 582 previously discussed. Head 656 is releasably engageable with a rotatable nipple end of a hub of a base and is rotatable about an axis of rotation 660. The exemplary head further includes a pair of radially opposed, upward extending necks 662. Each neck 662 includes a threaded outer surface 664. In some exemplary embodiments the threaded portion may have standard tapered threads or alternatively may include a suitable square thread or other thread such as slots of a bayonet type configuration.

The exemplary arm 658 includes a radially extending portion 666. The radially extending portion of arm 658 includes a threaded aperture 668. The threaded aperture is configured for releasably engaging the threaded outer surface 664 of a respective neck 662. A resilient seal 670 is positioned to be in intermediate sealing relation between the neck 662 and the aperture 668. The exemplary arm 658 further includes an outer portion 672 that extends generally perpendicular to the radially extending portion 666. The arm terminates outwardly in an outward extending deflector bell 674 like those previously discussed. The outer portion 672 of the arm 658 also includes a nozzle accepting aperture. The nozzle accepting aperture is configured to receive a nozzle 676 in releasable engagement therein. A seal 678 is positioned in a recess in the nozzle accepting aperture to provide sealing engagement with the nozzle and the interior area of the arm. A nozzle fastener 680 is configured to hold the nozzle 676 in the operative position in the nozzle aperture.

The exemplary head further includes a plug arm 682. The plug arm 682 includes an internal threaded aperture 683 similar to aperture 668 that is releasably engageable with a threaded outer surface 664 of an adjacent neck 662. The plug arm 682 does not include a liquid outlet and as a result serves to close the liquid opening 684 in the immediately adjacent neck 662 of the head 656. A resilient seal 686 similar to seal 670 is operative to provide fluid tight engagement between the plug arm 682 and the head 656.

Exemplary head 656 further includes a port 688 that is releasably engageable with a pressure indicator in a manner like that previously discussed. When not engaged with the pressure indicator, the port 688 may be closed by a plug 690 as shown. The exemplary head 656 further includes a manifold inlet 692. The exemplary manifold inlet 692 is configured for releasable fluid engagement with the nipple end of a rotatable hub in a manner like that previously discussed. A resilient seal 694 serves to assure that the head and the adjacent nipple end are engaged in fluid tight relation. Of course it should be understood that this configuration is exemplary and in other embodiments other arrangements may be used.

FIG. 137, FIGS. 143 through 145 and 147 show an alternative manifold 696. Manifold 696 may use the same configuration head 656 as manifold 654. Exemplary manifold 696 includes a pair of arms similar to arm 658. In the exemplary manifold 696 an additional arm 698 extends outwardly from the head in place of the plug arm 682. In the exemplary arrangement the arm 698 may be identical to arm 658. Further in exemplary arrangements the same threaded attachment methods used for attaching each of the arms 658 and 698 to the head 656 may be used.

As can be appreciated, in exemplary arrangements the exemplary head 656 may be utilized in a manifold that provides one or two fluid outlets. Further in other exemplary arrangements additional numbers of fluid outlets corresponding to the number of necks on an alternative head may be utilized. Further in exemplary arrangements when the number of available necks exceed the desired number of nozzles, the unneeded necks may be closed with a plug arm in a manner like that previously discussed.

Further in some exemplary arrangements the threaded character of each interengaging neck and arm aperture may enable each arm to be set selectively at an angle relative to horizontal. For example in some arrangements the resilient seals may provide sealing engagement throughout an angular range of positions between each engaged arm and neck so that the respective arm may be tilted to have the nozzle outlet directed at any position in a selected range of angles between directly upward and directly downward. In this manner the threaded arrangement may enable an operator of the system to set the direction of the outlet nozzles as desired to achieve desired rotational properties of the manifold as well as the desired liquid distribution pattern. Of course it should be understood that in most exemplary manifold configurations the arms will be set at a position so that the nozzles discharge at angles that are generally close to horizontal. However in certain circumstances it may be desirable to have substantially different nozzle outlet angles. Further in exemplary arrangements the radial distance of the outlet nozzle of an arm from the axis may be selectively varied by changing the arms in engagement with the head.

Further in other exemplary embodiments different types of threaded engagements between the head and arms may be utilized. Such arrangements may include a bayonet type threaded engagement in which each arm is pushed inwardly and turned in a tapered slot type threaded engagement until the arm engages a stop. The stop may be positioned such that when the stop is reached the arm is fully engaged with the head and also the nozzle is positioned in a desired angular position. Such an arrangement which may include a coarse square thread with a transverse stop or a bayonet or similar engagement configuration may be utilized to achieve engaging each arm with the head in a particular desired orientation. Of course it should be understood that numerous different engaging methodologies may be utilized for providing engagement between a head structure and arm structures to produce desired manifold configurations.

It should also be understood that the water spray distribution apparatus and the components discussed as used in connection therewith as described herein are exemplary, and in other systems and arrangements other or different types of components may be used. Further, while the exemplary sprayers are described as being used in connection with the distribution of wastewater produced by a sewage treatment system, the features, structures and relationships associated with the embodiments of the sprayers described herein may be used in connection with other types of sprayers and systems as well as in connection with the spraying of materials other than water.

Thus the exemplary embodiments achieve improved operational capabilities, eliminate difficulties encountered in the use of prior devices and systems, and achieve the useful results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features are not limited to the exact features shown or described herein.

It should further be understood that the features and/or relationships associated with one embodiment described herein can be combined with features and/or relationships from another embodiment. That is, various features and/or relationships from various embodiments can be combined in further embodiments. The inventive scope of the disclosure is not limited to only the embodiments shown and/or described herein.

Having described the features, discoveries and principles of the exemplary embodiments, the manner in which they are constructed and operated, and the advantages and useful results attained, the new and useful features, devices, elements, arrangements, parts, combinations, systems, equipment, operations, methods, processes and relationships are set forth in the appended claims.

I claim:

1. Apparatus comprising:
    a rotatable water distribution sprayer including
        a manifold, wherein the manifold includes
            a manifold interior area,
            a manifold inlet,
            at least one outlet nozzle,
            wherein the manifold inlet and the at least one outlet nozzle are in fluid communication through the manifold interior area,
        a base, wherein the base includes
            a body,
            wherein the body includes a generally cylindrical internal cavity,
            wherein the cavity extends along an axis,
            wherein the body includes an outlet body end, wherein the outlet body end includes an outlet body end opening,
            a hub,
                wherein the hub extends in the cavity and is rotatable about the axis within the cavity,
                wherein the hub includes a nipple end, wherein the nipple end extends axially outside the body through the outlet body end opening, and is releasably engageable with the manifold inlet,
                wherein the hub includes an axial passage therethrough,
                wherein the axial passage fluidly extends from within the cavity through the nipple end,
            a brake,
                wherein the brake is in operative connection with the hub and operative to apply a brake force that resists rotation of the hub in a first rotational direction,
        wherein water discharge from the at least one nozzle is operative to produce a rotational force operative to overcome the brake force and cause the hub and manifold to rotate in the first rotational direction.

2. The apparatus according to claim 1
    wherein the hub includes an annular, radially extending disc rotor portion, wherein the disc rotor portion is housed within the cavity,
        wherein the disc rotor portion includes at least one radially extending rotor wall, a stator, wherein the stator is positioned in rotationally fixed operative connection with the body, wherein the stator includes an annular friction disc portion, wherein the friction disc portion is in abutting engagement with one radially extending rotor wall, a spring, wherein the spring is operative to bias the friction disc portion and the one rotor wall toward abutting engagement, whereby the biasing force is operative to cause the brake force.

3. The apparatus according to claim 2
wherein the body further includes a cap,
   wherein the cap is selectively axially positionable relative to the stator from outside the body,
   wherein the brake force is variable responsive to changes in axial position of the cap.

4. The apparatus according to claim 3
wherein the cap includes the outlet body end opening,
wherein the body includes an outer cavity portion, wherein the outer cavity portion includes a threaded outer cavity end,
wherein the cap includes a threaded outer cap portion, wherein the threaded outer cavity end is in threaded engagement with the threaded outer cap portion,
whereby rotational movement of the cap is operative to cause axial cap movement.

5. The apparatus according to claim 4
wherein the cap includes a cap outer face, wherein the cap outer face includes at least one of a tool engagement recess and a tool engagement projection,
wherein the cap is selectively rotatable via tool engagement with the at least one tool engagement recess or tool engagement projection.

6. The apparatus according to claim 4
wherein the cap includes a radially extending inner cap surface,
wherein the inner cap surface extends parallel to a further radially extending rotor wall,
wherein the further radially extending rotor wall is axially disposed from the one rotor wall that is in abutting engagement with the friction disc portion of the stator,
an annular step portion, wherein the annular step portion extends axially intermediate and in abutting relation with each of the radially extending inner cap surface and the further radially extending rotor wall.

7. The apparatus according to claim 6
wherein the cap includes an annular inner cap projection, wherein the annular inner cap projection extends axially and radially outwardly bounds the radially extending inner cap surface,
wherein the annular step portion terminates radially inward of the annular inner cap projection.

8. The apparatus according to claim 6
wherein the cap includes an internal annular cap bore,
wherein the hub rotatably extends in the cap bore,
an annular outer bushing portion,
wherein the annular outer bushing portion extends in the cap bore,
wherein the outer bushing portion extends in axially outward movably engaged relation with the hub.

9. The apparatus according to claim 6
wherein the cap includes an internal annular cap bore,
   wherein the hub rotatably extends in the cap bore,
a barrel, wherein the barrel includes
   an annular outer bushing portion, wherein the outer bushing portion extends in axially outward movably engaged relation with the hub, and
   the annular step portion.

10. The apparatus according to claim 8
wherein the body further includes a body inlet end,
   wherein the body inlet and is axially opposed of the body outlet end,
wherein the cavity is bounded within the body by an annular radially inward extending surface, wherein the radially inward extending surface is axially disposed toward the inlet end from the stator,
wherein the spring extends in operative biasing engagement between the radially inward extending surface and the stator.

11. The apparatus according to claim 10
wherein the cavity is further bounded within the body by a radially extending step,
   wherein the radially extending step is disposed toward the inlet end from the radially inward extending surface,
a further annular bushing portion,
   wherein the further annular bushing portion is further axially disposed from the first inlet end than the bushing portion,
   wherein the further annular bushing portion extends radially outward of and in relatively movable engagement with the hub,
   wherein the further bushing portion is in axially abutting engagement with the radially extending step.

12. The apparatus according to claim 11
wherein the hub further includes a slinger,
wherein the slinger is in fixed operative connection with the hub and is axially disposed from the outlet body end opening and extends continuously radially outward from the hub to beyond the outlet body end opening.

13. The apparatus according to claim 11
wherein the at least one outlet nozzle is directed perpendicular of the axis,
wherein the manifold is in operatively movable connection with at least one flap,
   wherein each flap includes a proximal end and an opposed distal end,
   wherein each flap is movably mounted in operative connection with the manifold such that the distal end is selectively positionable radially outwardly relative to the axis,
   whereby the at least one flap provides selectively variable air brake force.

14. The apparatus according to claim 13
wherein the manifold further includes at least one clevis,
   wherein each respective flap is operatively engaged with the manifold through a respective clevis,
at least one releasable fastener associated with each respective clevis,
   wherein the at least one releasable fastener is selectively operative to hold the distal end of the respective flap at a selected radial distance from the axis.

15. The apparatus according to claim 13
wherein the manifold includes at least one radially extending arm portion, wherein each respective radially extending arm portion extends radially fluidly intermediate of the axis and a respective outlet nozzle, wherein the outlet is disposed radially from the axis a radial arm distance,
wherein the radial arm distance is selectively variable.

16. The apparatus according to claim 15,
wherein the manifold includes a head,
   wherein the head is in fluid engagement with and is rotatable in engagement with the hub,
wherein each arm portion extends radially outward from the hub, wherein the head includes at least one radially outward extending cylindrical neck,
wherein each arm includes a radially extending cylindrical sleeve,
wherein each sleeve is movable in radially telescoping slidable fluid tight engagement with a respective neck.

17. The apparatus according to claim 16,
wherein the manifold further includes at least one radially extending rotatably movable adjusting rod,
  wherein each adjusting rod is operative to movably engage a respective radially extending arm portion and the head,
  wherein each respective adjusting rod is rotatably accessible from outside the manifold such that rotation of the adjusting rod is operative to change the radial arm distance between the axis and the nozzle outlet of the respective radially extending arm.

18. The apparatus according to claim 16
wherein the manifold further includes at least one radially extending rotatably movable adjusting rod,
  wherein each adjusting rod is operative to movably engage a respective radially extending arm portion and the head,
  wherein each adjusting rod is in operative threaded engagement with the head, and further including at least one rod spring,
  wherein each rod spring extends in surrounding relation of a respective adjusting rod and is operative to bias the respective radially extending arm radially outward from the hub,
  wherein each respective adjusting rod is rotatably accessible from outside the manifold such that rotation of the adjusting rod is operative to change a radial arm distance between the axis and the nozzle outlet of the respective radially extending arm.

19. The apparatus according to claim 16
wherein the manifold further includes at least one radially extending rotatably movable adjusting rod,
  wherein each adjusting rod is operative to movably engage a respective radially extending arm portion and the head,
  wherein each respective adjusting rod is rotatably accessible from outside the manifold such that rotation of the adjusting rod is operative to change the radial arm distance between the axis and the nozzle outlet of the respective radially extending arm,
wherein each respectively engaged neck and sleeve include a respective guide,
wherein the guide includes at least one projection and at least one recess that are relatively radially movable in slidable engagement and are operative prevent relative rotational movement of the respective engaged neck and sleeve.

20. The apparatus according to claim 15
wherein the manifold includes a head,
  wherein the head is in fluid engagement with and rotatable in engaged relation with the hub,
wherein each arm portion extends radially outward from the hub,
wherein the head includes at least one radially outward extending cylindrical neck,
wherein each arm includes a respective radially extending coupling portion, wherein each coupling portion is releasably engageable in fluid tight relation with a respective neck,
wherein each respective arm that has a respective outlet nozzle disposed from the axis a first radial arm distance, is selectively replaceable with a further arm that has a further outlet nozzle disposed from the axis a second radial distance different from the first radial arm distance.

21. The apparatus according to claim 1
wherein the hub further includes a slinger,
wherein the slinger is in fixed operative connection with the hub and is axially disposed from the outlet body end opening and extends continuously radially outward from the hub to beyond the outlet body end opening.

22. The apparatus according to claim 1
wherein the at least one outlet nozzle is directed perpendicular of the axis,
wherein the manifold is in operatively movable connection with at least one flap,
  wherein each flap includes a proximal end and an opposed distal end,
  wherein each flap is movably mounted in operative connection with the manifold such that the distal end is selectively positionable radially outwardly relative to the axis,
  whereby the at least one flap provides selectively variable brake force via air braking.

23. The apparatus according to claim 1
wherein the manifold includes at least one radially extending arm portion, wherein each respective radially extending arm portion extends radially fluidly intermediate of the axis and a respective outlet nozzle a radial arm distance,
wherein the radial arm distance is selectively variable.

24. The apparatus according to claim 23
wherein the manifold includes a head,
  wherein the head is in fluid engagement with and rotatable in engagement with the hub,
wherein each arm portion extends radially outward from the hub,
  wherein the head includes at least one radially outward extending cylindrical neck,
wherein each arm includes a radially extending cylindrical sleeve,
wherein each sleeve is movable in radially telescoping slidable fluid tight engagement with a respective neck.

25. The apparatus according to claim 23
wherein the manifold includes a head,
  wherein the head is in fluid engagement with and rotatable in engaged relation with the hub,
wherein each arm portion extends radially outward from the hub,
  wherein the head includes at least one radially outward extending cylindrical neck,
wherein each arm includes a respective radially extending coupling portion, wherein each coupling portion is releasably engageable in fluid tight relation with a respective neck,
wherein each respective arm that has a respective outlet nozzle disposed from the axis a first radial arm distance, is selectively replaceable with a further arm that has a further outlet nozzle disposed from the axis a second radial arm distance different from the first radial arm distance.

26. The apparatus according to claim 24
wherein the manifold further includes at least one radially extending rotatably movable adjusting rod,
wherein each adjusting rod is operative to movably engage a respective radially extending arm portion and the head, wherein each respective adjusting rod is rotatably accessible from outside the manifold such that rotation of the adjusting rod is operative to change the radial arm distance between the axis and the nozzle outlet of the respective radially extending arm.

27. The apparatus according to claim 24
wherein the manifold further includes at least one radially extending rotatably movable adjusting rod,
wherein each adjusting rod is operative to movably engage a respective radially extending arm portion and the head,
wherein each adjusting rod is in operative threaded engagement with the head, and further including at least one rod spring,
  wherein each rod spring extends in surrounding relation of respective adjusting rod and is operative to bias the respective radially extending arm radially outward from the hub,
  wherein each respective adjusting rod is rotatably accessible from outside the manifold such that rotation of the adjusting rod is operative to change a radial arm distance between the axis and the nozzle outlet of the respective radially extending arm.

28. The apparatus according to claim 24
wherein the manifold further includes at least one radially extending rotatably movable adjusting rod,
wherein each adjusting rod is operative to movably engage a respective radially extending arm portion and the head,
wherein each respective adjusting rod is rotatably accessible from outside the manifold such that rotation of the adjusting rod is operative to change the radial arm distance between the axis and the nozzle outlet of the respective radially extending arm,
wherein each respectively engaged neck and sleeve include a respective guide, wherein the guide includes at least one projection and at least one recess that are relatively radially movable in slidable engagement and that prevent relative rotational movement of the respective engaged neck and sleeve.

29. Apparatus comprising:
a rotatable water distribution sprayer including
  a manifold, wherein the manifold includes
    a manifold interior area,
    a manifold inlet,
    at least one outlet nozzle,
    wherein the manifold inlet and the at least one outlet nozzle are in fluid communication through the manifold interior area,
  a base, wherein the base includes
    a body,
      wherein the body includes an internal cavity,
        wherein the internal cavity extends along an axis,
      wherein the body includes an outlet body end, wherein the outlet body end includes an outlet body end opening,
    a hub,
      wherein the hub extends in and is rotatable about the axis within the internal cavity,
      wherein the hub includes an axially extending nipple end, wherein the nipple end
        extends outside the body through the outlet body end opening, and
        is releasably engageable with the manifold inlet,
      wherein the hub includes a fluid passage therethrough, wherein the fluid passage extends between the internal cavity and the nipple end,
    a brake,
      wherein the brake is in operative connection with the hub and operative to apply a brake force that resists rotation of the hub in a first rotational direction,
wherein water discharge from the at least one outlet nozzle is operative to produce a rotational force operative to overcome the brake force and cause the hub and manifold to rotate in the first rotational direction.

* * * * *